United States Patent
Nguyen et al.

(10) Patent No.: US 7,738,925 B2
(45) Date of Patent: *Jun. 15, 2010

(54) ADAPTIVE MULTI-BEAMFORMING SYSTEMS AND METHODS FOR COMMUNICATION SYSTEMS

(75) Inventors: Hoang Nguyen, Burlington, MA (US); Balaji Raghothaman, Hollis, NH (US)

(73) Assignee: Nokia Corporation, Espoo (FI)

( * ) Notice: Subject to any disclaimer, the term of this patent is extended or adjusted under 35 U.S.C. 154(b) by 607 days.

This patent is subject to a terminal disclaimer.

(21) Appl. No.: 11/713,480

(22) Filed: Mar. 2, 2007

(65) Prior Publication Data
US 2007/0207730 A1   Sep. 6, 2007

Related U.S. Application Data

(60) Provisional application No. 60/779,215, filed on Mar. 3, 2006.

(51) Int. Cl.
*H04M 1/00*     (2006.01)
(52) U.S. Cl. ............... 455/562.1; 455/63.4; 455/25; 455/575.7
(58) Field of Classification Search ............. 455/562.1, 455/575.7, 115.1, 168.1, 277.2, 452.2, 9, 455/10, 13.3, 13.4, 504, 517, 67.11, 67.13, 455/67.16, 39, 63.4, 25, 561; 375/267
See application file for complete search history.

(56) References Cited

U.S. PATENT DOCUMENTS

| | | | |
|---|---|---|---|
| 6,788,250 B2 | 9/2004 | Howell | |
| 6,842,632 B2 * | 1/2005 | Raghothaman et al. | .. 455/562.1 |
| 6,934,563 B2 * | 8/2005 | Raghothaman et al. | .. 455/562.1 |
| 2003/0073463 A1 * | 4/2003 | Shapira | ............ 455/562 |
| 2003/0086366 A1 | 5/2003 | Branlund et al. | |
| 2003/0162567 A1 * | 8/2003 | Raghothaman et al. | ..... 455/562 |

(Continued)

FOREIGN PATENT DOCUMENTS

WO   WO 00/72464 A1   11/2000

(Continued)

OTHER PUBLICATIONS

Cantoni, A., "Application of Orthogonal Perturbation Sequences to Adaptive Beamforming," IEEE Trans. on Antennas and Propagation, vol. 28, pp. 191-202, Mar. 1980.

(Continued)

*Primary Examiner*—Tan Trinh
(74) *Attorney, Agent, or Firm*—Slater & Matsil, L.L.P.

(57) ABSTRACT

A wireless communication system including receiving and base stations. The receiving station includes a detector that measures a downlink channel correlation matrix for multiple antennas of a base station. The detector computes an antenna weight increment vector normal to an antenna weight vector for multiple beams from the multiple antennas of the base station. The detector quantizes the antenna weight increment vectors to produce a respective quantized antenna weight increment vector. The receiving station includes a transmitter that sends the quantized antenna weight increment vectors to the base station. The base station includes a beamformer selector that receives from the receiving station and re-orthogonalizes the quantized antenna weight increment vector for each of the multiple beams. The base station includes a weight vector modifier that modifies the antenna weight vector for the multiple beams by adding an increment proportional to the respective re-orthogonalized quantized antenna weight increment vector.

30 Claims, 19 Drawing Sheets

U.S. PATENT DOCUMENTS

2005/0064908 A1 3/2005 Boariu et al.
2006/0029146 A1* 2/2006 Catreux et al. .............. 375/267
2007/0242766 A1* 10/2007 Xu et al. .................... 375/260

OTHER PUBLICATIONS

Henrici, P., "Applied and Computational Complex Analysis," vol. III, pp. 287-288, New York, NY: Wiley & Sons, 1986.

Sollenberger, N. R., "Diversity and Automatic Link Transfer for a TDMA Wireless Access Link," in Proc. IEEE Global Telecom. Conf., vol. 1, pp. 532-536, Nov. 29-Dec. 2, 1993.

Gerlach, D., et al., "Spectrum Reuse Using Transmitting Antenna Arrays with Feedback," in Proc. IEEE Int. Conf. Acoust., Speech, Sig. Processing, vol. 4, pp. IV97-IV100, Apr. 19-22, 1994.

Gerlach, D., et al., "Adaptive Transmitting Antenna Arrays with Feedback," IEEE Sig. Proc. Letters, vol. 1, pp. 150-152, Oct. 1994.

Liang, J.W., et al., "Forward Link Antenna Diversity Using Feedback for Indoor Communication Systems," Proc. IEEE Int. Conf. Acoust., Speech, Sig. Processing, vol. 3, pp. 1753-1755, May 1995.

Raleigh, G.G., et al., "A Blind Adaptive Transmit Antenna Algorithm for Wireless Communication," in Proc. IEEE Int. Comm. Conf., vol. 3, pp. 1494-1499, Jun. 18-22, 1995.

Wittneben, A., "Analysis and Comparison of Optimal Predictive Transmitter Selection and Combining Diversity for DECT," in Proc. IEEE Global Telecom. Conf., vol. 2, pp. 1527-1531, Nov. 13-17, 1995.

Foschini, G.J., "Layered Space Time Architecture for Wireless Communication in a Fading Environment When Using Multi-Element Antennas," Bell Labs Technical Journal, pp. 41-59, 1996.

Alamouti, S.M., "A Simple Transmit Diversity Technique for Wireless Communications," IEEE J. Select. Areas in Comm., vol. 16, pp. 1451-1458, Oct. 1998.

Narula, A., et al., "Efficient Use of Side Information in Multiple-Antenna Data Transmission over Fading Channels," IEEE J. Select. Areas in Comm., vol. 16, pp. 1423-1436, Oct. 1998.

Heath, R.W., Jr., et al., "A Simple Scheme for Transmit Diversity Using Partial Channel Feedback," in Proc. 32nd IEEE Asilomar Conf. on Signals, Systems & Computers, vol. 2, pp. 1073-1078, Nov. 1-4, 1998, Pacific Grove, California.

Lo, T.K.Y., "Maximum Ratio Transmission," in Proc. IEEE Int. Comm. Conf., vol. 2, pp. 1310-1314, Jun. 6-10, 1999.

Tarokh, V., et al., "Space-Time Block Codes from Orthogonal Designs," IEEE Trans. Info. Theory, vol. 45, pp. 1456-1467, Jul. 1999.

Lo, T.K.Y., "Maximum Ratio Transmission," IEEE Trans. Comm., vol. 47, No. 10, pp. 1458-1461, Oct. 1999.

Andersen, J.B. et al., "Antenna Arrays in Mobile Communications: Gain, Diversity, and Channel Capacity," IEEE Antennas and Propag. Mag., vol. 42, pp. 12-16, Apr. 2000.

Papadias, C.B., et al., "A Space-Time Coding Approach for Systems Employing Four Transmit Antennas," in Proc. IEEE Int. Conf. Acoust., Speech, Sig. Processing, vol. 4, pp. 2481-2484, May 7-11, 2001.

Cirrincione, G., et al., "The MCA EXIN Neuron for the Minor Component Analysis," IEEE Transactions on Neural Networks, Jan. 2002, pp. 160-187, vol. 13, IEEE, Los Alamitos, CA.

Derryberry, R.T., et al., "Transmit Diversity in 3G CDMA Systems," IEEE Communications Magazine, pp. 68-75, Apr. 2002.

Papadias, C.B., et al., "Capacity-Approaching Space-Time Codes for Systems Employing Four Transmitter Antennas," IEEE Trans. Info. Theory, vol. 49, pp. 726-732, Mar. 2003.

Dighe, P.A., et al., "Analysis of Transmit-Receive Diversity In Rayleigh Fading," IEEE Trans. Comm., vol. 51, pp. 694-703, Apr. 2003.

Banister, B.C., et al., "A Simple Gradient Sign Algorithm for Transmit Antenna Weight Adaptation with Feedback," IEEE Trans. Sig. Processing., vol. 51, pp. 1156-1171, May 2003.

Raghothaman, B., "Deterministic Perturbation Gradient Approximation for Transmission Subspace Tracking in FDD-CDMA," in Proc. IEEE Int. Comm. Conf., vol. 4, pp. 2450-2454, May 11-15, 2003.

Love, D.J., et al., "Grassmannian Beamforming for Multiple-Input Multiple-Output Wireless Systems," IEEE Trans. Info. Theory, vol. 49, pp. 2735-2747, Oct. 2003.

Mukkavilli, K.K., et al., "On Beamforming with Finite Rate Feedback in Multiple-Antenna Systems," IEEE Trans. Info. Theory, vol. 49, pp. 2562-2579, Oct. 2003.

Xia, P., et al., "Multiantenna Adaptive Modulation with Beamforming Based on Bandwidth-Constrained Feedback," IEEE Trans. Comm., vol. 53, pp. 256-536, Mar. 2005.

Nguyen, H., et al., "Quantized-Feedback Optimal Adaptive Multi-Beamforming for MIMO Systems,"IEEE Globecom 2006, 2006, 5 pages.

Nguyen, H., et al., "Quantized-Feedback Optimal Adaptive Beamforming for FDD Systems," 2006 IEEE International Conference on Communications, vol. 9, Jun. 2006, pp. 4202-4207.

* cited by examiner

ADAPTIVE MULTI-BEAMFORMING SYSTEMS AND METHODS FOR COMMUNICATION SYSTEMS

CROSS REFERENCE TO RELATED APPLICATIONS

This application claims the benefit of U.S. Provisional Application No. 60/779,215, entitled "Quantized-Feedback Optimal Adaptive Multi-Beam Forming for MIMO Systems," filed on Mar. 3, 2006, which is incorporated herein by reference.

TECHNICAL FIELD

The present invention is directed, in general, to communication systems and, in an exemplary embodiment, to a system and method for adaptively selecting antenna weighting parameters for a multiple-antenna wireless communication system.

BACKGROUND

The communication of information is a necessity of modern society, which is enabled through the operation of a communication system. Information is communicated between a sending station and a receiving station by way of communication channels. The sending station, if necessary, converts the information into a form for communication over the communication channels. The receiving station detects and recovers the information for the benefit of a user. A wide variety of different types of communication systems have been developed and are regularly employed to effectuate communication between the sending and receiving stations. New types of communication systems have been and continue to be developed and constructed as a result of advancements in communication technologies.

An exemplary communication system is a radio communication system in which a communication channel is defined upon a radio link extending between the sending and receiving stations. The radio communication systems are amenable to implementation as mobile communication systems wherein radio links, rather than fixed, wireline connections, are employed to define communication channels. A cellular communication system is an example of a radio communication system that has achieved significant levels of usage. Cellular communication systems have been installed throughout significant parts of the populated world. Various cellular communication standards have been promulgated, setting forth the operational parameters of different types of cellular communication systems.

Generally, a cellular communication system includes a network infrastructure that includes a plurality of base stations that are positioned at spaced-apart locations throughout a geographic area. Each of the base stations defines an area, referred to as a cell, from which the cellular communication system derives its name. The network infrastructure of which the base stations form portions is coupled to a core network such as a packet data backbone or a public-switched telephone network. Communication devices such as computer servers, telephone stations, etc., are, in turn, coupled to the core network and are capable of communication by way of the network infrastructure and the core network. Portable transceivers, referred to as mobile stations, communicate with the base stations by way of radio links forming portions of an electromagnetic spectrum. The use of the cellular communication system is permitted, typically, pursuant to a service subscription and users (referred to as subscribers) that communicate by way of the cellular communication system through utilization of the mobile stations.

Information communicated over a radio link is susceptible to distortion such as dispersion as a result of non-ideal communication conditions. The distortion causes the information delivered to a receiving station to differ from the corresponding information transmitted by the sending station. If the distortion is significant, the informational content will not be accurately recovered at the receiving station. For instance, fading caused by multi-path transmission distorts information communicated over a communication channel. If the communication channel exhibits significant levels of fading, the informational content may not be recoverable.

Various techniques such as spatial diversity are employed to compensate for, or otherwise overcome, the distortion introduced upon the information transmitted over a communication channel to the receiving station. Spatial diversity is created through the use, at a sending station, of more than one transmit antenna from which information is transmitted, thereby creating spatial redundancy therefrom. The antennas are typically separated by distances sufficient to ensure that the information communicated by respective antennas fades in an uncorrelated manner. Additionally, the receiving stations sometimes use more than one receive antenna, preferably separated by appropriate distances.

Communication systems that utilize both multiple transmitting antennas and multiple receiving antennas are often referred to as being multiple-input, multiple-output ("MIMO") systems. Communications in a MIMO system provide the possibility that higher overall capacity of the system, relative to conventional systems, can be achieved. As a result, an increased number of users may be serviced or more data throughput may be provided with improved reliability for each user. The advantages provided through the use of spatial diversity are further enhanced if the sending station is provided with information about the state or performance of the communication channel between the sending and receiving stations.

A sending station generally cannot measure channel characteristics of the communication channel directly, such as a channel correlation matrix representing a product of channel impulse response components for the multiple transmitting antennas. Thus, the receiving station typically measures the channel characteristics of the communication channel. In two-way communication systems, measurements made at the receiving station can be returned to the sending station to provide the channel characteristics to the sending station. Communication systems that provide this type of information to multiple-antenna sending stations are referred to as closed-loop transmit diversity systems. Communication channels extending from the network infrastructure of a cellular communication system to a mobile station are sometimes referred to as being downlink, or forward-link, channels. Conversely, the channels extending from the mobile station back to the network infrastructure are sometimes referred to as being uplink, or reverse-link, channels.

The feedback information returned to the sending station (e.g., the network infrastructure such as a base station) from the receiving station (e.g., a mobile station) is used to select values of antenna weightings. The weightings are values including phase delays by which information signals provided to individual antennas are weighted prior to their communication over a communication channel to the mobile station. A goal is to weight the information signals in amplitude and phase applied to the antennas in a manner that best facilitates communication of the information to the receiving station. The weighting values of the antenna approach a conjugate of the subspace spanned by a downlink channel covariance matrix. Estimation of the antenna weightings can be formulated as a transmission subspace tracking procedure. Several closed-loop transmit diversity procedures may be utilized.

As an example, transmit adaptive array ("TxAA"), eigenbeam former, and other techniques may be employed to advantage. Existing techniques, however, suffer from various deficiencies. For instance, the TxAA procedure fails to take into account a long-term covariance matrix of the communication channel in the selection of the antenna weightings. Additionally, the use of an eigenbeam former technique is dependent upon the number of antennas of the sending station. When the number of antennas increases, the complexity of such a technique increases rapidly.

Considering the limitations as described above, a system and method to control antenna weighting parameters for multiple antennas employed in a wireless communication system is not presently available for the more severe applications that lie ahead. Accordingly, what is needed in the art is a system that adaptively selects antenna weighting parameters and sends quantized increment vectors back to the transmitter, provides fast and global convergence to the ideal antenna weights, and employs minimal data rate to communicate the results from the receiver to the transmitter, overcoming many of the aforementioned limitations. In accordance therewith, a wireless communication system employing multiple antennas would benefit from such an adaptive arrangement without incurring unnecessary uplink bandwidth or the need to compromise signal strength at the receiving antenna.

SUMMARY OF THE INVENTION

These and other problems are generally solved or circumvented, and technical advantages are generally achieved, by advantageous embodiments of the present invention which includes a wireless communication system including a receiving station and a base station. In one embodiment, the receiving station includes a detector that measures a downlink channel correlation matrix for multiple antennas of a base station from pilot signals. The detector also computes an antenna weight increment vector normal to an antenna weight vector for each of multiple beams transmitted in a slot thereby rendering positive a directional derivative of a total received power for each of the multiple beams from the multiple antennas of the base station. The detector also quantizes each of the antenna weight increment vectors component by component to produce a respective quantized antenna weight increment vector. The receiving station also includes a transmitter that sends each of the quantized antenna weight increment vectors to the base station. The base station of the wireless communication system includes multiple antennas weighted by corresponding weighting elements. In one embodiment, the base station includes a beamformer selector that receives from the receiving station and re-orthogonalizes the quantized antenna weight increment vector for each of the multiple beams. The base station also includes a weight vector modifier that modifies the antenna weight vector for each of the multiple beams by adding an increment proportional to the respective re-orthogonalized quantized antenna weight increment vector thereto.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
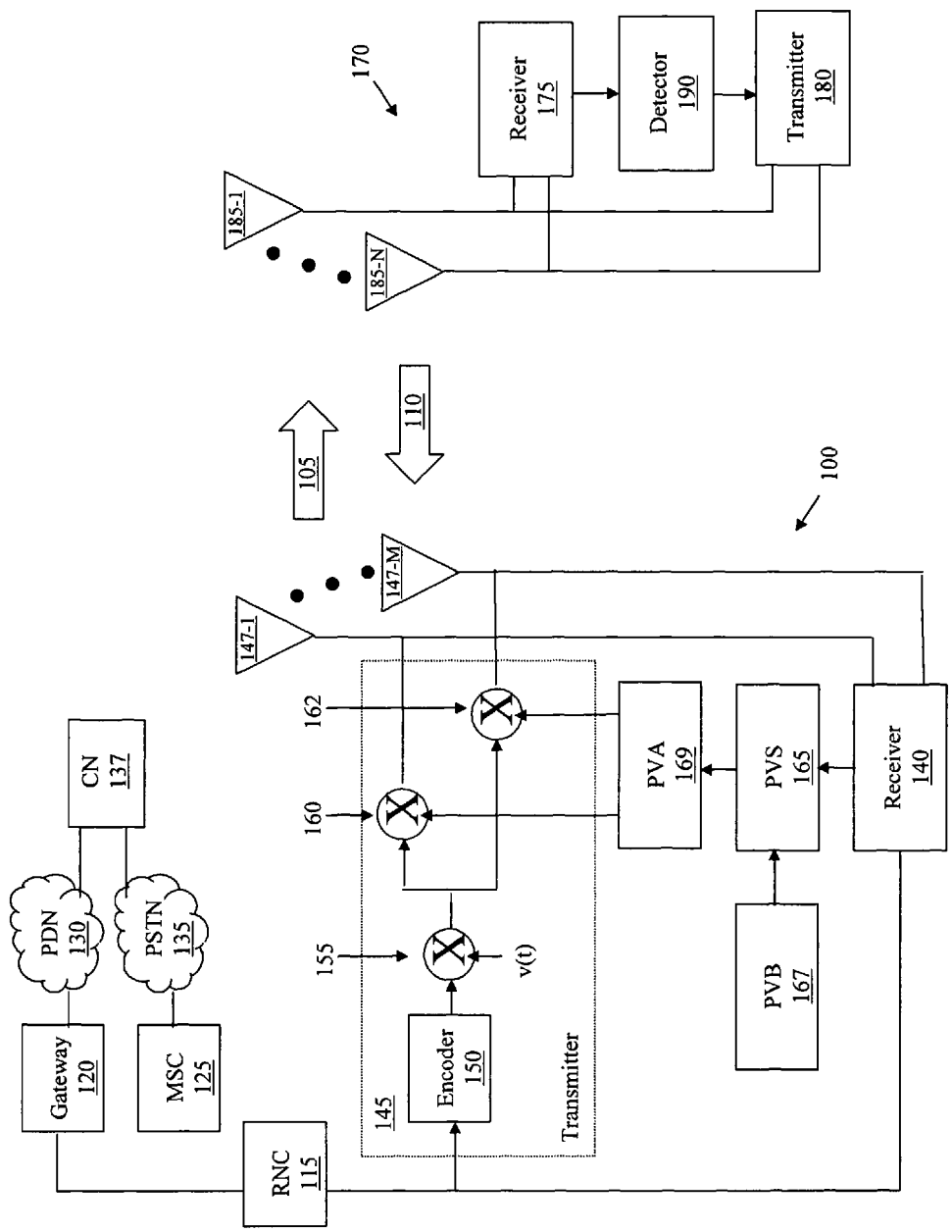
FIG. 1 illustrates a block diagram of an embodiment of a communication system that provides radio communication between communication stations via communication channels employing a deterministic perturbation gradient approximation.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context of beamforming systems such as a quantized-feedback optimal adaptive ("QFOA") multi-beamforming system that adaptively transmits a beamforming vector in a multiple-antenna frequency division duplex ("FDD") system. The system is referred to as a quantized-feedback optimal adaptive multi-beamforming solution because the system and methodology adapt transmit beamforming vectors by computing directions of preferable adaptation and feeding quantized increment vectors back for a plurality of antenna beams in the same slot to a transmitter. The beamforming vectors may be applied to a baseband signal or to a higher-level signal coupled to the multiple antennas. Existing techniques do not utilize a second antenna beam in the same slot. A second antenna beam in the same slot is formed by selection of antenna weighting parameters from quantized feedback of an increment vector from a receiving station when multiple antennas are employed at a base station in a wireless communication system. A second antenna beam formed in the same slot advantageously creates an additional channel capable of providing more communication services.

The system offers an adaptive diversity technique with global convergence. At each step of the adaptation, the quantized increment vector for each beam is projected onto a hyperplane tangent to a constraint hypersurface. The tangential components are then used to adapt the antenna weight. Since the increment vectors for each beam point in directions that yield sufficient gradients of the objective function subject to the constraints, the convergence speed is improved. Fast convergence improves the system performance during, for instance, a start-up period and helps remove the need to continuously track the antenna weights during intermittent periods wherein the transmitter does not transmit to a mobile station, or while the connection is temporarily suspended or idle. High convergence speed also provides a fast tracking capability demanded by high mobility applications. Additionally, several quantization methods are described herein that provide global convergence irrespective of a quantization error, since the gradients are preferably positive at any non-stationary point in a solution space.

For clarity, the description that follows will concentrate on the downlink case so that the transmitter weight adaptation is performed at a base station ("BS"). The receiving station, in this case, is located at a mobile station ("MS"). In addition, it is advantageous to perform the adaptation at the base stations as provided in "Transmit Diversity in 3G CDMA Systems," by R. T. Derryberry, S. D. Gray, D. M. Ionescu, G. Mandyam, and B. Raghothaman, IEEE Communications Magazine, pp. 68-75 (April 2002), which is incorporated herein by reference.

The capacity of the future wireless Internet depends strongly on a channel capacity of a wireless interface between access terminals (such as a mobile station) and access networks (such as a base station). As mentioned above, one of the methodologies to achieve an increase in capacity of a fading channel is to employ diversity techniques involving multi-antenna arrays at the transmitter or the receiver. When an antenna array is used at the receiver, multi-dimensional signal processing is employed to improve the detection quality at the cost of increased receiver complexity. When the transmitter broadcasts from a multi-antenna array, transmit diversity techniques can be employed to increase the signal quality or the information rate. A methodology for transmit diversity is space-time coding including the pioneering work of S. M. Alamouti, "A Simple Transmit Diversity Technique for Wireless Communications," IEEE J. Select. Areas in Comm., vol. 16, pp. 1451-1458, October 1998, followed by contributions such as V. Tarokh, H. Jafarkhani, and A. R. Calderbank, "Space-Time Block Codes from Orthogonal Designs," IEEE Trans. Info. Theory, vol. 45, pp. 1456-1467, July 1999, C. B. Papadias and G. J. Foschini, "A Space-Time Coding Approach for Systems Employing Four Transmit Antennas," in Proc. IEEE Int. Conf. Acoust., Speech, Sig. Processing, vol. 4, pp. 2481-2484, May 7-11, 2001, and C. B. Papadias and G. J. Foschini, "Capacity-Approaching Space-Time Codes for Systems Employing Four Transmitter Antennas," IEEE Trans. Info. Theory, vol. 49, pp. 726-732, March 2003, all of which are incorporated herein by reference.

Space-time coding employs multiple transmit antennas. When a receiver is equipped with multiple antennas, a coding gain is achieved by employing a signal allocating scheme across multiple antennas and multiple symbol periods. (See, also, G. J. Foschini, "Layered Space Time Architecture for Wireless Communication in a Fading Environment When Using Multi-Element Antennas," IEEE J. Select. Areas in Comm., pp. 1437-1450, 1996, which is incorporated herein by reference.) A diversity gain is also achieved by virtue of independent or weakly correlated fading among the antennas. The coding gain, however, is absent when only one receive antenna is used, rendering any gain possible only via transmit diversity.

Parallel to space-time coding is a beamforming methodology, which employs multiple, transmit antennas. A crucial difference between space-time coding and beamforming is that in the latter, the antennas transmit the same signal weighted by a different scale factor wherein the scale factor is a complex weighting parameter. The weights are constrained due to a limit on the total transmit power, but the distribution of the weights can be "steered" in such a way that the received signal is improved according to a certain criterion such as the total received power which, under certain conditions, is equivalent to improving the effective signal-to-noise ratio ("SNR") and the channel capacity. When the set of weights are appropriately selected and tracked in the case of fading, both fading diversity and steering gains can be achieved.

To perform the aforementioned beamforming methodology, direct or indirect knowledge about the downlink channel is necessary. Some of this knowledge can be extracted from the uplink channel information, provided that the uplink and downlink channels are correlated. (See, e.g., G. G. Raleigh, S. N. Diggavi, V. K. Jones, and A. Paulraj ("G. G. Raleigh, et al."), "A Blind Adaptive Transmit Antenna Algorithm for Wireless Communication," in Proc. IEEE Int. Comm. Conf., vol. 3, pp. 1494-1499, Jun. 18-22, 1995, which is incorporated herein by reference.) In frequency division duplex ("FDD") systems wherein the uplink-downlink frequency separation is normally larger than the signal bandwidth, the correlation between the uplink and downlink channels is weak or non-existent, although the long term correlation exists as supported by the works of G. G. Raleigh, et al. Unfortunately, long term correlation diminishes the fading diversity gain.

Since beamforming employs some detailed knowledge about the downlink channel, it has been proposed in the literature to employ a feedback path from the receiver to the transmitter via which downlink channel information estimated based on the downlink pilots is sent. (See, e.g., D. Gerlach and A. Paulraj, "Adaptive Transmitting Antenna Arrays with Feedback," IEEE Sig. Proc. Letters, vol. 1, pp. 1437-1450, Oct. 1994, R. W. Heath Jr. and A. Paulraj, "A Simple Scheme for Transmit Diversity Using Partial Channel Feedback," in Proc. Asilomar Conf. Signals, Systems & Computers, vol. 2, pp. 1073-1078, Nov. 1-4, 1998, D. Gerlach and A. Paulraj, "Spectrum Reuse Using Transmitting Antenna Arrays with Feedback," in Proc. IEEE Int. Conf. Acoust., Speech, Sig. Processing, vol. 4, pp. IV97-IV100, Apr. 19-22, 1994, and J. W. Liang and A. J. Paulraj, "Forward Link Antenna Diversity Using Feedback for Indoor Communication Systems," Proc. IEEE Int. Conf. Acoust., Speech, Sig. Processing, vol. 3, pp. 1753-1755, May 1995, all of which are incorporated herein by reference.)

To be practical, due to bandwidth constraints, the feedback rate should be reasonably low. The beamforming operation at a base station should therefore be designed in such a way that the base station relies on limited feedback information from the mobile station. In this respect, B. C. Banister, et al. proposed to adaptively select the total delivered power by employing the random perturbation gradient approximation principle. (See, e.g., B. C. Banister and J. R. Zeidler ("B. C. Banister, et al."), "A Simple Gradient Sign Algorithm for Transmit Antenna Weight Adaptation with Feedback," IEEE Trans. Sig. Processing., vol. 51, pp. 1156-1171, May 2003, which is incorporated herein by reference.) At each adaptation step, a randomly generated perturbation vector is added and then subtracted from the previous antenna weight vector. The addition and subtraction results are used as the antenna weight vector in two consecutive transmission half-slots. The term half-slot generally refers to or signifies a time duration sufficiently long for the purpose of channel and power estimation. The information sent back from the mobile station is a one-bit flag indicating which half-slot has the higher delivered power. The next weight vector is updated to the one used in the half-slot with higher delivered power.

A similar technique has been proposed by B. Raghothaman (see, e.g., B. Raghothaman, "Deterministic Perturbation Gradient Approximation for Transmission Subspace Tracking in FDD-CDMA," in Proc. IEEE Int. Comm. Conf., vol. 4, pp. 2450-2454, May 11-15, 2003, and as further described in U.S. Pat. No. 6,842,632 entitled "Apparatus, and Associated Method, for Facilitating Antenna Weight Selection Utilizing Deterministic Perturbation Gradient Approximation," to Raghothaman, et al., issued Jan. 11, 2005, which are incorporated herein by reference), which employs the fact that the mean perturbation gradient aligns with the true gradient of the objective function using an orthogonal perturbation set. (See, e.g., A. Cantoni, "Application of Orthogonal Perturbation Sequences to Adaptive Beamforming," IEEE Trans. on Antennas and Propagation, vol. 28, pp. 191-202, March 1980, which is incorporated herein by reference.)

A related application to B. Raghothaman is provided in U.S. Patent Application Publication No. 2005/0064908 entitled "Apparatus, and Associated Method, for Assigning Data to Transmit Antennas of a Multiple Transmit Antenna Transmitter," to Boariu, et al., published Mar. 24, 2005, which is incorporated herein by reference. As described above, a perturbation gradient approximation technique is used for the selection of antenna weightings at a sending station employing transmit antenna diversity. In accordance therewith, B. Raghothaman uses an approximation technique that facilitates the selection of the antenna weighting values to enhance communications between a sending station and a receiving station. A perturbation vector is selected at the sending station for communication over the communication channel to the receiving station. The perturbation vector is selected in an order from a selected set of vectors formed from vector values. The antenna weightings for the antennas of the sending station are perturbed in a first manner during a first portion of a time period and in a second manner during a second portion of a time period. During the first portion of the time slot, the antenna weightings are perturbed by the perturbation vector in a positive direction. During the second portion of the time slot, the perturbation vector is applied to the antenna weightings to perturb the weightings in a negative direction.

The receiving station measures power levels associated with the information communicated by the sending station. Separate power level measurements are made during the first and second portions of the time slot. Differences between the power levels measured during the separate portions of the time slot are determined and transmitted back to the sending station. The sending station detects values of the calculated differences made at the receiving station and employs the values to adjust the antenna weightings.

Thus, the deterministic perturbation gradient approximation technique is typically used in cellular communication systems having a base station that utilizes spatial diversity. Closed-loop transmit diversity is provided to select antenna weightings by which to weight downlink signals. The perturbation vectors are applied to the antenna weightings in positive and negative directions during separate portions of a time period. The weighted signals are sent by the base station to the mobile station for detection thereof. The mobile station measures power levels of the signals detected during the first and second portions of the time slot and returns values of differences in the power levels to the base station. The values returned to the base station are used to adjust the antenna weightings at the base station. Inasmuch as deterministic perturbation gradient approximation techniques are used, a long-term covariance matrix is tracked and utilized to select the antenna weightings.

Referring now to FIG. 1, illustrated is a block diagram of an embodiment of a communication system that provides radio communication between communication stations via communication channels employing a deterministic perturbation gradient approximation. The communication system includes a base station 100 and a mobile station 170. The communication channels are defined by radio links such as forward-link channels 105 and reverse-link channels 110. Information sent to the mobile station 170 is communicated by the base station 100 over the forward-link channels 105 and information originated at the mobile station 170 for communication to the base station 100 is communicated over reverse-link channels 110. The communication system may be a cellular communication system constructed pursuant to any of a number of different cellular communication standards. For instance, the base station and mobile station may be operable in a code division multiple access ("CDMA") communication system such as a third generation ("3G") CDMA communication.

The base station 100 forms part of a radio access network that also includes a radio network controller ("RNC") 115 coupled to a gateway 120 and a mobile switching center ("MSC") 125. The gateway 120 is coupled to a packet data network ("PDN") 130 such as the Internet and the mobile switching center 125 is coupled to a public switched telephone network ("PSTN") 135. A correspondent node ("CN") 137 is coupled to the packet data network 130 and to the PSTN 135. The correspondent node 137 represents a data source or a data destination from which, or to which, information is routed during operation of the communication system.

The base station 100 includes a receiver 140 and a transmitter 145. A forward-link signal to be communicated by the base station 100 to the mobile station 170 is converted into a format for communication over the forward-link channels 105 by the transmitter 145. Closed-loop feedback information is returned by the mobile station 170 to the base station 100 by way of the reverse-link channels 110. The mobile station 170 also includes a receiver 175 and a transmitter 180. The receiver 175 operates to receive, and operate upon, the forward-link signals transmitted by the base station 100 over the forward-link channels 105, and the transmitter 180 operates to transmit reverse-link signals over the reverse-link channels 110 to the base station 100.

The base station 100 and the mobile station 170 include multiple antennas, and the base station 100 and the mobile station 170 combination forms a multiple-input, multiple-output ("MIMO") system. For purposes of clarity, the base station 100 includes M base station antennas designated 147-1 to 147-M (hereinafter referenced as base station antennas 147). Also for purposes of clarity, the mobile station 170 includes N mobile station antennas designated 185-1 to 185-N (hereinafter referenced as mobile station antennas 185).

The base station transmitter 145 includes an encoder 150 that encodes data to form encoded data. The encoded data is provided to an up-mixer 155 with an up-mixing carrier v(t) to generate an up-mixed signal. The up-mixed signal is provided via weighting elements (two of which are referenced and designated as first and second weighting elements 160, 162, respectively) on separate branches to ones of the base station antennas 147. Once the up-mixed signals are weighted, the weighted signals are applied to the base station antennas 147 for transmission to the mobile station 170. Of course, other operations may be performed on the weighted signals prior to transmission to the mobile station 170.

The base station 100 also includes a deterministic perturbation gradient approximation system that adjusts the values of the weightings applied to the first and second weighting elements 160, 162 in a manner that enhances antenna weighting selection pursuant to a closed-loop transmit diversity system. The deterministic perturbation gradient approximation system (which may be embodied in hardware, software, or combinations thereof) includes a perturbation vector selector ("PVS") 165 that operates to select perturbation vectors formed of vector values (indicating a perturbed amplitude and phase) retrieved from a perturbation vector buffer ("PVB") 167. The perturbation vectors selected by the perturbation vector selector 165 are provided to a perturbation vector applicator ("PVA") 169 for application to the first and second weighting elements 160, 162. The perturbation vectors perturb the weightings of the first and second weighting elements 160, 162 and, in turn, the values of the signals transmitted by the base station's antennas 147. The forward-link signals generated on the forward-link channels 105, weighted with the perturbation vectors, are delivered to the mobile station 170.

The mobile station 170 includes a detector 190 (which may be a subsystem of the receiver 175) that detects and measures characteristics representing power levels of the perturbations of the forward-link signals (again, weighted forward-link signals) transmitted by the base station 100. The characteristics associated with the forward-link signals are thereafter transmitted by the mobile station transmitter 180 to the base station 100. The characteristics are thereafter employed by the base station 100 to adjust the weightings of the first and second weighting elements 160, 162 for the base station antennas 147 to refine the forward-link signals.

The deterministic perturbation gradient approximation system operates to provide a deterministic perturbation gradient approximation that provides tracking of long-term feedback. The deterministic perturbation gradient approximation technique may build upon stochastic perturbation gradient approximations ("SPGAs") and may use a procedure referred to as gradient descent. Gradient descent involves adaptively converging to a point in a vector space corresponding to the global minimum (or maximum) of a cost function such as total received power defined on the space. At each iteration of the adaptation, an estimate of the gradient of the cost function is formed, and the estimate of the optimal vector is revised such that it moves in the direction of the gradient vector. The process can be visualized in three dimensions involving a 2-D vector space, as moving closer to the bottom of a cost function bowl at each iteration.

The most widely used gradient search technique is the stochastic gradient search, which is applied in the least mean squares algorithm for adaptive finite impulse response ("FIR") filtering. One of the features of adaptive time-domain FIR filtering is that an input stochastic vector process is acting upon the filter, which is dimensionality analogous to the filter, and can be used to estimate the cost function gradient vector. In certain other situations, like neural network learning, it is necessary to use other methods for arriving at the gradient vector. One such method is called the simultaneous stochastic perturbation gradient approximation technique, in which, at each iteration, the effect of a stochastic perturbation on the cost function is studied. Based thereon, an estimate of an optimal vector is moved toward or away from the direction of the "random" perturbation vector.

The stochastic perturbation technique mentioned above has been applied to the problem of transmission subspace tracking for closed-loop transmit diversity and MIMO systems. In order for this SPGA technique to be possible, user-specific pilot signals are employed, which carry the perturbed weights based on which the cost function is estimated. The user-specific pilot signals are also used to coherently demodulate the received signal, since the average of the user-specific pilot signal over two slots provides the weighted composite channel estimate necessary for coherent demodulation. In many proposals for high-speed packet access wireless communication systems, however, there is no provision for user-specific pilot signals. Hence, the existing SPGA techniques cannot be implemented in such situations where there is no user-specific pilot signal. Another disadvantage of the existing SPGA techniques is that the user-specific pilot signals are usually transmitted with the same power as the traffic signal, which is quite low when compared to the non-user-specific pilot signals, henceforth referred to as common pilot signals. This arrangement leads to a degradation in the channel estimate and hence the performance of the communication link as such.

A possible method for increasing the reliability of the channel estimate is to use a combination of the channel estimates from the common pilot signals along with an estimate of the weights applied at the transmitter 145 of the base station 100. These weights can be known to the mobile station 170 if the same set of random perturbation vectors applied at the transmitter 145 of the base station 100 can be replicated at the receiver 175 of the mobile station 170. The aforementioned technique involves operating a complex random number generator at both the base station 100 and the mobile station 170 in a synchronized manner. The complexity and synchronization issues make this an undesirable alternative.

The use of the deterministic perturbation gradient approximation technique overcomes the limitations as set forth above. The deterministic perturbation makes it unnecessary to operate two synchronized random vector generators. Also, a method of extracting the cost function from the traffic signal itself may be employed, thereby rendering a user-specific pilot signal unnecessary. B. Raghothaman provides support to estimate the optimal antenna weights (designated "w") for transmission between the base station 100 and the mobile station 170 including quantitative support via equations. In accordance therewith, a perturbation method is employed that provides an approximation to the gradient of the cost function to the transmitter with a feedback signal.

The convergence of the deterministic perturbation gradient approximation method can be shown to be similar to that of the stochastic perturbation approach. The randomness of the perturbation has been stated as a condition for convergence. One of the considerations seems to be that a deterministic perturbation will lead to a biased estimate. Another consideration is that only a random perturbation may lead to convergence to a global minimum. From this point of view, the iterative procedure may be trapped in a local minimum on the condition that the cost function surface is flat in the directions pertaining to each of the perturbation vectors, at that local minimum. The probability of such an occurrence is relatively small, especially in a time varying fading channel environment. Additionally as described in B. Raghothaman, an approach to obtaining the cost function is to use the traffic channel itself. The only disadvantage of the usage of the traffic channel itself is that the actual weights applied are perturbed from the values dictated by the adaptation.

While the techniques of B. C. Banister, et al. and B. Raghothaman employ a similar feedback, the deterministic perturbation method of B. Raghothaman turns out to have a faster average convergence speed. In addition, deterministic perturbation allows both the mobile station and the base station to synchronize the adaptation, a feature that is difficult to implement with the random perturbation method of B. C. Banister, et al.

Figure 2:
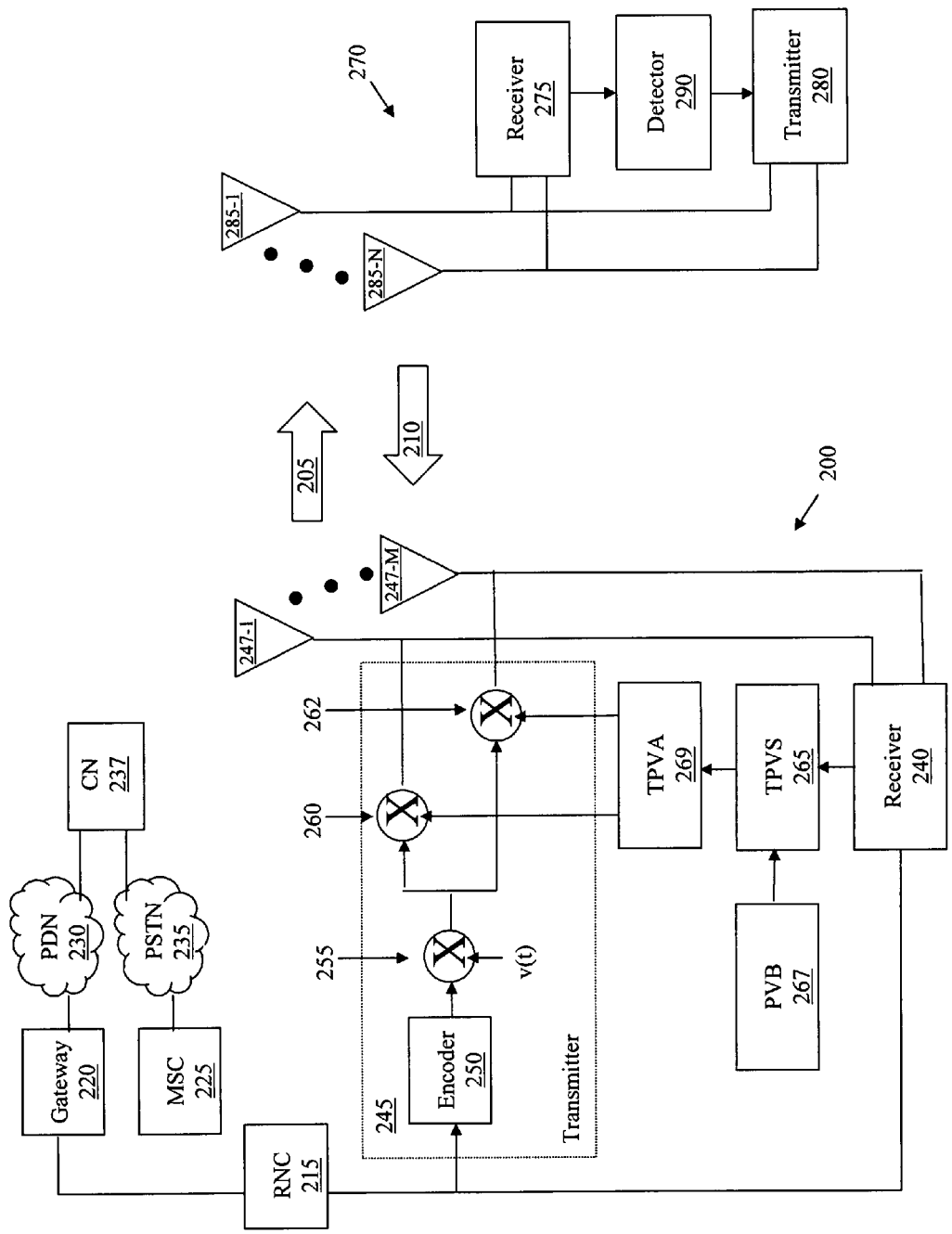
FIG. 2 illustrates a block diagram of a communication system including an embodiment of a tangential perturbation gradient system.

Referring now to FIG. 2, illustrated is a block diagram of a communication system including an embodiment of a tangential perturbation gradient system. It should be understood that the tangential perturbation gradient system may be a deterministic or random perturbation gradient system. The communication system includes a base station 200 and a receiving station (e.g., mobile station 270). The communication channels are defined by radio links such as forward-link channels 205 and reverse-link channels 210. Information sent to the mobile station 270 is communicated by the base station 200 over the forward-link channels 205 and information originated at the mobile station 270 for communication to the base station 200 is communicated over reverse-link channels 210.

The communication system may be a cellular communication system constructed pursuant to any of a number of different cellular communication standards. For instance, the base station and mobile station may be operable in a code division multiple access ("CDMA") communication system such as a third generation ("3G") CDMA communication that provides for 1×EV-DV ("EVolution, Data and Voice") data and voice communications. Those skilled in the art, however, realize that the tangential perturbation gradient system and other perturbation gradient systems described herein are employable in any number of communication systems including other types of cellular communication systems such as a global system for mobile ("GSM") communications systems that provides for general packet radio service or enhanced data for GSM evolution data services, each of which also provides for data communications. The communication system is also representative of other types of radio and other communication systems in which data is communicated over channels that are susceptible to distortion caused by fading or other conditions. Those skilled in the art should understand that the principles described herein are operable in any communication system employing closed-loop transmit diversity.

The base station 200 forms part of a radio access network that also includes a radio network controller ("RNC") 215 coupled to a gateway 220 and a mobile switching center ("MSC") 225. The gateway 220 is coupled to a packet data network ("PDN") 230 such as the Internet backbone and the mobile switching center 225 is coupled to a public switched telephone network ("PSTN") 235. A correspondent node ("CN") 237 is coupled to the packet data network 230 and to the PSTN 235. The correspondent node 237 represents a data source or a data destination from which, or to which, information is routed during operation of the communication system.

The base station 200 includes a receiver 240 and a transmitter 245. A forward-link signal to be communicated by the base station 200 to the mobile station 270 is converted into a format for communication over the forward-link channels 205 by the transmitter 245. Closed-loop feedback information is returned by the mobile station 270 to the base station 200 by way of the reverse-link channels 210. The mobile station 270 also includes a receiver 275 and a transmitter 280. The receiver 275 operates to receive, and operate upon, the forward-link signals transmitted by the base station 200 over the forward-link channels 205, and the transmitter 280 operates to transmit reverse-link signals over the reverse-link channels 210 to the base station 200.

The base station 200 and the mobile station 270 include multiple antennas, and the base station 200 and mobile station 270 combination forms a multiple-input, multiple-output ("MIMO") system. For purposes of clarity, the base station 200 includes M base station antennas designated 247-1 to 247-M (hereinafter referenced as base station antennas 247). Also for purposes of clarity, the mobile station 270 includes N mobile station antennas designated 285-1 to 285-N (hereinafter referenced as mobile station antennas 285).

The base station transmitter 245 includes an encoder 250 that encodes data to form encoded data. The encoded data is provided to an up-mixer 255 with an up-mixing constant v(t) to generate an up-mixed signal. The up-mixed signal is provided via weighting elements (two of which are referenced and designated as first and second weighting elements 260, 262, respectively) on separate branches to ones of the base station antennas 247. Once the up-mixed signals are weighted, the weighted signals are applied to the base station antennas 247 for transmission to the mobile station 270. Of course, other operations may be performed on the weighted signals prior to transmission to the mobile station 270. Of course, the first and second weighting elements 260, 262 may be applied at a baseband signal level or at a higher level in the signal processing chain.

The base station 200 also includes a tangential perturbation gradient system that adjusts the values of the weightings applied to the first and second weighting elements 260, 262 in a manner that enhances antenna weighting selection pursuant to a closed-loop transmit diversity system. The tangential perturbation gradient system (which may be embodied in hardware, software, or combinations thereof) includes a tangential perturbation vector selector ("TPVS") 265 that operates to select a tangential component of perturbation vectors formed of vector values (indicating perturbed amplitude and phase) retrieved from a perturbation vector buffer ("PVB") 267. The tangential component of the perturbation vectors selected by the perturbation vector selector 265 are provided to a tangential perturbation vector applicator ("TPVA") 269 for application to the first and second weighting elements 260, 262. The tangential components of the perturbation vectors perturb the weightings of the first and second weighting elements 260, 262 and, in turn, the values of the signals transmitted by the base stations antennas 247. The forward-link signals generated on the forward-link channels 205, weighted with the tangential components of the perturbation vectors, are delivered to the mobile station 270.

The mobile station 270 includes a detector 290 (which may be a subsystem of the receiver 275) that detects and measures characteristics representing power levels of the perturbed forward-link signals (again, weighted forward-link signals) transmitted by the base station 200. The characteristics associated with the forward-link signals are thereafter transmitted by the mobile station transmitter 280 to the base station 200. The characteristics are thereafter employed by the base station 200 to adjust the weightings of the first and second weighting elements 260, 262 for the base station antennas 247 to refine the forward-link signals.

The tangential perturbation gradient system operates to provide a tangential perturbation gradient approximation that provides tracking of long-term feedback. The tangential perturbation gradient approximation technique may build upon stochastic perturbation gradient approximations ("SPGAs") or deterministic perturbation gradient approximations selected from a deterministic set of perturbations and may use a procedure referred to as gradient descent.

Referring initially to the signaling model, consider a base station with M transmit antennas and a mobile station ("a receiving station") with N receive antennas. Let x(n) denote the unit-power information sequence:

$$\left(\text{with } \sigma_x^2 \triangleq E[|x(n)|^2] = 1\right)$$

to be transmitted over the M antennas. Assuming transmit and receiver filters constitute a Nyquist pulse, a noiseless Nyquist-rate sampled sequence received at the r-th receive antenna can be modeled by:

$$y_r(n) = \sum_{t=1}^{M} w_t \sum_{l=0}^{D} h_{r,t}(l) x(n-l)$$

where $w_t$ denotes the t-th transmit antenna weight, $h_{r,t}(l)$ represents the discrete-time channel impulse response between the t-th transmit antenna and the r-th receive antenna. The delay spread of the channel impulse response is denoted by D. In order to constrain the total transmit power, the antenna weight vector, defined as:

$$w \triangleq [w_1, w_2, \ldots, w_M]^T,$$

satisfies:

$$w^H w = 1.$$

At time n, the vector of observations from all the receive antennas is:

$$y(n) \triangleq [y_1(n), y_2(n), \ldots, y_N(n)]^T.$$

Assuming that the transmitted information sequence x(n) is white, the received signal power is:

$$J(w) \triangleq E[y^T(n) y^*(n)] = w^H R w$$

where the channel correlation matrix R is given by:

$$R = \sum_{r=1}^{N} H_r^* H_r^T,$$

$$H_r = \begin{bmatrix} h_{r,1}(0) & h_{r,1}(1) & \ldots & h_{r,1}(D) \\ h_{r,2}(0) & h_{r,2}(1) & \ldots & h_{r,2}(D) \\ \vdots & \vdots & \ldots & \vdots \\ h_{r,M}(0) & h_{r,M}(1) & \ldots & h_{r,M}(D) \end{bmatrix}.$$

It should be understood that the operators $(.)^*$, $(.)^T$ and $(.)^H = ((.)^*)^T$ denote complex conjugation, transposition and hermitian, respectively. Note that in addition to the information sequence x(n), each transmit antenna also carries a pilot sequence covered by a predetermined spreading sequence. The channel impulse response for each transmit-receive antenna pair can be estimated from the associated pilot. It is important to point out that in multiple access systems, each mobile station associated with a different antenna weight vector w and the signal model above is applicable to any one mobile station. For notational simplicity, the time dependency of the channel matrix $H_r$ has been suppressed. Nonetheless, in most cases of practical interest, the channel can be considered block-wise constant where the block duration is on the order of the channel coherence time, typically long enough for a channel estimation purpose.

An objective of the tangential perturbation gradient system and method is to increase the received power function J(w) subject to the constraint provided above. Even though the channel correlation matrix R can be estimated from the pilot sequences, it is often not practical due to bandwidth constraints to send the entire matrix to the base station. In order to adapt the antenna weight vector w at the base station, the mobile station can compute the values of the received power function $J(w_+)$, $J(w_-)$ and feed back the sign of $J(w_+)-J(w_-)$ for any antenna weight vectors $w_+$, $w_-$ employed in place of a single weight vector w in two consecutive half-slots.

Figure 3:
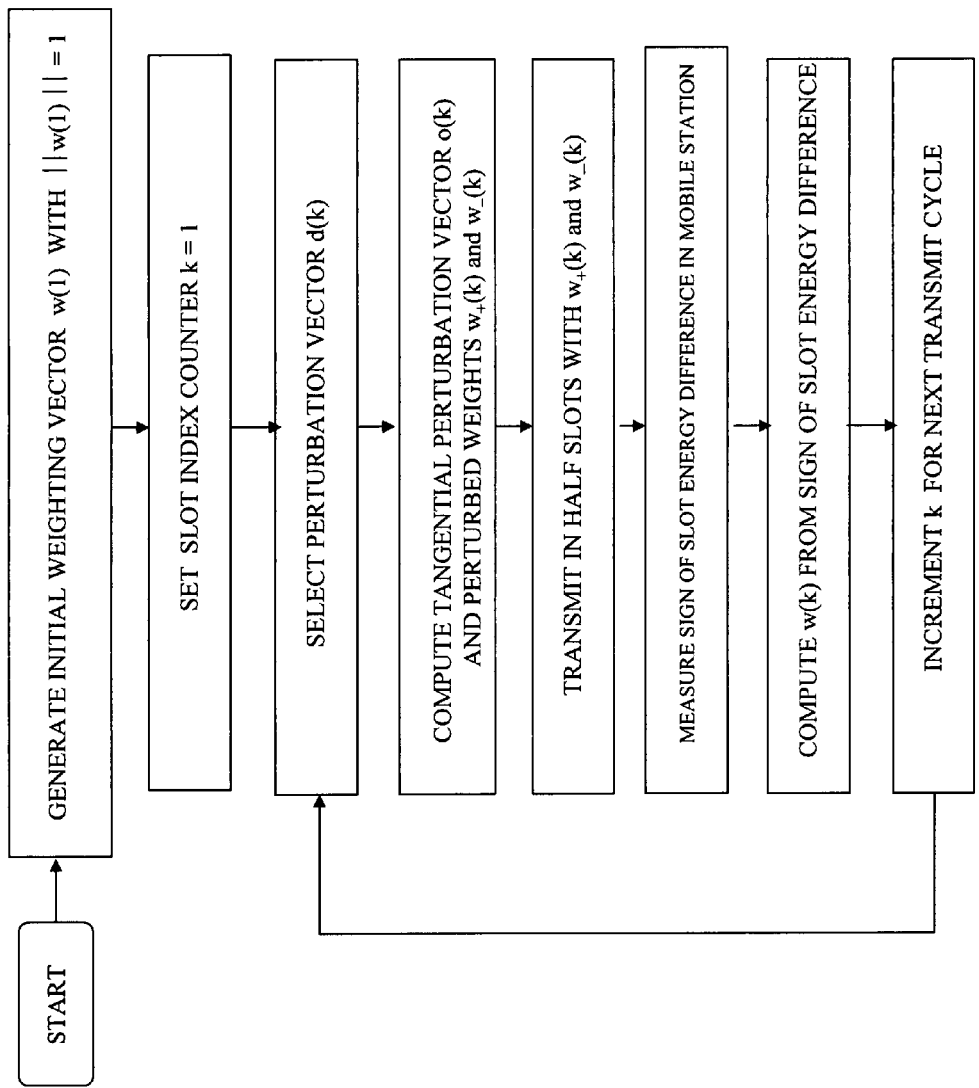
FIG. 3 illustrates is a flow diagram of an embodiment of a method of operating a tangential perturbation gradient system.

Turning now to FIG. 3, illustrated is a flow diagram of an embodiment of a method of operating a tangential perturbation gradient system. For purposes of simplicity, the circumstances wherein the perturbation vector is parallel to the antenna weight vector is not illustrated with respect to FIG. 3.

If k denotes a slot index, the tangential perturbation gradient system and method is provided as set forth below.

1. Generate initial antenna weights w(1) with $\|w(1)\|=1$.
2. Set a slot index counter k=1.
3. Generate a unit 2-norm (i.e., a Euclidean norm) perturbation vector d(k). This vector can be selected cyclically from a deterministic set that spans the entire complex vector space $\mathbb{C}^M$, or can be generated randomly (see, for instance, the separate publications by B. C. Banister, et al. and B. Raghothaman referenced above).

4. Compute a tangential perturbation vector o(k) and perturbed antenna weighting vectors $w_+(k)$, $w_-(k)$:

$$o(k) = \begin{cases} \dfrac{d - [w^H(k)d]w(k)}{\sqrt{1 - |w^H(k)d|^2}}, & |w^H(k)d| \neq 1 \\ 0, & |w^H(k)d| = 1 \end{cases}$$

$$w_+(k) = \begin{cases} \dfrac{w(k) + \mu o(k)}{\sqrt{1 + \mu^2}}, & |w^H(k)d| \neq 1 \\ w(k), & |w^H(k)d| = 1 \end{cases}$$

$$w_-(k) = \begin{cases} \dfrac{w(k) - \mu o(k)}{\sqrt{1 + \mu^2}}, & |w^H(k)d| \neq 1 \\ w(k), & |w^H(k)d| = 1 \end{cases}$$

where μ is a real-valued step size, typically $0 < \mu \leq 1$. Note that the second branch in each of the above equations corresponds to a case where the perturbation vector d is parallel to the antenna weight vector w(k), although the probability of such occurrence is quite small.

5. Use the perturbed antenna weight vectors $w_+(k)$, $w_-(k)$ in place of the antenna weight vector w to transmit the first and second half-slots of the k-th slot, respectively. At the mobile station, the received power functions (or characteristics thereof) $J(w_+(k))$, $J(w_-(k))$ are measured and the sign bit:

$$s(k) \triangleq \text{sign}\{J(w_+(k)) - J(w_-(k))\},$$

is sent back to the base station. In order to keep the adaptation from getting stuck at a local stationary point, albeit unlikely, the following convention is provided:

$$\text{sign}(a) \triangleq \begin{cases} 1, & a \geq 0 \\ 0, & a < 0 \end{cases}$$

which is slightly different from the common convention where the sign of zero is zero. Note that it is preferable that the mobile station also knows the weight vector w(k). In the deterministic perturbation method of B. Raghothaman, this is relatively straightforward to accomplish since the perturbation vector d(k) is selected from a deterministic set. However, it is more difficult to provide this information to both the base station and the mobile station and it may necessitate synchronization of the random generators at both ends of the link depending on the application.

6. Update the antenna weight vector w according to:

$$w(k+1) = \begin{cases} \alpha w(k) + \alpha \mu s(k) o(k), & |w^H(k)d| \neq 1 \\ w(k), & |w^H(k)d| = 1 \end{cases}$$

where:

-continued $$\alpha \triangleq \frac{1}{\sqrt{1 + \mu^2}}.$$

7. Set slot index counter $k \leftarrow k+1$ and loop back to step 3.

Figure 4:
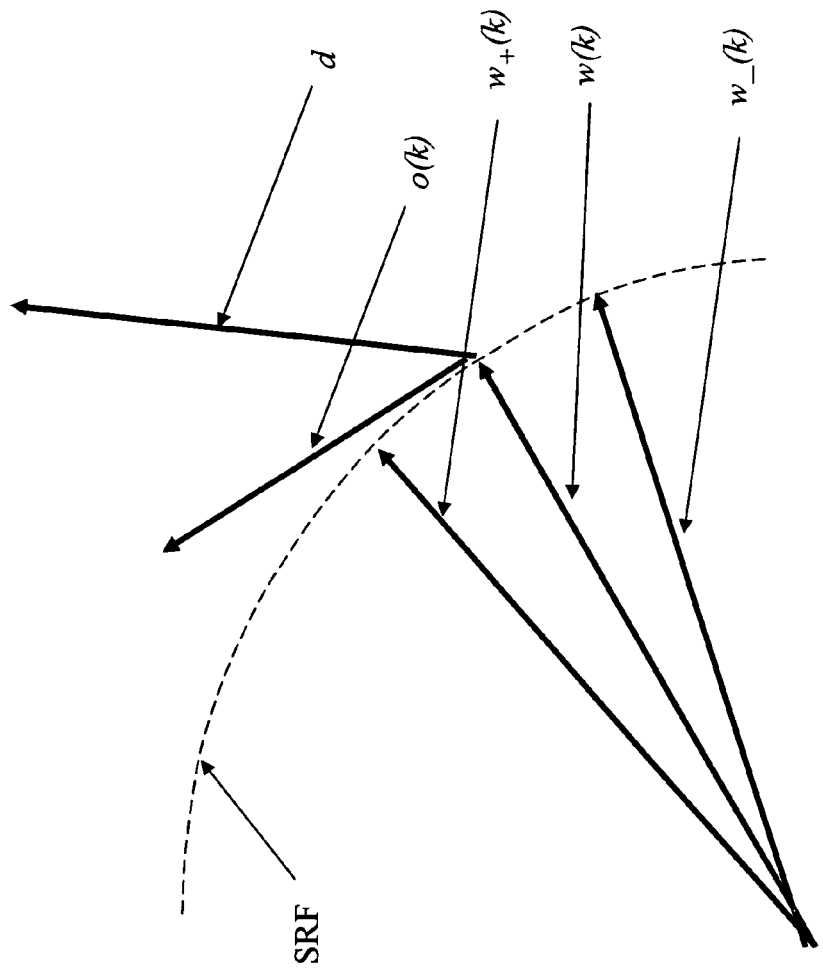
FIG. 4 illustrates a two-dimensional diagram of an exemplary process of computing a tangential perturbation vector according to a tangential perturbation gradient system.

In accordance with the aforementioned method, FIG. 4 provides a two-dimensional diagram of an exemplary process of computing a tangential perturbation vector o(k) from a perturbation vector d and then computing the half-slot antenna weight vectors $w_+(k)$, $w_-(k)$. A dotted line (designated SRF) represents the surface $W^H w = 1$.

The properties of the constrained power function can be supported as hereinafter provided. The tangential perturbation gradient system is a time-recursive solution to the optimization problem:

$$w_{opt} = \underset{w}{\text{argmax}}\, w^H R w,$$

subject to g(w)=0 where:

$$g(w) \triangleq 1 - w^H w.$$

Using the Lagrange multiplier method, the local maximizers $w_i$, i=1, 2, ..., M, satisfy:

$$R w_i = \lambda_i w_i.$$

Therefore, the $\lambda_i$'s are the eigenvalues of the channel correlation matrix R and the $w_i$'s are the corresponding eigenvectors thereof. Since the channel correlation matrix R is a non-negative definite Hermitian matrix, $\lambda_i \geq 0$ for all i and:

$$R = W \Lambda W^H,$$

where:

$$W = [w_1, w_2, \ldots, w_M], \text{ and}$$

$$\Lambda = \text{diag}(\lambda_1, \lambda_2, \ldots, \lambda_M).$$

It is customary to arrange the eigenvalues and the eigenvectors such that $\lambda_1 \geq \lambda_2 \geq \ldots \geq \lambda_M$. Furthermore, W satisfies $W^H W = W W^H = I_M$, where $I_M$ is the identity matrix of size M. By defining $u = W^H w$, the power function can be rewritten as:

$$C(u) \triangleq u^H \Lambda u = J(w).$$

Since u and w have a one-to-one mapping, each stationary point of the power function C(u) in the u-space corresponds to a unique stationary point of the power function J(w) in the w-space.

In support of the foregoing, define:

$$S_g = \{u : g(u) = 0\}.$$

That is, $S_g$ represents the surface of the unit hypersphere $u^H u = 1$. Let $u_i$ denote the i-th column of the identity matrix $I_M$. If $\lambda_1 \geq \lambda_2 \geq \lambda_M$, then the $u_i$ is a saddle point of the power function C(u) over the surface $S_g$.

A proof of this lemma can be sketched as follows. First, note that $u_i$ is a stationary point of the power function $C(u)$ over the surface $S_g$. This is due to the fact that the directional derivative of the power function $C(u)$ in the direction of $v_i$ is zero, where $v_i$ is any unit vector parallel to the hyperplane tangent to the constraint surface $S_g$ at $u=u_i$. Indeed, since $u_i = -\nabla_u^H g(u_i)$ which is orthogonal to the level surface $g(u)=0$, then $v^H_i u_i = 0$. Hence, the directional derivative of the power function $C(u)$ in the direction of $v_i$ at $u=u_i$ is:

$$D_{v_i}C(u_i) = v_i^H \nabla_u^H C(U_i) + \nabla_u C(u_i) v_i = v_i^H \lambda_i u_i + u_i^H \lambda_i v = 0,$$

which establishes that $u_i$ is a stationary point of the power function $C(u)$ over the surface $S_g$. We now establish that $u_i$ is neither a local maximum point nor a local minimum point of the power function $C(u)$ over the surface $S_g$. Since the power function $C(u)$ is analytic in $u$ and continuous over the surface $S_g$, it is sufficient to show that there exist vectors $e$ and $f$ with arbitrarily small magnitudes such that:

$$g(u_i+e)=0,$$

$$g(u_i+f)=0,$$

$$C(u_i+e)>C(u_i), \text{ and}$$

$$C(u_i+f)<C(u_i).$$

Such vectors indeed exist. For example, for any complex $e_1$, $e_2, \ldots, e_{i-1}$, with $e_1 \neq 0$, and for any complex $f_{i+1}; f_{i+2}, \ldots, f_M$ with $f_M \neq 0$, if:

$$e = \frac{e_1 u_1 + e_2 u_2 + \ldots + e_{i-1} u_{i-1} + u_i}{\sqrt{|e_1|^2 + |e_2|^2 + |e_{i-1}|^2 + 1}} - u_i,$$

$$f = \frac{u_i + f_{i+1} u_{i+1} + f_{i+2} u_{i+2} + \ldots + f_M u_M}{\sqrt{1 + |f_{i+1}|^2 + |f_{i+2}|^2 + \ldots + |f_M|^2}} - u_i,$$

then $g(u_i+e)=0$ and $g(u_i+f)=0$ hold. Note that $\|e\| \to 0$ and $\|f\| \to 0$ as $e_k \to 0$; $k=1, 2, \ldots, i-1$ and $f_l \to 0$; $l=i+1, i+2, \ldots, M$. Also, $$C(u_i + e) = \frac{|e_1|^2 \lambda_1 + |e_2|^2 \lambda_2 + \ldots + |e_{i-1}|^2 \lambda_{i-1} + \lambda_i}{|e_1|^2 + |e_2|^2 + \ldots + |e_{i-1}|^2 + 1} > \lambda_i = C(u_i),$$

$$C(u_i + f) = \frac{\lambda_i + |f_{i+1}|^2 \lambda_{i+1} + |f_{i+2}|^2 \lambda_{i+2} + \ldots + |f_M|^2 \lambda_M}{1 + |f_{i+1}|^2 + |f_{i+2}|^2 + \ldots + |f_M|^2},$$

which satisfy $C(u_i+e)>C(u_i)$ and $C(u_i+f)<C(u_i)$, respectively.

The above lemma has a practical implication. Since the constrained power function $C(u)$ has no local maximum in the surface $S_g$, the tangential perturbation gradient system converges to the global maximum. If the maximum eigenvalue of the channel correlation matrix R has multiplicity n, then $u_1$, $u_2, \ldots, u_n$ are the global maximum points of the power function $C(u)$ in the surface $S_g$. However, how close the system and method can get to a global maximum point depends on the step size $\mu$. A smaller step size $\mu$ in general yields a smaller steady-state error and a slower initial speed of convergence and vice versa. Thus, the step size $\mu$ should be selected to balance the convergence speed and the continuing antenna weight changes necessitated by changing transmit receive path dispersions.

The properties of the tangential perturbation gradient system and method will hereinafter be explored. Since the prob-ability that the perturbation vector d is parallel to the antenna weight vector $w(k)$ is very small, we explore the other cases for the our purposes of expediency. From the following relationship:

$$o(k) = \frac{d - [w^H(k)d]w(k)}{\sqrt{1 - |w^H(k)d|^2}}, \quad |w^H(k)d| \neq 1$$

the tangential perturbation vector $o(k)$ has a unit magnitude and is parallel to the hyperplane tangent to the constraint surface $S_g$, since $w^H(k)o(k)=0$. Therefore, at each step of the adaptation, the end of the antenna weight vector $w(k)$ is moved by the same distance (i.e., the antenna weight vector $w(k)$ is moved through a constant angular change). To see this quantitatively, the projection of weight vector $w(k)$ onto $w(k+1)$ is relatively constant for k since:

$$w^H(k)w(k+1) = \alpha.$$

To see this another way:

$$\|w(k+1) - w(k)\|^2 = 2(1-\alpha).$$

This is a feature of the tangential perturbation gradient system that makes it converge faster than the perturbation methods of B. C. Banister, et al. and B. Raghothaman. For the perturbation methods, the projection of the antenna weight vector $w(k)$ onto the antenna weight vector $w(k+1)$ changes with k since it depends on the direction of the perturbation vector d at time k.

To see that the tangential perturbation gradient system has a gradient ascent behavior, the directional derivative of the power function $J(w)$ in the direction of the tangential perturbation vector $o(k)$ and evaluated at the antenna weight vector $w=w(k)$ is:

$$D_{o(k)}J(w(k)) = o^H(k)\nabla_w^H J(w(k)) + \nabla_w J(w(k))o(k)$$
$$= o^H(k)Rw(k) + w^H(k)Ro(k)$$
$$= \frac{1+\mu^2}{2\mu}[J(w_+(k)) - J(w_-(k))].$$

which together with:

$$s(k) \triangleq \text{sign}\{J(w_+(k)) - J(w_-(k))\},$$

indicates that $s(k)$ is the sign, and therefore a coarse estimate, of the directional derivative of the power function $J(w)$ in the direction of the tangential perturbation vector $o(k)$. Hence, the following relationship:

$$w(k+1) = \alpha w(k) + \alpha \mu s(k) o(k), \quad |w^H(k)d| \neq 1,$$

can be rewritten as:

$$w(k+1) = \alpha w(k) + \alpha \mu \cdot \text{sign}\{D_{o(k)}J(w(k))\}o(k),$$

which can be viewed as a gradient-sign iteration subject to the constraint $g(w)=0$.

The step size and steady-state error will hereinafter be described. Since both the initial speed of convergence and the steady-state error tend to increase with the step size µ, it is sensible, especially in a static or slow-fading channel environment, to start with a large step size and decrease it monotonically over time until it reaches a sufficiently small value. To relate the step size to the steady-state error, the static channel case (constant R) is analyzed.

Suppose that at time k, the system reaches a global maximum so that the antenna weight vector $w(k)=w_1$. The system evolves between time k and k+1 by decreasing the power function J(w) from $\lambda_1$ to a smaller value. The worst case behavior is reviewed where power function J(w(k+i)) decreases at every time epoch from i=1 to i=p for some $p \geq 1$. In an actual operation, the value p is small (on the order of unity) since the probability that the power function J(w) decreases for the value p consecutive time steps decreases quickly with the value p.

Suppose the antenna weight vector $w(k)=w_1$ and let $p \geq 1$. The normalized power function $J(w(k+p))/\lambda_1$, is bounded below by:

$$B_p \leq \frac{1}{\lambda_1} J(w(k+p)),$$

where the bound $B_p$ is given by the following recursion. For i=1, 2, ..., p−1, $$J_1 = \alpha^2,$$
$$B_1 = \alpha^2,$$
$$c_1 = \alpha,$$
$$d_1 = \alpha\mu,$$
$$a_i = c_i^2,$$
$$b_i = \sqrt{c_i^2 - a_i^2},$$
$$g_i = \frac{c_i(a_i - 1)}{b_i},$$
$$h_i = \frac{d_i a_i}{b_i},$$
$$B_{i+1} = \alpha^2(J_i + 2\mu c_i g_i),$$
$$c_{i+1} = \alpha(c_i + \mu g_i),$$
$$d_{i+1} = \alpha(d_i + \mu h_i),$$
$$J_{i+1} = c_{i+1}^2.$$

Since:

$$B_p \leq \frac{1}{\lambda_1} J(w(k+p)),$$

is a deterministic bound, it only represents a loose bound. An average bound is obtained by taking into account the distribution of the antenna weight vector w(k+i) in steady state.

Figure 5:
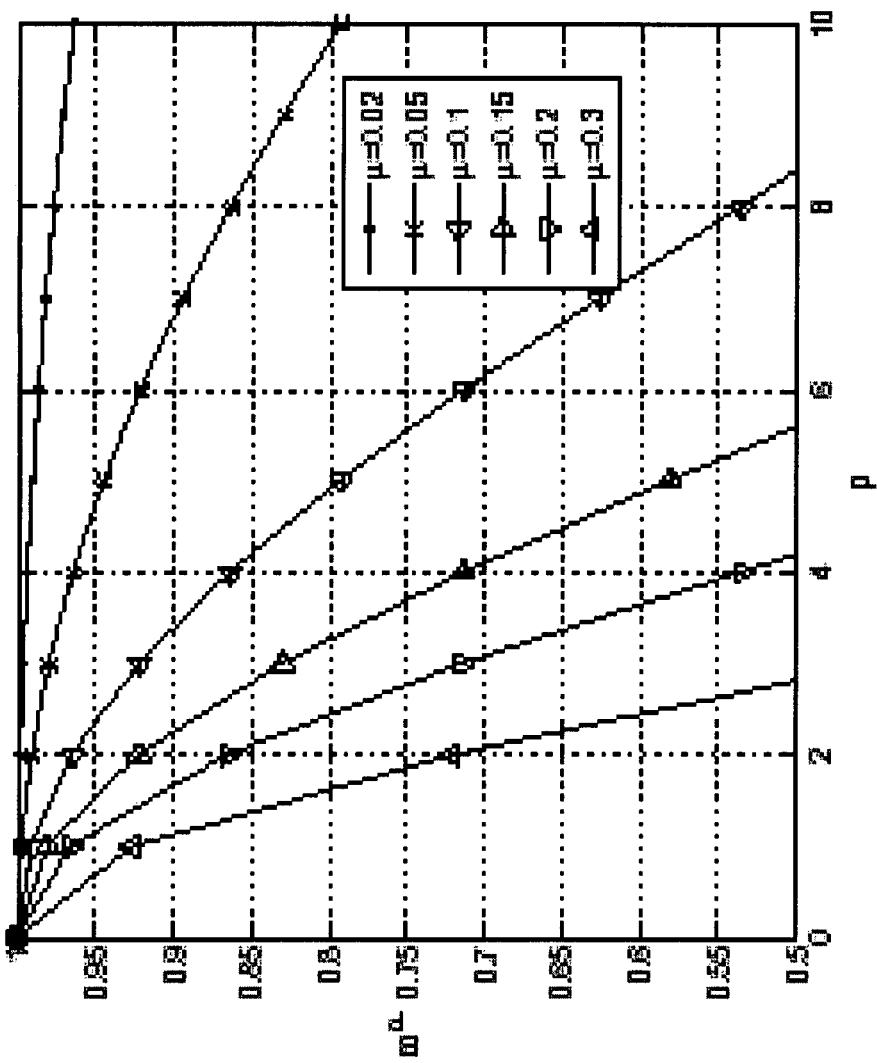
FIG. 5 illustrates a bound for a normalized power function according to a tangential perturbation gradient system.

We observe that the bound $B_p$ for the normalized power function depends on the step size µ. Therefore, the step size µ value can be chosen so that the steady-state error stays below a certain level. FIG. 5 shows the bound $B_p$ for the normalized power function as a function of the step size µ and for various values p. This bound explains quantitatively that the steady-state error increases with the size of the step size µ.

Figure 6B:
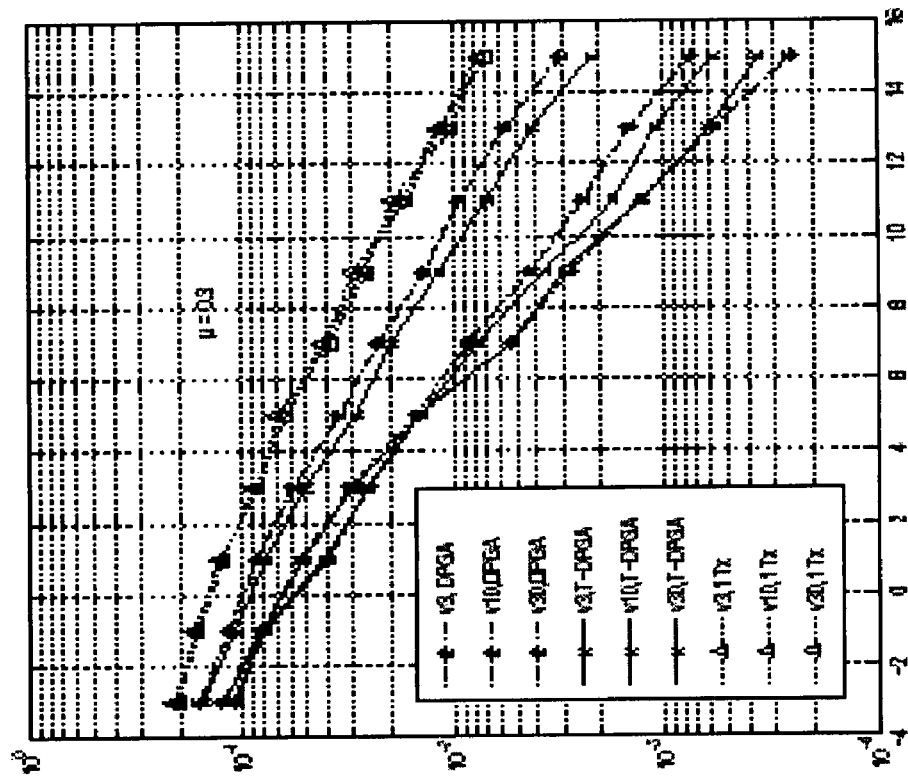
FIGS. 6A and 6B illustrate graphical representations comparing a deterministic perturbation gradient approximation to the tangential perturbation gradient system.
Figure 6A:
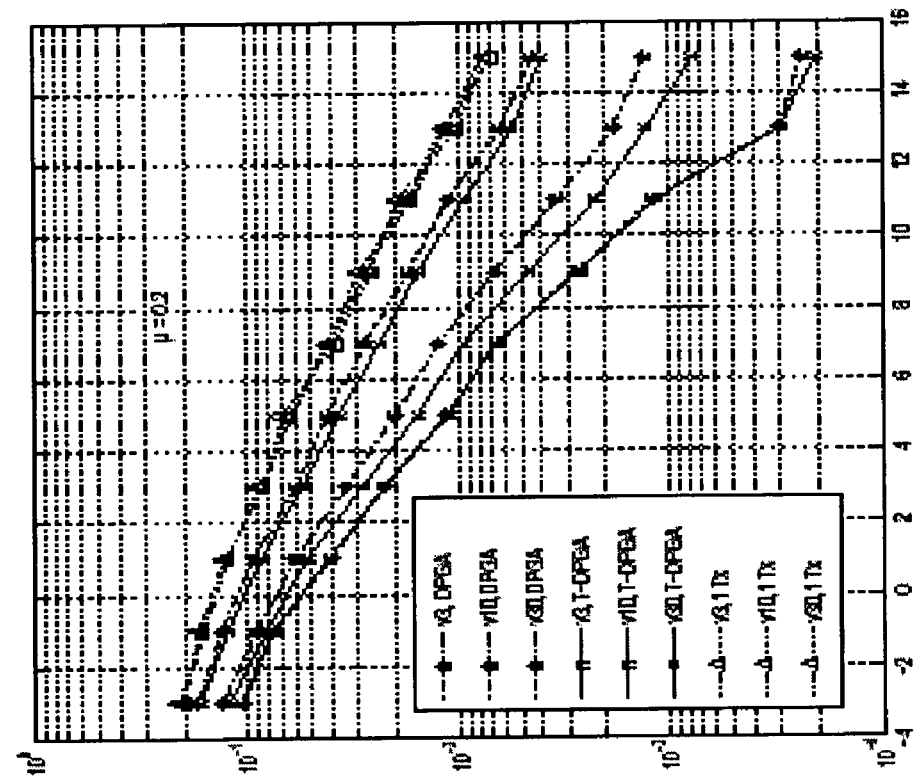

A graphical representation comparing the deterministic perturbation gradient approximation (denoted "DPGA") to the tangential perturbation gradient system (denoted "T-DPGA") is illustrated with respect to FIGS. 6A and 6B. The graphical representation includes the tangential perturbation gradient system without the tangential projection step with step sizes of 0.2 and 0.3 in FIGS. 6A and 6B, respectively. The illustrated graphical representation is provided for two transmit antennas, one receive antenna and 3, 10, and 30 kmph flat fading. An advantage of the tangential perturbation gradient system due to better tracking is visible at higher velocities.

Thus, a tangential perturbation gradient system and method for adaptive beamforming have been described. The tangential perturbation gradient system speeds up the convergence of the ordinary perturbation method. Additionally, the power function has no local maximum in the constraint set. Therefore, the tangential perturbation gradient system more rapidly converges to the global maximum. A lower bound on the power function has been developed which shows quantitatively that the steady-state error can increase with the adaptation step size, and based on this bound the step size can be selected to keep the relative steady-state error below a pre-set value. It should be noted, however, that this bound is relatively loose and therefore the step size selected according to this bound is provided for illustrative purposes only.

In view of the improvements realized with the deterministic perturbation gradient approximation, the principles provided thereby speed up the convergence associated therewith. Instead of adding the perturbation vector to the weight vector, a tangential component of the perturbation vector to the constraint surface (preferably representing a constrained power level) is constructed, and the tangential component is used to update the weight vector. In accordance therewith, the tangential perturbation gradient system is a gradient-sign system, wherein the gradient in this case is the directional derivative of the cost function in the direction of the tangential perturbation vector.

Regarding beamforming in general, an attractive feature of beamforming is that when the number of resolvable paths is smaller than the number of transmit antennas, then beamforming outperforms space-time coding scheme, provided that the beamforming methodology converges to a global maximum as supported by B. C. Banister, et al. The price paid for this gain in performance is the fact that beamforming employs downlink channel knowledge or a feedback bandwidth. Space-time coding, on the other hand, is typically a blind methodology wherein channel knowledge is not assumed at the transmitter.

Since feedback information is involved between the base station and the mobile station, a protocol is established in order for the network to recognize the information. In general, a beamformer method should possess a simple mechanism to make a tradeoff between performance (including speed of convergence and tracking), feedback rate and computational complexity. The question to address is how to devise a beamforming technique that offers the "best" performance for any given feedback rate.

Finite feedback information typically represents a quantized version of a vector quantity. The concept of vector quantization has been addressed in the beamforming literature. For example, a beamforming vector may be quantized by optimizing a beamformer criterion (typically the received power) over a pre-designed finite codebook and the index of the vector that optimizes the criterion is sent back to the transmitter. (See, e.g., A. Narula, M. J. Lopez, M. D. Trott, and G. W. Wornell ("A. Nurala, et al."), "Efficient Use of Side Information in Multiple-Antenna Data Transmission over Fading Channels," IEEE J. Select. Areas in Comm., vol. 16, pp. 1423-1436, October 1998, K. K. Mukkavilli, A. Sabharwal, E. Erkip, and B. Aazhang ("K. K. Mukkavilli, et al."), "On Beamforming with Finite Rate Feedback in Multiple-Antenna Systems," IEEE Trans. Info. Theory, vol. 49, pp. 2562-2579, October 2003, and D. J. Love, R. W. Heath Jr., and T. Strohmer ("D. J. Love, et al."), "Grassmannian Beamforming for Multiple-Input Multiple-Output Wireless Systems," IEEE Trans. Info. Theory, vol. 49, pp. 2735-2747, October 2003, all of which are incorporated herein by reference.) Instead of the delivered power, the average data rate, though less feasible, can be optimized subject to the bit error rate ("BER") and transmit power constraints. (See, e.g., P. Xia, S. Zhou, and G. B. Giannakis, "Multiantenna Adaptive Modulation with Beamforming Based on Bandwidth-Constrained Feedback," IEEE Trans. Comm., vol. 53, pp. 256-536, March 2005, which is incorporated herein by reference.)

Codebook-based selection, while representing a nice and simple idea wherein a codebook element selected in one slot has little or no algorithmic dependence on the previous one, has several drawbacks. In order for the beamformer to be close to a better-quality solution, the codebook size needs to be sufficiently large. A larger codebook size, however, employs a higher receiver computational complexity. In addition, a codebook search is inherently a nonadaptive technique and therefore does not naturally converge to a global maximizer.

A beamforming system and method is now described in an embodiment of a quantized-feedback optimal adaptive ("QFOA") beamforming system that is adaptive and further improves global convergence. Convergence speed is improved by selecting a better increment vector. A quantized version of the increment vector is sent back to the transmitter. The beamforming systems and methods advantageously are very robust with respect to a quantization error. In particular, for a very coarse quantization scheme wherein only the sign of each component is taken, the loss in convergence speed can be small and the directional derivative (constrained gradient) of the objective function is nonnegative everywhere. In addition, when the feedback information is represented by only one bit, global convergence is still assured. According to the aforementioned features, the beamforming systems and methods provide global convergence regardless of the quantization error. A communication system including these elements is described in the paper by H. Nguyen and B. Raghothaman, entitled "Quantized-Feedback Optimal Adaptive Beamforming for FDD Systems," 2006 IEEE International Conference on Communications, Volume 9, June 2006, pp. 4202-4207, which is incorporated herein by reference.

The signaling model described above is again considered, including a base station with M transmit antennas and a mobile station ("a receiving station") with N receive antennas. The variables $x(n)$, $\sigma_x^2$, $y_r(n)$, $w$, $J(w)$, $R$, and $H_r$, are as previously defined. As before, in addition to the information sequence $x(n)$, each transmit antenna also carries a pilot sequence covered by a predetermined spreading sequence, the channel impulse response for each transmit-receive antenna pair is estimated from the associated pilot, the time dependency of the channel matrix $H_r$ has been suppressed, and the channel is considered to be block-wise constant.

Regarding beamforming and a receiver, the beamformer (i.e., setting the complex transmit antenna weights), can be computed in an embodiment of a beamforming system and method such that a received signal power $J(w)$ is further improved. In the case of flat fading, where the delay D=0, it is well known that improving the received signal power $J(w)$ is equivalent to improving the effective signal-to-noise ratio ("SNR"), and hence the channel capacity with the use of maximal ratio combining ("MRC"). (See, e.g., P. A. Dighe, R. K. Mallik, and S. S. Jamuar, "Analysis of Transmit Receive Diversity In Rayleigh Fading," IEEE Trans. Comm., vol. 51, pp. 694-703, April 2003, and J. B. Andersen, "Antenna Arrays in Mobile Communications: Gain, Diversity, and Channel Capacity," IEEE Antennas and Propag. Mag., vol. 42, pp. 12-16, April 2000, which are incorporated herein by reference.)

In this case, the noisy received signal is:

$$z(n) \triangleq y(n) + v(n) = Hwx(n) + v(n)$$

where:

$$H \triangleq \begin{bmatrix} h_{1,1} & h_{1,2} & \ldots & h_{1,M} \\ h_{2,1} & h_{2,2} & \ldots & h_{2,M} \\ \vdots & \vdots & \ldots & \vdots \\ h_{N,1} & h_{N,2} & \ldots & h_{N,M} \end{bmatrix},$$

and $$v(n) \sim CN(0, N_o I_N)$$

model a circular complex white Gaussian noise process of spectral density $N_o$. Here, $I_N$ denotes an N×N identity matrix. With MRC, a combiner c is designed such that for any given antenna weight vector w, the post-combination SNR experienced by an estimate of the transmitted information signal:

$$\hat{x}(n) = c^H z(n) = c^H Hwx(n) + c^H v(n)$$

is maximized. This SNR is:

$$\eta(c, w) \triangleq \frac{E[|c^H Hwx(n)|^2]}{E[|c^H v(n)|^2]} = \frac{\sigma_x^2}{N_o} \frac{c^H [Hww^H H^H] c}{c^H c}.$$

For any given antenna weight vector w, the SNR $\eta(c,w)$ is maximized when the combiner c is proportional to the principal eigenvector of the rank-1 matrix $Hww^H H^H$, i.e., when:

$$c = c_{\max} \triangleq \gamma Hw$$

for any scalar $\gamma \neq 0$. Then, $$\eta(\gamma Hw, w) = \frac{\sigma_x^2}{N_o} w^H H^H Hw^H = \frac{\sigma_x^2}{N_o} w^H Rw = \frac{\sigma_x^2}{N_o} J(w),$$

also hereinafter referred to as EQN J.

Thus, with MRC, maximizing the effective SNR $\eta$ over the antenna weight vector w is equivalent to maximizing the received signal power $J(w)$, thus maximizing the Shannon channel capacity as observed by J. B. Andersen, introduced above. This forms the basis for employing beamforming as a technique to enhance the channel capacity. When the received signal power $J(w)$ is maximized subject only to the constraint $w^H w=1$, the transmitter achieves maximal ratio transmission ("MRT"), as proposed by T. K. Y. Lo, which provides the maximum channel capacity. (See, e.g., T. K. Y. Lo, "Maximum Ratio Transmission," in Proc. IEEE Int. Comm. Conf., vol. 2, (Vancouver, BC), pp. 1310-1314, Jun. 6-10, 1999, and T. K. Y. Lo, "Maximum Ratio Transmission," IEEE Trans. Comm., vol. 47, pp. 1458-1461, October 1999, which are incorporated herein by reference.)

The practical issue arising in FDD systems where the channel is unknown at the transmitter leads to proposals to feed back a quantized version of the channel information (see reference by A. Narula, et al. introduced above) or of the beamformer (see references by K. K. Mukkavilli, et al. and D. J Love, et al. introduced above), encompassing antenna selection diversity (see references by N. R. Sollenberger and A. Wittneben introduced below) as special cases. (See, e.g., N. R. Sollenberger, "Diversity and Automatic Link Transfer for a TDMA Wireless Access Link," in Proc. IEEE Global Telecom. Conf., vol. 1, (Houston, Tex.), pp. 532-536, Nov. 29-Dec. 2, 1993, and A. Wittneben, "Analysis and Comparison of Optimal Predictive Transmitter Selection and Combining Diversity for DECT," in Proc. IEEE Global Telecom. Conf., vol. 2, pp. 1527-1531, Nov. 13-17, 1995, which are incorporated herein by reference.) With respect to the present system and method, the beamformer and the channel information is not quantized. Instead, a selected (e.g., optimal) increment vector is quantized such that the beamformer retains the ability to converge to the MRT beamformer.

The case of flat fading is of special interest since it models a large class of practical wireless links. Flat fading can be used to model ordinary narrow-band channels where the signal bandwidth is small relative to the carrier frequency. Flat fading can also be employed to model each bin of a wide-band orthogonal frequency division multiplexing ("OFDM") system since each bin can be treated as a narrow-band signal. For a general frequency selective channel wherein the delay (D>0), maximizing the received signal power J(w) optimizes the received SNR, equal to $$\frac{J(w)}{N_o},$$

but does not necessarily optimize the channel capacity. In such a case, the optimal-capacity receiver employs an equalizer in which the antenna weight vector w is employed in a more complicated manner than for the MRC receiver, a linear transformation of the antenna weight vector w in:

$$c = c_{max} \triangleq \gamma H w.$$

Figure 7:
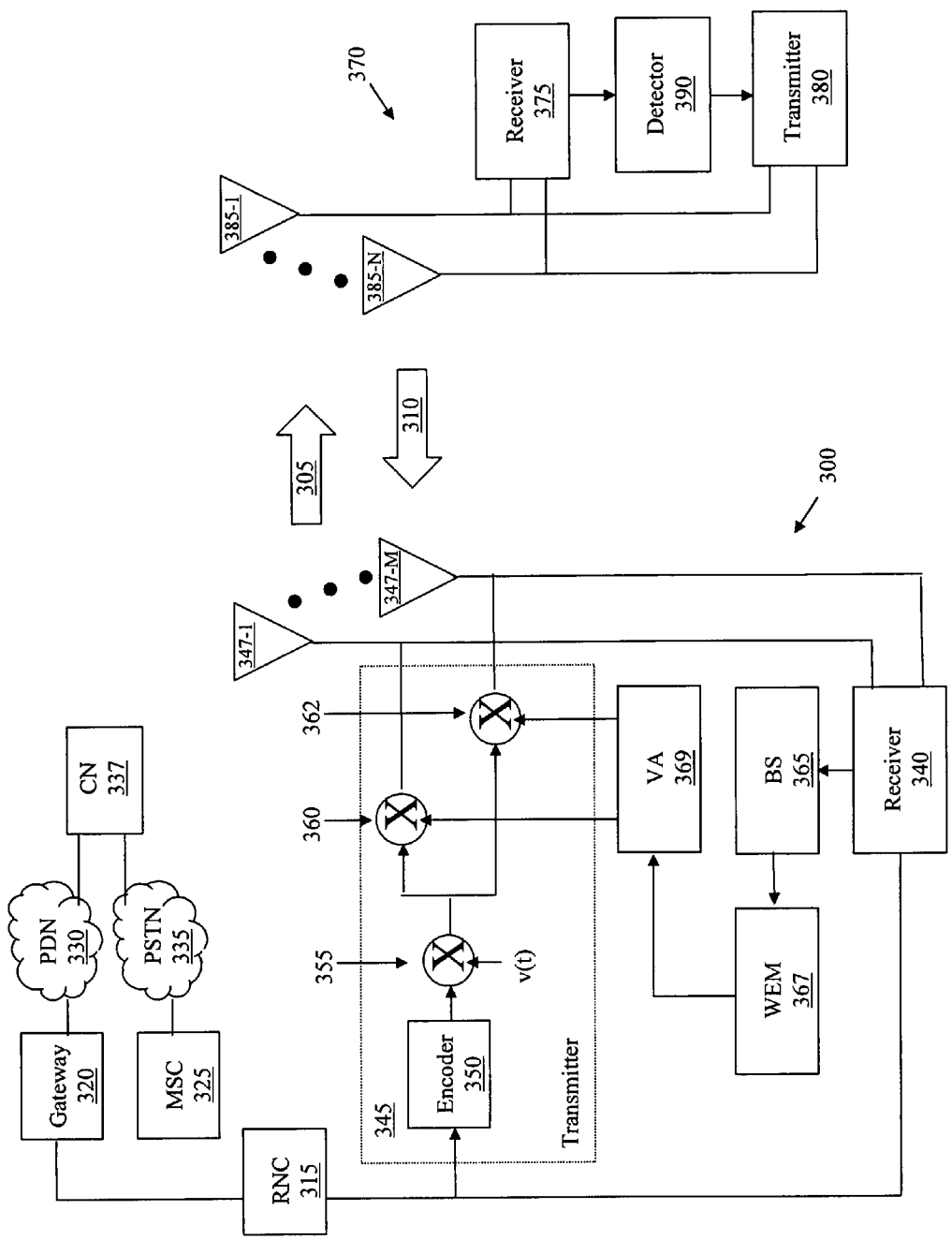
FIG. 7 illustrates a block diagram of a communication system including an embodiment of a quantized-feedback optimal adaptive beamforming system.

Referring now to FIG. 7, illustrated is a block diagram of a communication system including an embodiment of a quantized-feedback optimal adaptive beamforming system. The communication system includes a base station 300 and a receiving station (e.g., mobile station 370). The communication channels are defined by radio links such as forward-link channels 305 and reverse-link channels 310. Information sent to the mobile station 370 is communicated by the base station 300 over the forward-link channels 305 and information originated at the mobile station 370 for communication to the base station 300 is communicated over reverse-link channels 310.

The communication system may be a cellular communication system constructed pursuant to any of a number of different cellular communication standards. For instance, the base station and mobile station may be operable in a code division multiple access ("CDMA") communication system such as a third generation ("3G") CDMA communication that provides for 1xEV-DV ("EVolution, Data and Voice") data and voice communications. Those skilled in the art, however, realize that the QFOA beamforming system described herein are employable in any number of communication systems including other types of cellular communication systems such as a global system for mobile ("GSM") communications systems that provides for general packet radio service or enhanced data for GSM evolution data services, each of which also provides for data communications. The communication system is also representative of other types of radio and other communication systems in which data is communicated over channels that are susceptible to distortion caused by fading or other conditions. Those skilled in the art should understand that the principles described herein are operable in any communication system employing closed-loop transmit diversity.

The base station 300 forms part of a radio access network that also includes a radio network controller ("RNC") 315 coupled to a gateway 320 and a mobile switching center ("MSC") 325. The gateway 320 is coupled to a packet data network ("PDN") 330 such as the Internet backbone and the mobile switching center 325 is coupled to a public switched telephone network ("PSTN") 335. A correspondent node ("CN") 337 is coupled to the packet data network 330 and to the PSTN 335. The correspondent node 337 represents a data source or a data destination from which, or to which, information is routed during operation of the communication system.

The base station 300 includes a receiver 340 and a transmitter 345. A forward-link signal to be communicated by the base station 300 to the mobile station 370 is converted into a format for communication over the forward-link channels 305 by the transmitter 345. Closed-loop feedback information is returned by the mobile station 370 to the base station 300 by way of the reverse-link channels 310. The mobile station 370 also includes a receiver 375 and a transmitter 380. The receiver 375 (which may include subsystems such as a receive filter and an equalizer) operates to receive, and operate upon, the forward-link signals transmitted by the base station 300 over the forward-link channels 305, and the transmitter 380 operates to transmit reverse-link signals over the reverse-link channels 310 to the base station 300.

The base station 300 and the mobile station 370 may include multiple antennas, and the base station 300 and mobile station 370 combination forms a multiple-input, multiple-output ("MIMO") system. For purposes of clarity, the base station 300 includes M base station antennas designated 347-1 to 347-M (hereinafter referenced as base station antennas 347). Also for purposes of clarity, the mobile station 370 includes N mobile station antennas designated 385-1 to 385-N (hereinafter referenced as mobile station antennas 385). Those skilled in the art should understand, however, that any number of antennas (e.g., one receive antenna) may be employed in accordance with the principles of the present invention.

The base station transmitter 345 includes an encoder 350 that encodes data to form encoded data. The encoded data is provided [via a transmit filter (not shown)] to an up-mixer 355 with an up-mixing constant v(t) to generate an up-mixed signal. The up-mixed signal is provided via weighting elements (two of which are referenced and designated as first and second weighting elements 360, 362, respectively) on separate branches to ones of the base station antennas 347. Once the up-mixed signals are weighted, the weighted signals are applied to the base station antennas 347 for transmission to the mobile station 370. Of course, other operations may be performed on the weighted signals prior to transmission to the mobile station 370. Of course, the first and second weighting elements 360, 362 may be applied at a baseband signal level or at a higher level in the signal processing chain.

The base station 300 also includes a QFOA beamforming system that adjusts the values of the weightings applied to the first and second weighting elements 360, 362 in a manner that enhances antenna weighting selection pursuant to a closed-loop transmit diversity system. The QFOA beamforming system (which may be embodied in hardware, software, or combinations thereof) includes a beamformer selector ("BS") 365 that operates to determine an updated direction or increment vector based on a quantized increment vector (received by the receiver 340 in the base station 300) from the mobile station 370. For instance, the beamformer selector 365 may re-orthogonalize the quantized increment vector. As will become more apparent below, the quantized increment vector may be projected onto a hyperplane tangent to a constraint hypersurface thereof (e.g., re-orthogonalizes).

The QFOA beamforming system also includes a weight vector modifier ("WEM") 367 that modifies a tangential component of the weight vectors selected by the beamformer selector 367, which are provided to a vector applicator ("VA") 369 for application to the first and second weighting elements 360, 362. For instance, the weight vector modifier 367 calculates an antenna weight vector by adding an increment (e.g., of a magnitude of less than unit length) to a previous antenna weight vector proportional to the re-orthogonalized quantized increment vector and renormalizes the antenna weight vector to unit length ("unit magnitude"). Since the increment vector points in a direction that yields a sufficient gradient of the objective function subject to the constraint, the convergence speed is improved. The weightings of the first and second weighting elements 360, 362 determine the values of the signals transmitted by the base stations antennas 347. The forward-link signals generated on the forward-link channels 305 are delivered to the mobile station 370.

The mobile station 370 includes a detector 390 (which may include subsystems such as a combiner and may be a subsystem of the receiver 375) that detects and measures characteristics (e.g., representing power levels) of the forward-link signals (in accordance with the pilot signals thereof) transmitted by the base station 300. For instance, the detector 390 may measure a downlink channel correlation matrix for the base station antennas 347 from pilot signals. The detector 390 may measure the downlink channel correlation matrix from a discrete-time channel impulse response between the base station antennas 347 and the mobile station antenna(s) 385. More specifically, the detector 390 adapts a transmit vector by computing a direction of preferable adaptation and feeds the quantized increment vector (e.g., one bit) back to the base station 300.

The detector 390 may also compute an increment vector normal to a previous antenna weight vector rendering positive (e.g., maximize) a directional derivative of total received power from the base station antennas 347, and quantize the increment vector component by component to produce a quantized increment vector (e.g., via a uniform quantizer). The quantized increment vector is thereafter employed by the base station 300 to adjust the weightings of the first and second weighting elements 360, 362 for the base station antennas 347 to refine the forward-link signals. Of course, the quantized increment vector may adjust the weightings of any number of weighting elements depending on the number of base station antennas. The QFOA beamforming system is an adaptive system and the aforementioned steps may be repeated several times to adapt the transmit antenna weights towards an optimal or preferable solution depending on the communication system and application.

Figure 8:
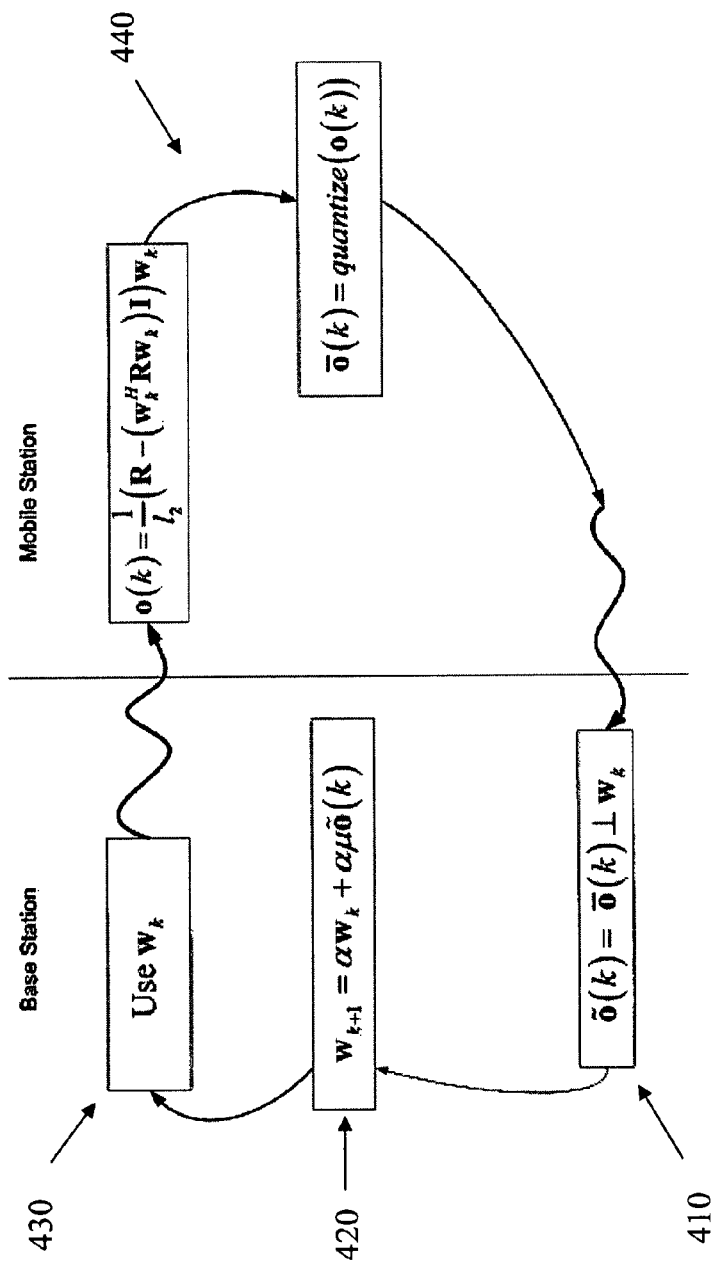
FIG. 8 illustrates a functional block diagram of an embodiment of a quantized-feedback optimal adaptive beamforming system.

Turning now to FIG. 8, illustrated is a functional block diagram of an embodiment of a QFOA beamforming system. While the support for the functional blocks will be described in more detail below, an outline of the respective functions will hereinafter be provided. Beginning with the sending station, a beamforming selector 410 determines an updated direction or increment vector based on a quantized increment vector received from a receiving station. The quantized increment vector may be projected onto a hyperplane tangent to a constraint hypersurface thereof. A weight vector modifier 420 modifies a tangential component of the weight vectors selected by the beamformer selector 410, which are provided to a vector applicator 430 for application of the weight vectors. Regarding the receiving station, a detector 440 adapts a transmit vector by computing a direction of preferable adaptation and feeds a quantized increment vector back to the sending station.

With respect to the beamforming system and method, due to the transmit power limitation, the beamformer should satisfy the scalar constraint $g(w)=0$, where the constraint function $g(w)$ is defined as:

$$g(w) \triangleq 1 - w^H w.$$

An objective is to develop an adaptive solution for the maximization problem:

$$w\max \triangleq \underset{w \in S_g}{\operatorname{argmax}} J(w),$$

where:

$$S_g \triangleq \{w : g(w) = 0\}.$$

Suppose that the antenna weight vector $w(k)$ denotes a solution at the k-th step of the adaptation. The time variable k also indexes the "slots" of a transmission wherein the duration of each slot is on the order of the channel coherence time sufficiently long for all channel estimation and pilot tracking purposes. This adaptation is governed by two conditions, one of which is:

$$w(k) \in S_g, \forall k.$$

The other condition is that the antenna weight vector $w(k+1)$ should be related to the antenna weight vector $w(k)$ in such a way that the received signal power $J(w)$ has an "optimal" increase from the antenna weight vector $w=w(k)$ to the antenna weight vector $w=w(k+1)$. In the unconstrained optimization problem, it is well known that the antenna weight vector $w(k+1)$ can be obtained by adding to the antenna weight vector $w(k)$ a scaled version of the gradient of the received signal power $J(w)$. In other words, for some constant step size $\mu$, the antenna weight vector is $w(k+1)=w(k)+\mu \nabla_w{}^H J(w(k))$, commonly known as the steepest gradient ascent algorithm. The presence of the constraint $w(k) \in S_g \forall k$ renders the direct use of the steepest gradient ascent algorithm principally inapplicable. Indeed, the antenna weight vector $w(k+1)$ could be normalized at each step, but apparently this process has no mechanism to prevent the received signal power $J(w)$ from decreasing between time k and time k+1.

To proceed, the concept of directional derivative is employed for a real-valued scalar function. For any real-valued vector $\Theta \in R^{2M}$ (which denotes a Euclidean real vector space with 2M dimensions) and a real-valued scalar function $f(\Theta)$, the directional derivative of $f(\Theta)$ in the direction of a real-valued unit vector $v \in R^{2M}$ is given by:

$$D_v f(\Theta) = \nabla_\Theta f(\Theta) v.$$

It should be noted by convention, $\nabla_\Theta f(\Theta)$ is a row vector and $\nabla_\Theta^T f(\Theta)$ is a column vector.

Extending this result to a real-valued scalar function with complex input arguments, the directional derivative of any real-valued scalar received signal power $J(w)$ in the direction of a complex unit vector $o \in C^M$ (which denotes a Euclidean complex vector space with M dimensions) is given by:

$$D_o J(w) = o^H \nabla_{w^H} J(w) + \nabla_w J(w) o,$$

referred to as EQN A. It should be noted by convention, $\nabla_w J(w)$ is a row vector and $\nabla_{w^H} J(w)$ is a column vector. By extending the real-valued scalar function with complex input arguments, the received signal power $J(w) = f(\Theta)$ has been expressed as a function of the real-valued vector:

$$\Theta = [w_{Re}^T, w_{Im}^T]^T,$$

wherein the quantities subscripted by $R_e$ and $I_m$ denote the real and imaginary parts of the associated quantity, respectively. Then, $D_o J(w)$ is defined as the directional derivative of $f(\Theta)$ in the direction of:

$$v = [o_R^T, o_I^T]^T.$$

That is:

$$D_o J(w) \overset{\Delta}{=} D_v f(\Theta),$$

referred to as EQN B.

The result provided by EQN A follows from EQN B by employing the Wirtinger complex calculus (see, P. Henrici, "Applied and Computational Complex Analysis," vol. III, pp. 287-288, New York, N.Y.: Wiley & Sons, 1986, which is incorporated herein by reference), wherein the operator identities:

$$\frac{\partial}{\partial w} = \frac{1}{2}\left(\frac{\partial}{\partial w_R} - j\frac{\partial}{\partial w_I}\right),$$

and $$\frac{\partial}{\partial w^*} = \frac{1}{2}\left(\frac{\partial}{\partial w_R} + j\frac{\partial}{\partial w_I}\right)$$

yield results consistent with separate differentiation regarding the real and imaginary parts and allow the treatment of the antenna weight vectors $w$ and $w^*$ as independent variables, i.e., $$\frac{\partial w}{\partial w} = I,$$

and $$\frac{\partial w}{\partial w^*} = 0.$$

The term $S_g$ is the closed set that defines a constraint surface with a unit-radius hypersphere centered at the origin. Therefore, if the tail of the antenna weight vector $w(k)$ is held at the origin of $C^M$, then as the time $k \to \infty$, the head of the antenna weight vector $w(k)$ leaves a series of "headprints" on the surface of the hypersphere. The antenna weight vector $w(k+1)$ is obtained by pulling the head of the antenna weight vector $w(k)$ to a close neighboring point on the surface of the hypersphere in a direction tangent to an equal-level surface (a constraint function) $g(w) = 0$. Then, the direction in which the pull results in the steepest rate of increase in the received signal power $J(w)$ is some increment vector $o(k)$ that is tangential to the constraint surface $S_g$ when the antenna weight vector $w = w(k)$ and results in the largest directional derivative, i.e., $$o(k) = \underset{o}{\mathrm{argmax}}\, D_o J(w(k))$$
$$= \underset{o}{\mathrm{argmax}}[o^H R w(k) + w^H(k) R o],$$

subject to:

$o^H w(k) = 0$, referred to as constraint A, and $1 - o^H o = 0$, referred to as constraint B.

The constraint A provides that the increment vector $o$ is tangent to the equal-level surface $g(w) = 0$ when the antenna weight vector $w = w(k)$. To see this, the increment vector $o$ should be orthogonal to the gradient of the equal-level surface $g(w)$, that is $0 = o^H \nabla_{w^H} g(w(k)) = -o^H w(k)$, resulting in constraint A. The constraint B is the usual condition for the unit increment vector involved in the definition of directional derivative. Thus, the increment vector $o(k)$ can be obtained by solving for increment vector $o$ in the Lagrange equation:

$$Rw(k) = l_1 w(k) - l_2 o,$$

subject to the constraints A and B, where $l_1$ and $l_2$ are the Lagrange multipliers. If the antenna weight vector $w(k)$ is not an eigenvector of the channel correlation matrix R, then the increment vector is given by:

$$o(k) = \frac{1}{l_2}[R - (w^H(k) R w(k)) I_M] w(k)$$

referred to as EQN C, where:

$$l_2 = \sqrt{w^H(k) R^2 w(k) - [w^H(k) R w(k)]^2}$$

referred to as RELN A.

The case where the iterative antenna weight vector $w(k)$ is an eigenvector of the channel correlation matrix R, though very unlikely to occur, will hereinafter be addressed. It should be noted that the result given by EQN C is available at the receiver. Inasmuch as the receiver is a forward-link receiver, the parameters to calculate the increment vector $o(k)$ described in EQNC are known or can be determined thereby. In order to make this information partially available at the transmitter, a quantized version of the increment vector $o(k)$ is sent back to the transmitter via a feedback channel. Of course, several quantization schemes are possible.

Quantization Scheme I. A good quantization method is to simply take the sign of the real and imaginary part of each vector component separately, yielding the quantized vector:

$$\bar{o}(k) = \frac{s_R(k) + js_I(k)}{\sqrt{2M}},$$

referred to as EQN D, where:

$$s_R(k) \triangleq \text{sign}(o_R(k))$$
$$s_I(k) \triangleq \text{sign}(o_I(k)).$$

Note that sign(·) returns a vector whose components are the signs of the individual components of the real-valued vector argument so that each component of sign(x) is either +1 or −1 for any real-valued vector x. Here, as described above, we again use the convention sign(0)=1.

Quantization Scheme II. The above quantization can be generalized to a denser quantization where b bits are used to represent the real or imaginary parts of each component of the increment vector o(k). The quantization set is defined as:

$$Q \triangleq \{-q_{2^{b-1}-1}, \ldots, -q_1, -q_0, q_0, q_1, \ldots, q_{2^{b-1}-1}\}$$

which consists of $2^b$ points on the real-number axis and symmetric about the origin. Without loss of generality, it is assumed that:

$q_m < q_n, \forall m < n.$

Since the quantization set Q is used to quantize a number in the closed interval [−1, 1], the following constraint is imposed:

$0 < q_{2^{b-1}-1} \leq 1.$

If the following quantization levels are used:

$$q_i = \frac{2i+1}{2^b-1}, i = 0, 1, \ldots, 2^{b-1}-1,$$

referred to as RELN B, then the quantization set Q consists of $2^b$ uniformly spaced points between and including −1 and +1, resulting in a uniform quantization. However, it is perhaps more preferable to design the quantization levels $q_i$ as a function of i such that the quantization set Q has a higher concentration toward zero, i.e., $q_{i+1}-q_i \geq q_i-q_{i-1}$, to match the distribution of the real and imaginary parts of the components of the increment vector o(k).

The quantization of the increment vector (referred to as a quantized increment vector) o(k) is given by:

$$\bar{o}(k) = \frac{q(o_R(k)) + jq(o_I(k))}{\|q(o_R(k)) + jq(o_I(k))\|},$$

referred to as EQN E, where the quantization level q(x) is a component-wise quantizer and has the same dimensions as x for any real-valued vector x. The l-th element of the quantization level q(x) is obtained by quantizing the l-th element of x to the closest element in the quantization set Q, i.e., $$\{q(x)\}_l = \underset{v \in Q}{\arg\min} |x_l - v|,$$

where $x_l$ is the l-th element of x. When b=1 and with uniform distribution as represented by RELN B, the quantization of EQN E reduces to the sign quantization of EQN D.

Quantization Scheme III. The above quantization scheme can be further generalized. The real and/or imaginary part of one or more components of the increment vector o(k) can be quantized to its sign, or to any value that has its sign. In particular, if either the real or imaginary part of only one component of the increment vector o(k) is quantized to its sign, a one-bit feedback scheme is achieved. The fact that the QFOA beamforming system provides this widely flexible quantization scheme represents an advantage over other presently available systems.

The information that is sent back to the transmitter is the bits that represent the quantized increment vector $\bar{o}(k)$. At this point, the transmitter and the receiver both know the quantized increment vector $\bar{o}(k)$ and the antenna weight vector w(k). However, unlike the increment vector o(k), the quantized version $\bar{o}(k)$ thereof may no longer be orthogonal to the antenna weight vector w(k). Nonetheless, at both the transmitter and the receiver, the following may be obtained:

$$\tilde{o}(k) = \frac{\bar{o}(k) - [w^H(k)\bar{o}(k)]w(k)}{\sqrt{1 - |w^H(k)\bar{o}(k)|^2}},$$

referred to as EQN F, which is a unit vector re-orthogonalized to the antenna weight vector w(k) and approximates the direction of the increment vector o(k). As described below, the above quantization schemes (including the case of 1-bit feedback) will satisfy global convergence.

For completeness, the case where the antenna weight vector w(k) is an eigenvector of the channel correlation matrix R will hereinafter be addressed. In this case, REL A gives $l_2=0$ and EQN C yields an indeterminate vector of the form $$\frac{0}{0}.$$

However, from:

$$o(k) = \underset{o}{\arg\max}\, D_o J(w(k))$$
$$= \underset{o}{\arg\max}\, [o^H Rw(k) + w^H(k)Ro],$$

if the antenna weight vector w(k) is an eigenvector of the channel correlation matrix R, then the directional derivative is zero in any direction tangent to the equal-level surface g(w)=0 when the antenna weight vector w=w(k) since this direction is orthogonal to the antenna weight vector w(k). Therefore, any unit increment vector o(k) orthogonal to the antenna weight vector w(k) is acceptable to pull the antenna weight vector w(k+1) away from any local stationary point. There are infinitely many such vectors and herein are listed several thereof. Let $1 \leq m < n \leq M$ such that the antenna weight vectors $w_m(k) \neq 0$ and $w_n(k) \neq 0$, wherein the antenna weight vector $w_i(k)$ denotes the i-th component of the antenna weight vector $w(k)$. Then, $$o(k) = \frac{\begin{bmatrix} o_1(k), \ldots, o_{m-1}(k), -w_n(k), o_{m+1}(k), \ldots, \\ o_{n-1}(k), w_m(k), o_{n+1}(k), \ldots, o_M(k) \end{bmatrix}^H}{\sqrt{|w_m(k)|^2 + |w_n(k)|^2}},$$

referred to as EQN G, is an acceptable candidate, wherein the increment vector $o_i(k)=0$ for $i \neq m,n$. Note that the antenna weight vector $-w_n(k)$ is placed at the m-th position and the antenna weight vector $w_m(k)$ is put at the n-th position. If M is even, then:

$$o(k)=[-w_2(k), w_1(k), \ldots, -w_4(k), w_3(k), \ldots, -w_M(k), w_{M-1}(k)]^H,$$

referred to as EQN H is another acceptable candidate. After the selection of the increment vector $o(k)$, the quantization process above can be employed to obtain the increment vector $\tilde{o}(k)$.

Once the increment vector $\tilde{o}(k)$ is available, the updated beamformer is given by:

$$w(k+1)=\alpha w(k)+\mu\tilde{o}(k),$$

referred to as EQN I, wherein $\mu \in (0, 1]$ represents the step size and $$\alpha = \frac{1}{\sqrt{1+\mu^2}}.$$

Figure 9:
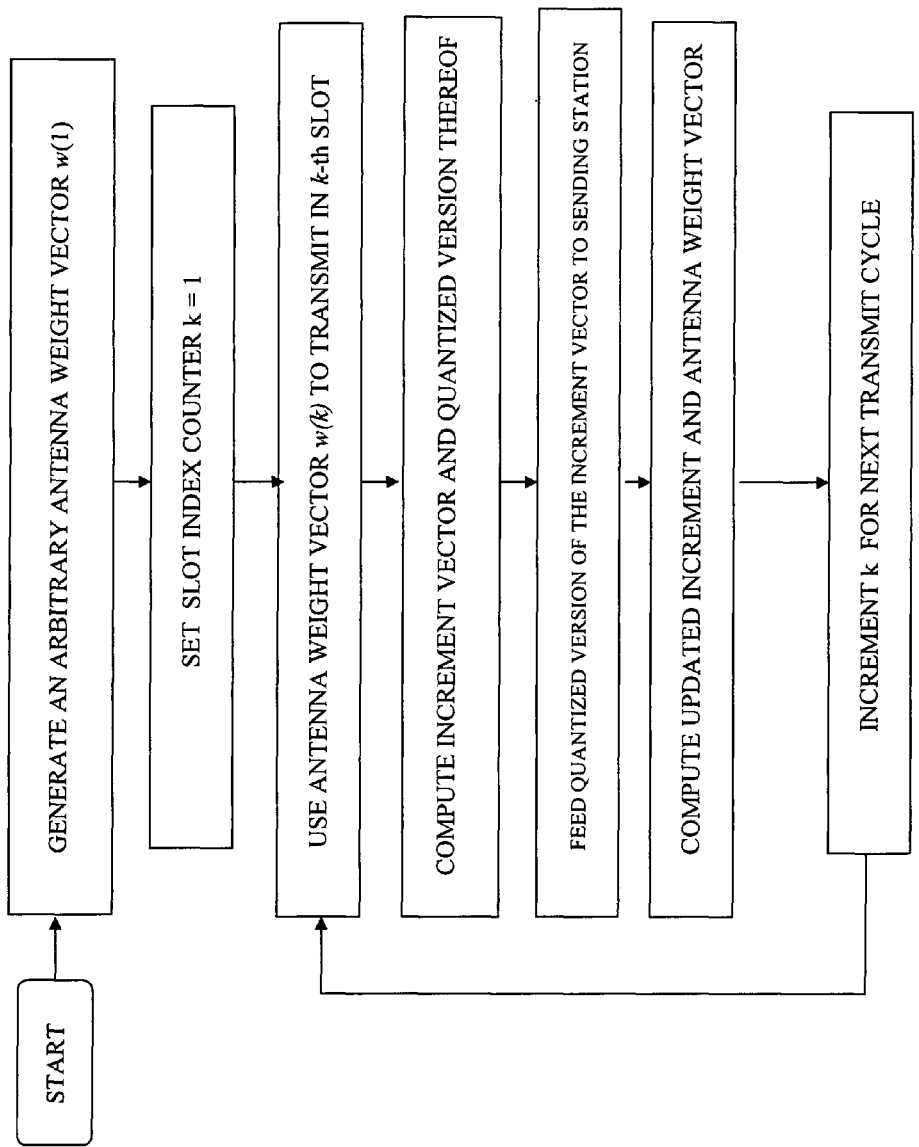
FIG. 9 illustrates a flow diagram of an embodiment of a method of operating a quantized-feedback optimal adaptive beamforming system.
Figure 10:
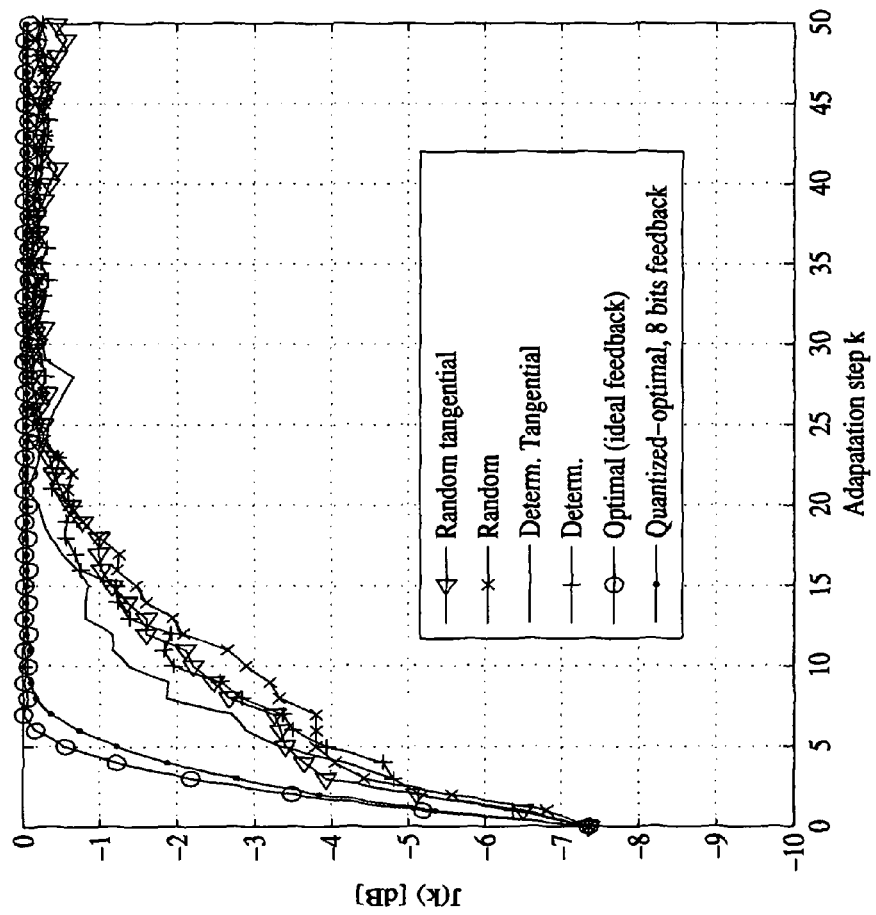
FIGS. 10 to 13 illustrate graphical representations comparing exemplary instances of an evolution of received signal power for a randomly realized static channel, including representations of a quantized-feedback optimal adaptive beamforming system.
Figure 11:
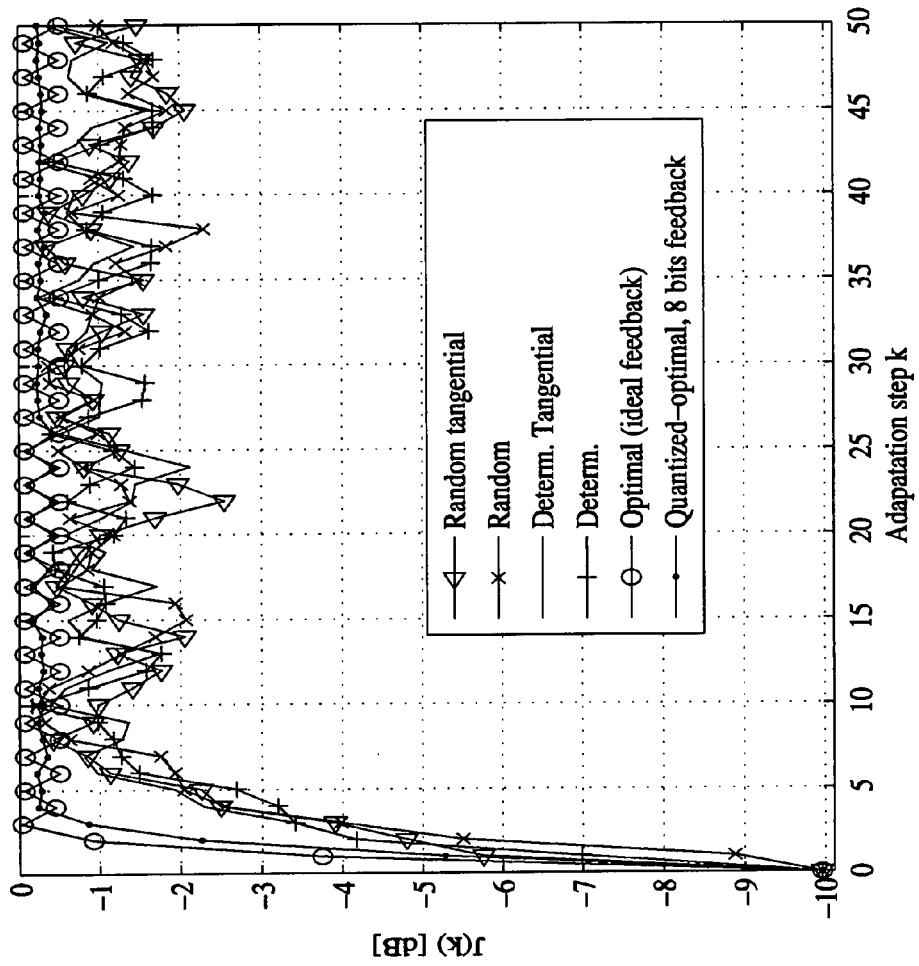
Figure 12:
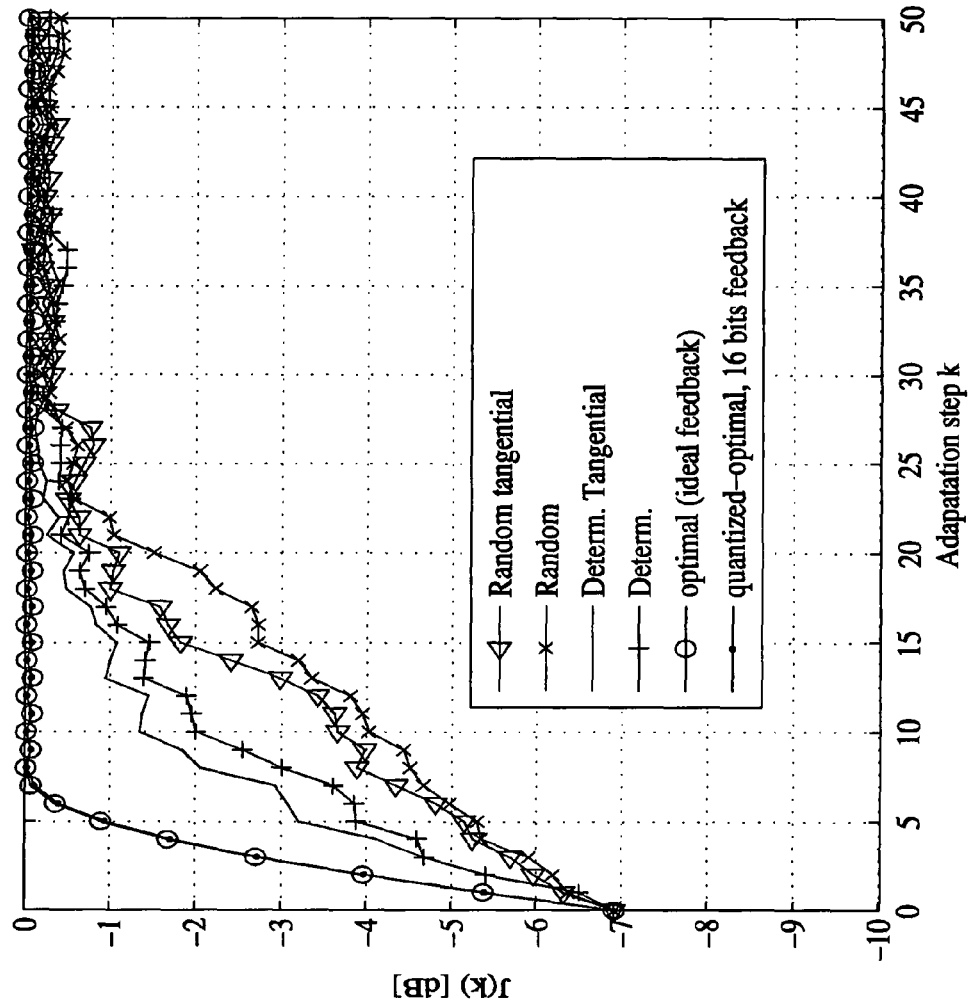
Figure 13:
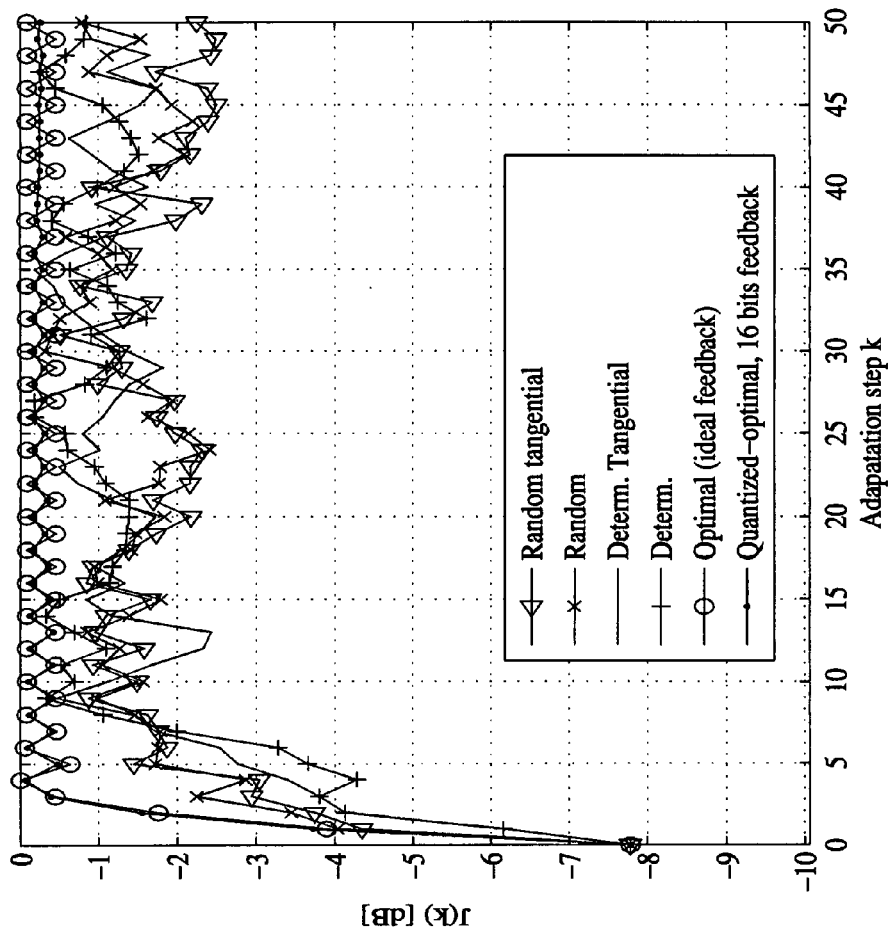

Thus, the QFOA beamforming system and method are summarized with respect to the flow diagram of FIG. 9 and with a base station with M transmit antennas and mobile station with N receive antennas as set forth below.

1. Generate an arbitrary initial base station antenna weight vector $w(1)$ with $\|w(1)\|=1$ according to a pre-determined procedure. An equal gain beamformer is a recommendable candidate.

2. Set the time $k=1$.

3. Use the "previous" antenna weight vector $w(k)$ to transmit the k-th time slot. At the mobile station, the channel correlation matrix R is measured from pilot signals, e.g., using the discrete-time channel impulse response between transmit antennas and receive antenna(s).

4a. If the antenna weight vector $w(k)$ is not an eigenvector of channel correlation matrix R, the mobile station computes the antenna weight increment vector $o(k)$ according to EQN C and RELN A. The antenna weight increment vector $o(k)$ maximizes, or in an alternative embodiment, renders positive a directional derivative of total received power at the receiving antenna from the multiple antennas of the base station under the constraints that the antenna weight increment vector $o(k)$ is of unit length and is tangent to the equal-level surface $g(w)=0$ at $w=w(k)$, i.e., it is normal to the antenna weight vector $w(k)$. As will be clarified later, the antenna weight vector $w(k)$ is an eigenvector of the channel correlation matrix R if and only if $l_2=0$ in RELN A. If $l_2=0$, then the antenna weight increment vector $o(k)$ can be selected as any vector orthogonal to antenna weight vector $w(k)$, several candidates of which are listed in EQNs G and H.

4b. A quantized version $\bar{o}(k)$ of the antenna weight increment vector $o(k)$ is obtained according to EQN E, or according to EQN D, if $b=1$, where b is the number of bits. The quantization of the antenna weight increment vector $o(k)$ is performed component by component. In a preferred embodiment, a uniform quantizer is employed. Alternatively, a non-uniform quantizer is employed.

5. The bits that represent the quantized increment vector $\bar{o}(k)$ are sent back to the base station. At this point, the base station and the mobile station both know the quantized antenna weight increment vector $\bar{o}(k)$ and the antenna weight vector $w(k)$.

6a. The base station and the mobile station "re-orthogonalize" the quantized increment vector $\bar{o}(k)$ to the antenna weight vector $w(k)$ to produce the re-orthogonalized (and re-normalized to unit length) antenna weight increment vector $\tilde{o}(k)$ according to EQN F.

6b. A new (i.e., of unit magnitude, $w^H w=1$) antenna weight vector $w(k+1)$ is computed from the antenna weight vector $w(k)$ by the base station and the mobile station according to EQN I using a step size $\mu$. The new normalized antenna weight vector is computed by adding the step size $\mu$ times the re-orthogonalized quantized increment vector $\tilde{o}(k)$ to the antenna weight vector, i.e., an increment that is proportional to the re-orthogonalized quantized antenna weight increment vector $\tilde{o}(k)$ is added to the antenna weight vector. The resulting new antenna weight vector is scaled by a normalizing factor so that it is of unit magnitude. The step size $\mu$ is preferably selected in the range $0 < \mu \leq 1$, i.e., the length of the increment added to the antenna weight vector $w(k)$ is positive but preferably less than or equal to unity. In a preferred embodiment, the step size $\mu$ is a constant which can be readily determined by simulation or by experiment in view of the application. Exemplary values of the step size $\mu$ are 0.2 and 0.5.

7. Then, increment the time k to $k+1$ and loop back to step (3) to repeat the procedure for the next slot.

The QFOA beamforming methodology as described herein is a time-recursive solution to an optimization problem:

$$w_{opt} = \arg\max_{w} w^H R w,$$

subject to the equal-level surface $g(w)=0$. Using a Lagrange multiplier method, the local maximizers $w_i$, $i=1, 2, \ldots, M$, satisfy:

$$R w_i = \lambda_2 w_i.$$

Therefore, the $\lambda_i$'s are the eigenvalues of the channel correlation matrix R and the antenna weight vectors $w_i$'s are the corresponding eigenvectors of the channel correlation matrix R. Since the channel correlation matrix R is a nonnegative definite Hermitian matrix, then, as described previously hereinabove for the tangential perturbation gradient system:

$\lambda_i > 0$ for all i, and $R = W \Lambda W^H,$ where:

$W = [w_1, w_2, \ldots, w_M]$, and $\Lambda = \mathrm{diag}(\lambda_1, \lambda_2, \ldots, \lambda_M).$ Again, it is customary to arrange the eigenvalues and the eigenvectors such that $\lambda_1 \geq \lambda_2 \geq \ldots \geq \lambda_M$. Further, W satisfies $W W^H = I_m$.

In the following, several properties of the methodology are examined that provide global convergence. That is, the time $k \to \infty$ and the antenna weight vector $w(k) \to w_{max}$ where $w_{max}$ is an eigenvector of the channel correlation matrix R belonging to the maximum eigenvalue $\lambda_i$ and the received power signal $J(w(k)) \to \lambda_1$.

Lemma 1: For any antenna weight vector $w(k)$, there holds:

$$D_{o(k)}J(w(k)) \geq 0,$$

referred to as RELN C. The equality holds if the antenna weight vector $w(k)$ is an eigenvector of the channel correlation matrix R. By proof:

$$D_{o(k)}J(w(k)) = \frac{2}{l_2}\{w^H(k)R^2w(k) - [w^H(k)Rw(k)]^2\}$$
$$= 2l_2$$
$$= 2\|[R - (w^H(k)Rw(k))I_M]w(k)\|$$
$$\geq 0$$

It is obvious that the aforementioned equality holds and $l_2=0$ if the antenna weight vector $w(k)$ is an eigenvector of the channel correlation matrix R.

The increment vector that directly affects the beamformer update is increment vector $\tilde{o}(k)$ (see EQN F). Since the increment vector $\tilde{o}(k)$ is obtained via a quantization process, a question arises as to whether the directional derivative of the received signal power $J(w)$ in the direction of increment vector $\tilde{o}(k)$ is still nonnegative as the directional derivative in the direction of the increment vector $o(k)$. This question is answered in the following lemma, which indicates that the inequality $D_{o(k)}J(w(k)) \geq 0$ still holds with the increment vector $o(k)$ replaced by the increment vector $\tilde{o}(k)$.

Lemma 2: For any antenna weight vector $w(k)$, the directional derivative of the received signal power $J(w)$ in the direction of the increment vector $\tilde{o}(k)$ is nonnegative, i.e.:

$$D_{\tilde{o}(k)}J(w(k)) \geq 0.$$

The equality holds if the antenna weight vector $w(k)$ is an eigenvector of the channel correlation matrix R. To prove the aforementioned, it is noted that for any real-valued vector x, $$x^T q(x) \geq 0, \text{ for } x=0,$$

wherein the quantization level $q(x)$ is such that $\text{sign}(\{q(x)\}_i) = \text{sign}(x_i)$. The quantization schemes described above satisfy the aforementioned property. For the case where the antenna weight vector $w(k)$ is not an eigenvector of the channel correlation matrix R, the following are defined as set forth below:

$$o_R \triangleq \Re\{o(k)\} = \frac{1}{l_2}[R_R w_R(k) - R_I w_I(k) - l_1 w_R(k)],$$

$$o_I \triangleq \Im\{o(k)\} = \frac{1}{l_2}[R_I w_R(k) + R_R w_I(k) - l_1 w_I(k)],$$

$$c \triangleq \|q(o_R) + jq(o_I)\|,$$

$$\sigma \triangleq \sqrt{1 - |w^H(k)\bar{o}(k)|^2},$$

where:

$$l_1 = w^H(k)Rw(k)$$

is the first Lagrange multiplier in $Rw(k) = l_1 w(k) - l_2 o$. The operators $\Re\{\cdot\}$ and $\Im\{\cdot\}$ return the real and imaginary parts of the argument, respectively. With some algebra, it can shown that:

$$D_{\tilde{o}(k)}J(w(k)) = 2\Re\{w^H(k)R\tilde{o}(k)\}$$
$$= \frac{2l_2}{c\sigma}[o_R^T q(o_R) + o_I^T q(o_I)]$$
$$> 0.$$

wherein the strict inequality holds due to $x^T q(x) \geq 0$ and the fact that the increment vector $o(k) \neq 0$. If the antenna weight vector $w(k)$ is an eigenvector of the channel correlation matrix R, then from the above relationship it is clear that $D_{o(k)}J(w(k))=0$ for any increment vector $\tilde{o}(k)$ tangent to the equal-level surface $g(w)=0$ when the antenna weight vector $w=w(k)$.

In support thereof, if $D_{\tilde{o}(k)}J(w(k))=0$, then the antenna weight vector $w(k)$ is an eigenvector of the channel correlation matrix R. The aforementioned relationship can be proved by contradiction. Suppose the antenna weight vector $w(k)$ is not an eigenvector of the channel correlation matrix R. From the following:

$$D_{\tilde{o}(k)}J(w(k)) = 2\Re\{w^H(k)R\tilde{o}(k)\}$$
$$= \frac{2l_2}{c\sigma}[o_R^T q(o_R) + o_I^T q(o_I)],$$

the values of $o_R=o_I=0$, which leads to the increment vector $o(k)=0$. As a result of:

$$o(k) = \frac{1}{l_2}[R - (w^H(k)Rw(k))I_M]w(k),$$

then, $$Rw(k) = l_1 w(k),$$

which holds if the antenna weight vector $w(k)$ is an eigenvector of the channel correlation matrix R, which, of course, contradicts the hypothesis that the antenna weight vector $w(k)$ is not an eigenvector of the channel correlation matrix R.

The above lemmas reveal the gradient-ascent behavior of the QFOA beamforming system. Therefore, the system converges to an eigenvector of the channel correlation matrix R (i.e., a local maximum of the received signal power $J(w)$). Furthermore, the QFOA beamforming system preferably converges to the global maximum due to the structure of the objective function of the received signal power $J(w)$. It turns out that the received signal power $J(w)$ has no local maximum over the constraint set $S_g$. This is verified by the following lemma.

Lemma 3: If $\lambda_1 > \lambda_i > \lambda_M$, then the antenna weight vector $w_i$ is a saddle point of the received signal power $J(w)$ over the constraint set $S_g$. It is first noted that the antenna weight vector $w_i$ is a stationary point of the received signal power $J(w)$ over the constraint set $S_g$. This is due to the fact that the directional derivative of the received signal power $J(w)$ in the direction of $v_i$ is zero, where $v_i$ is any unit vector parallel to the hyperplane tangent to the constraint set $S_g$ at the antenna weight vector $w = w_i$. Indeed, since the antenna weight vector $w_i = -\nabla_{w^H} g(w_i)$ which is orthogonal to the equal-level surface $g(w)=0$, then $v_i^H w_i = 0$. Hence, the directional derivative of the received signal power $J(w)$ in the direction of $v_i$ at the antenna weight vector $w = w_i$ is:

$$D_{v_i} J(w_i) = v_i^H \nabla_{w^H} J(w_i) + \nabla_w J(w_i) v_i = v_i^H \lambda_i w_i + w_i^H \lambda_i v_i = 0$$

which establishes that the antenna weight vector $w_i$ is a stationary point of the received signal power $J(w)$ over the constraint set $S_g$. Next, it will be established that the antenna weight vector $w_i$ is neither a local maximum point nor a local minimum point of the received signal power $J(w)$ over the constraint set $S_g$. Since the received signal power $J(w)$ is analytic in the antenna weight vector w and continuous over the constraint set $S_g$, it is sufficient to show that there exist vectors e and f with arbitrarily small magnitudes such that:

$w_i + e \in S_g$, $w_i + f \in S_g$, $J(w_i + e) > J(w_i)$, and $J(w_i + f) < J(w_i)$.

Such vectors indeed exist. For example, for any complex scalars $e_1, e_2, \ldots, e_{i-1}$, with $e_1 \neq 0$, and for any complex scalars $f_{i+1}, f_{i+2}, \ldots, f_M$ with $f_M \neq 0$, if:

$$e = \frac{e_1 w_1 + e_2 w_2 + \ldots + e_{i-1} w_{i-1} + w_i}{\sqrt{|e_1|^2 + |e_2|^2 + \ldots + |e_{i-1}|^2 + 1}} - w_i, \text{ and}$$

$$f = \frac{w_i + f_{i+1} w_{i+1} + f_{i+2} w_{i+2} + \ldots + f_M w_M}{\sqrt{1 + |f_{i+1}|^2 + |f_{i+2}|^2 + \ldots + |f_M|^2}} - w_i,$$

then the following hold:

$w_i + e \in S_g$, $w_i + f \in S_g$.

Note that $\|e\| \to 0$ as $e_k \to 0$, $k = 1, 2, \ldots, i-1$, and $\|f\| \to 0$ as $f_l \to 0$, $l = i+1, i+2, \ldots, M$. Also, the relationships as set forth below:

$$J(w_i + e) = \frac{|e_1|^2 \lambda_1 + |e_2|^2 \lambda_2 + \ldots + |e_{i-1}|^2 \lambda_{i-1} + \lambda_i}{|e_1|^2 + |e_2|^2 + \ldots + |e_{i-1}|^2 + 1} > \lambda_i$$

$$= J(w_i),$$

$$J(w_i + f) = \frac{\lambda_i + |f_{i+1}|^2 \lambda_{i+1} + |f_{i+2}|^2 \lambda_{i+2} + \ldots + |f_M|^2 \lambda_M}{1 + |f_{i+1}|^2 + |f_{i+2}|^2 + \ldots + |f_M|^2} < \lambda_i$$

$$= J(w_i)$$

respectively satisfy:

$J(w_i + e) > J(w_i)$, and $J(w_i + f) < J(w_i)$.

From the above lemmas, it can be seen that for the component-wise quantization defined by:

$$\bar{o}(k) = \frac{q(o_R(k)) + jq(o_I(k))}{\|q(o_R(k)) + jq(o_I(k))\|},$$

-continued $$\{q(x)\}_l = \underset{v \in Q}{\mathrm{argmin}} |x_l - v|, \text{ and}$$

$$Q \triangleq \{-q_{2^{b-1}-1}, \ldots, -q_1, -q_0, q_0, q_1, \ldots, q_{2^{b-1}-1}\},$$

that the directional derivative $D_{\bar{o}(k)} J(w(k))$ is nonnegative. Further, the sufficient condition for $D_{\bar{o}(k)} J(w(k)) \geq 0$ does not necessarily require component-wise quantization as described by:

$$\{q(x)\}_l = \underset{v \in Q}{\mathrm{argmin}} |x_l - v|.$$

As a result, the following lemma can be viewed as a corollary of lemma 2.

Lemma 4 (quantization design criterion):

Let $\overline{O}(k) \triangleq [\bar{o}_R^T(k), \bar{o}_I^T(k)]^T$ be the quantized version of $$O(k) \triangleq [o_R^T(k) o_I^T(k)]^T$$

via a quantizer $Q_k(\cdot)$, i.e., $\overline{O}(k) = Q_k(O(k))$. For any nonzero $O(k) \in R^{2M}$, let $O_i(k)$ and $\{Q_k(O(k))\}_i$ respectively denote the i-th components of $O(k)$ and $Q_k(O(k))$, $i = 1, 2, \ldots, 2M$. Let $S_k$ be any nonempty subset of $\{1, 2, \ldots, 2M\}$ such that $O_i(k) \neq 0$ for all $i \in S_k$. If $\{Q_k(O(k))\}_i O_i(k) > 0$ for all $i \in S_k$ and $\{Q_k(O(k))\}_i = 0$ for all $i \notin S_k$, then $D_{\bar{o}(k)} J(w(k)) \geq 0$, with equality if and only if the antenna weight vector $w(k)$ is an eigenvector of the channel correlation matrix R. The result follows from:

$$D_{\bar{o}(k)} J(w(k)) = 2\Re\{w^H(k) R \bar{o}(k)\}$$

$$= \frac{2l_2}{c\sigma} [o_R^T q(o_R) + o_I^T q(o_I)].$$

This lemma implies that the number of feedback bits can be arbitrary and, hence, adaptable while maintaining the inequality $D_{\bar{o}(k)} J(w(k)) \geq 0$. For instance, one or more nonzero components of $O(k)$ can be quantized to their respective signs and the remaining components quantized to zero according to a predefined protocol which selects the index set $S_k$ for the k-th slot. The set $S_k$ can be periodic in k under practical considerations. In the extreme case where only one component of $O(k)$ is quantized to its sign and the remaining components are quantized to zero, we have a one-bit feedback scheme.

Since the objective function $J(w)$ has no local maximum in the constraint set $S_g$, and the directional derivative is always nonnegative, the QFOA beamforming system converges to the global maximum. If the maximum eigenvalue of the channel correlation matrix R has multiplicity m, then $w_1$, $w_2, \ldots, w_m$ are the global maximum points of the received signal power $J(w)$ in the constraint set $S_g$. However, how close the system can get to a global maximum point in the steady state depends on the step size. A smaller step size μ in general yields a smaller steady-state error and a slower initial speed of convergence and vice versa.

Turning now to FIGS. 10 to 13, illustrated are graphical representations demonstrating exemplary instances of an evolution of a received signal power J(w(k)) for a randomly realized static channel including representations of a QFOA beamforming system. In the illustrated embodiments the evolution of the received signal power J(w(k)) is obtained via a deterministic and random versions of the tangential perturbation gradient approximation system (labeled as "Random Tangential" and "Determ. Tangential"), the random perturbation method by B. C. Banister, et al. (labeled as "Random"), the deterministic perturbation method by B. Raghothaman (labeled as "Determ.") and the QFOA beamforming system described herein. The illustrated embodiments employ the following parameters for the demonstrated instances with M transmit antennas.

| FIG. | M | b (bits) | μ (step size) |
|------|---|----------|---------------|
| 10   | 4 | 1        | 0.2           |
| 11   | 4 | 1        | 0.5           |
| 12   | 4 | 2        | 0.2           |
| 13   | 4 | 2        | 0.5           |

The curve designated optimal curve corresponds to the case where the exact optimal increment vector o(k) is sent back; this represents the ideal case where the number of quantization bits is b=∞. As expected, we see that the QFOA beamforming system has faster convergence speed than the other methods. Also, it is of practical interest to note that the QFOA beamforming system has a smaller steady-state error for a relatively large step size (μ=0.5) and experiences only a small loss in convergence speed compared to the ideal feedback case. It should be noted, however, that the perturbation methods employ a one-bit feedback while in these plots the QFOA beamforming system uses multiple-bit feedback.

Figure 14A:
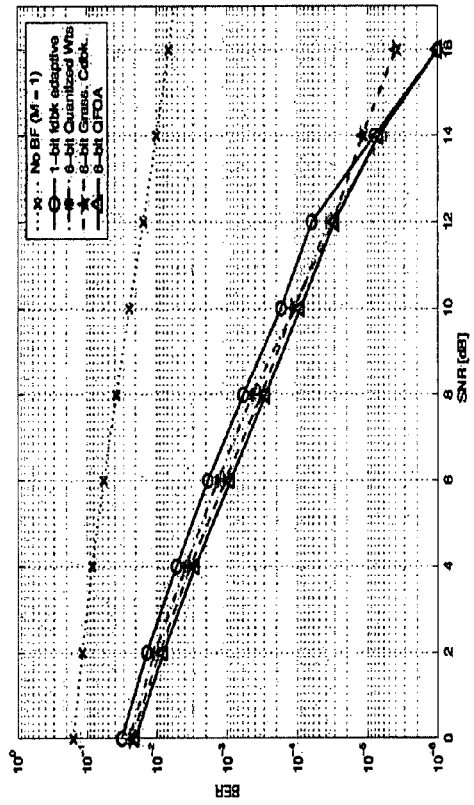
FIGS. 14A and 14B illustrate graphical representations comparing exemplary error rate performance of other systems with a quantized-feedback optimal adaptive beamforming system.
Figure 14B:
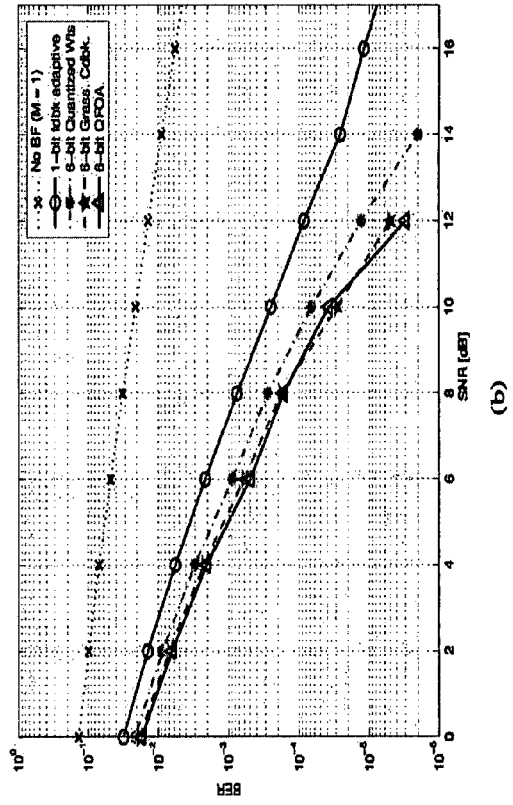

Turning now to FIGS. 14A and 14B, illustrated are graphical representations comparing exemplary error rate performance of other systems with a QFOA beamforming system. In particular, an error rate performance of the QFOA beamforming system is provided illustrating the uncoded bit error rates of the QFOA beamforming system and other systems for a four transmit antenna, one receive antenna configuration with receiver velocities of 3 and 10 km/hr. The channel is generated according to a Jakes fading model. The BER curves correspond to the no beamforming transmission (M=1), a one bit feedback perturbation-based adaptive system, the quantized weighted feedback system where the sign of the real and imaginary parts of the weight vector are sent back, and a codebook selection method based on a Grassmannian codebook procedure. It should be noted that for the BER results, there is a delay in the application of the beam vector. That is, for practicality considerations, the weight vector updated in a given frame is used to transmit the next frame.

Thus, a QFOA beamforming system and method employing quantized feedback adaptive beamforming has been illustrated and described herein. The feedback information is a quantized version of an updated direction or incremental vector. It should be understood that with quantization schemes, the method has global convergence since the objective function has no local maximum in the constraint set and its directional derivative is nonnegative in the quantized increment vector. It is worth noting the flexibility of the QFOA beamforming system which allows the quantization resolution (number of feedback bits) to be arbitrary and, therefore, adaptable. Simulation results for a slow fading channel show that for the Grassmannian codebook-based method, the bit error rate tends to be somewhat inferior to those of the QFOA beamforming system and DPGA system at high SNRs, which confirms the earlier conjecture that the codebook-based method does not achieve a global maximizer. For low and medium SNRs, however, the QFOA beamforming system and the Grassmannian codebook method have similar performances. With scalar quantization schemes previously described, since the QFOA beamforming system does not search over a codebook, its complexity has virtually no dependency on the number of feedback bits.

Thus, in the environment of a communications system, a receiving station (e.g., mobile station) includes a receiver of a QFOA beamforming system that receives a forward-link signal including pilot signals from a transmitter of a base station employing multiple transmit antennas with different weighting components. The QFOA beamforming system also includes a detector embodied in the mobile station that measures characteristics of the forward-link signal in accordance with the pilot signals and provides a quantized increment vector that represents a preferable adaptation of the weightings for the weighting components to enhance a received signal quality. The QFOA beamforming system still further includes a transmitter embodied in the mobile station that transmits the quantized increment vector to the base station via a reverse-link signal. A beamformer selector (e.g., embodied in the base station) of the QFOA beamforming system operates to determine an updated, re-orthogonalized increment vector based on the quantized increment vector received from the mobile station. A weight vector modifier of the QFOA beamforming system produces new components of the weight vector selected by the beamformer selector, which are provided to a vector applicator for application to the corresponding weighting elements of the transmit antennas of the base station. The base station thereafter employs the updated weighting elements to transmit the forward-link signal to the mobile station.

In accordance with a QFOA multi-beamforming system and method, a more detailed analysis thereof for application in frequency division duplex systems will now be described. The system is referred to as a quantized-feedback optimal adaptive multi-beamforming solution because the system and methodology adapts a transmit beamforming vector by computing directions for multiple beams in the same slot of preferable adaptation, and feeds quantized increment vectors thereof back to a transmitter. The formation of a second beam advantageously accommodates an additional transmission channel, providing thereby more communication services. The number of feedback bits for each beam is arbitrary, so it can be as small as one bit, or as large as the feedback bandwidth allows. This process offers an adaptive diversity technique that allows transmission in orthogonal beam spaces in a slot, thereby substantially increasing system capacity. The system offers an adaptive diversity technique with global convergence.

Figure 15:
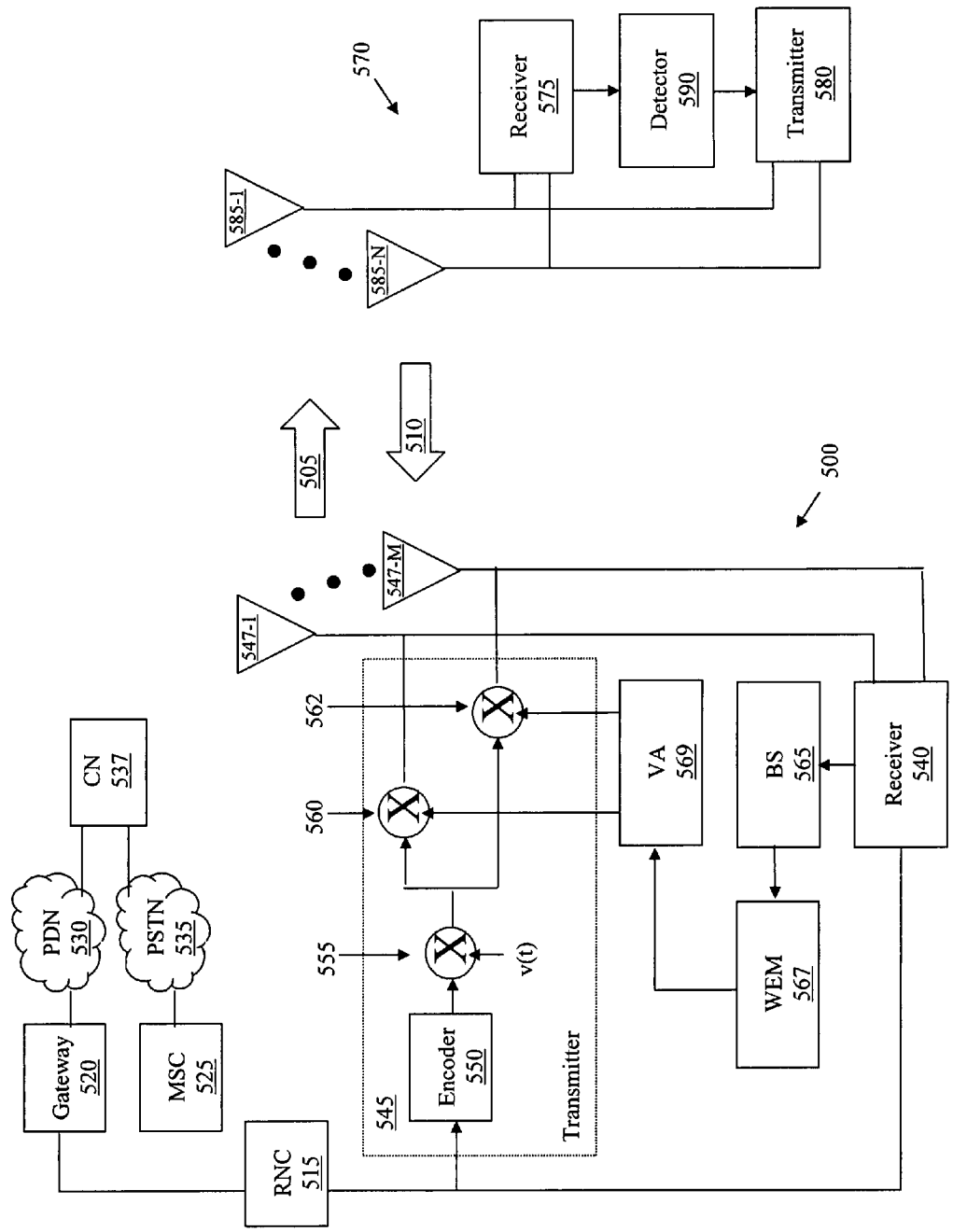
FIG. 15 illustrates a block diagram of a communication system including an embodiment of a quantized-feedback optimal adaptive multi-beamforming system.

Referring now to FIG. 15, illustrated is a block diagram of a communication system including an embodiment of a quantized-feedback optimal adaptive multi-beamforming system, wherein multiple beams are transmitted in the same slot. The communication system includes a base station 500 and a receiving station (e.g., mobile station 570). The communication channels are defined by radio links such as forward-link channels 505 and reverse-link channels 510. Information sent to the mobile station 570 is communicated by the base station 500 over the forward-link channels 505 and information originated at the mobile station 570 for communication to the base station 500 is communicated over reverse-link channels 510.

The communication system may be a cellular communication system constructed pursuant to any of a number of different cellular communication standards. For instance, the base station and mobile station may be operable in a code division multiple access ("CDMA") communication system such as a third generation ("3G") CDMA communication that provides for 1×EV-DV ("EVolution, Data and Voice") data and voice communications. Those skilled in the art, however, realize that the QFOA multi-beamforming system described herein are employable in any number of communication systems including other types of cellular communication systems such as a global system for mobile ("GSM") communications systems that provides for general packet radio service or enhanced data for GSM evolution data services, each of which also provides for data communications. The communication system is also representative of other types of radio and other communication systems in which data is communicated over channels that are susceptible to distortion caused by fading or other conditions. Those skilled in the art should understand that the principles described herein are operable in any communication system employing closed-loop transmit diversity.

The base station 500 forms part of a radio access network that also includes a radio network controller ("RNC") 515 coupled to a gateway 520 and a mobile switching center ("MSC") 525. The gateway 520 is coupled to a packet data network ("PDN") 530 such as the Internet backbone and the mobile switching center 525 is coupled to a public switched telephone network ("PSTN") 535. A correspondent node ("CN") 537 is coupled to the packet data network 530 and to the PSTN 535. The correspondent node 537 represents a data source or a data destination from which, or to which, information is routed during operation of the communication system.

The base station 500 includes a receiver 540 and a transmitter 545. A forward-link signal to be communicated by the base station 500 to the mobile station 570 is converted into a format for communication over the forward-link channels 505 by the transmitter 545. Closed-loop feedback information is returned by the mobile station 570 to the base station 500 by way of the reverse-link channels 510. The mobile station 570 also includes a receiver 575 and a transmitter 580. The receiver 575 (which may include subsystems such as a receive filter and an equalizer) operates to receive, and operate upon, the forward-link signals transmitted by the base station 500 over the forward-link channels 505, and the transmitter 580 operates to transmit reverse-link signals over the reverse-link channels 510 to the base station 500.

The base station 500 and the mobile station 570 may include multiple antennas, and the base station 500 and mobile station 570 combination forms a multiple-input, multiple-output ("MIMO") system. For purposes of clarity, the base station 500 includes M base station antennas designated 547-1 to 547-M (hereinafter referenced as base station antennas 547). Also for purposes of clarity, the mobile station 570 includes N mobile station antennas designated 585-1 to 585-N (hereinafter referenced as mobile station antennas 585). Those skilled in the art should understand, however, that any number of antennas (e.g., one receive antenna) may be employed in accordance with the principles of the present invention.

The base station transmitter 545 includes an encoder 550 that encodes data to form encoded data. The encoded data is provided [via a transmit filter (not shown)] to an up-mixer 555 with an up-mixing constant v(t) to generate an up-mixed signal. The up-mixed signal is provided via weighting elements (two of which are referenced and designated as first and second weighting elements 560, 562, respectively) on separate branches to ones of the base station antennas 547. Once the up-mixed signals are weighted, the weighted signals are applied to the base station antennas 547 for transmission to the mobile station 570. Of course, other operations may be performed on the weighted signals prior to transmission to the mobile station 570. Of course, the first and second weighting elements 560, 562 may be applied at a baseband signal level or at a higher level in the signal processing chain.

The base station 500 also includes a QFOA multi-beamforming system that adjusts the values of the weightings applied to the first and second weighting elements 560, 562 (and, if necessary, antenna weighting elements for other antennas, not shown) in a manner that enhances antenna weighting selection pursuant to a closed-loop transmit diversity system. The QFOA multi-beamforming system (which may be embodied in hardware, software, or combinations thereof) includes a beamformer selector ("BS") 565 that operates to determine an updated direction or increment vector for each of multiple beams transmitted in the same slot based on a respective quantized increment vector (received by the receiver 540 in the base station 500) from the mobile station 570. For instance, the beamformer selector 565 may re-orthogonalize the quantized increment vectors. As will become more apparent below, the quantized increment vectors may be projected onto a hyperplane tangent to a constraint hypersurface thereof (e.g., re-orthogonalizes). The quantized increment vectors may be quantized to one bit.

The QFOA multi-beamforming system also includes a weight vector modifier ("WEM") 567 that modifies a tangential component of each of the weight vectors selected by the beamformer selector 567, which are provided to a vector applicator ("VA") 569 for application to the first and second weighting elements 560, 562. For instance, the weight vector modifier 567 calculates an antenna weight vector for each beam by adding a respective increment (e.g., of a magnitude of less than unit length) to each of previous antenna weight vectors proportional to the respective re-orthogonalized quantized increment vector, renormalizes the antenna weight vectors to unit length ("unit magnitude"), and re-orthogonalizes the resulting antenna weight vectors. Since each increment vector points in a direction that yields a sufficient gradient of the objective function subject to the constraint, for example, each increment vector points in a direction that renders positive a directional derivative of total received power for a respective beam from the multiple antennas of the base station, the convergence speed is improved. The weightings of the first and second weighting elements 560, 562 determine the values of the signals transmitted by the base stations antennas 547. The forward-link signals generated on the forward-link channels 505 are delivered to the mobile station 570.

The mobile station 570 (a "receiving station") includes a detector 590 (which may include subsystems such as a combiner and may be a subsystem of the receiver 575) that detects and measures characteristics (e.g., representing power levels) of the forward-link signals (in accordance with pilot signals thereof) transmitted by the base station 500. For instance, the detector 590 may measure a downlink channel correlation matrix for each of multiple beams for the base station antennas 547 from pilot signals. The detector 590 may measure the downlink channel correlation matrix from a discrete-time channel impulse response between the base station antennas 547 and the mobile station antenna(s) 585. More specifically, the detector 590 adapts a transmit vector by computing a direction of preferable adaptation and feeds a quantized increment vector (e.g., one bit) back to the base station 500.

The detector 590 may also compute an increment vector for each of multiple beams normal to a previous antenna weight vector rendering positive (e.g., maximizing) a directional derivative of total received power for each beam from the base station antennas 547, and quantize the increment vectors component by component to produce quantized increment vectors (e.g., via a uniform quantizer). The quantized increment vectors are thereafter employed by the base station 500 to adjust the weightings of the first and second weighting elements 560, 562 associated with the respective antenna weight vector for each beam for the base station antennas 547 to refine the forward-link signals. Of course, the quantized increment vectors may adjust the weightings of any number of weighting elements depending on the number of base station antennas. The QFOA multi-beamforming system is an adaptive system and the aforementioned steps may be repeated several times to adapt the transmit antenna weights towards an optimal or preferable solution depending on the communication system and application.

Figure 16:
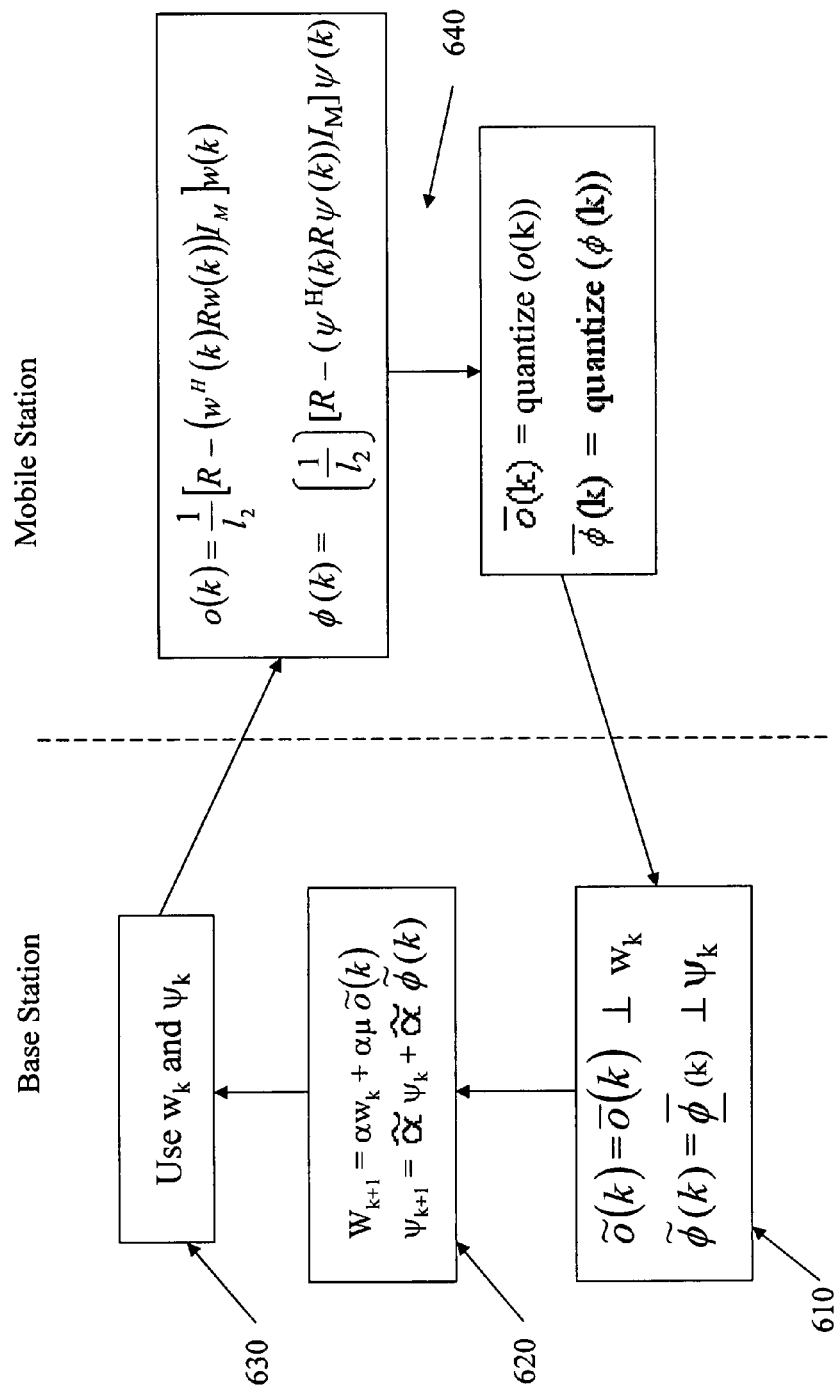
FIG. 16 illustrates a functional block diagram of an embodiment of a quantized-feedback optimal adaptive multi-beamforming system.

Turning now to FIG. 16, illustrated is a functional block diagram of an embodiment of a QFOA multi-beamforming system. While the support for the functional blocks will be described in more detail below, an outline of the respective functions will hereinafter be provided. Beginning with the sending station (e.g., base station), a beamforming selector 610 determines updated directions or increment vectors based on quantized increment vectors received from a receiving station. The quantized increment vectors may be projected onto hyperplanes tangent to constraint hypersurfaces thereof. A weight vector modifier 620 modifies a tangential component of the weight vectors selected by the beamformer selector 610, which are provided to a vector applicator 630 for application of the weight vectors. Regarding the receiving station (e.g., mobile station), a detector 640 adapts transmit vectors by computing directions of preferable adaptation and feeds quantized increment vectors back to the sending station.

At each step of the adaptation, quantized increment vectors of the adaptive multi-beamforming solution are projected onto hyperplanes tangent to constraint hypersurfaces. Tangential components are then used to adapt antenna weights. Since the optimal increment vectors point in directions that yield a sufficient gradient of the objective function subject to the constraint, convergence speed is improved. Fast convergence improves system performance during the start-up period and helps remove the need to continuously track the antenna weights during intermittent periods where the transmitter does not transmit to a mobile station, or while the connection is temporarily suspended or idle. High convergence speed also provides a fast tracking capability demanded by high mobility applications. Additionally, several quantization methods may again be used as described herein that provide global convergence, irrespective of a quantization error, since the gradient is preferably positive at any nonstationary point in a solution space.

As mentioned above, beamforming methodology often employs multiple transmit antennas to steer the signal associated with each mobile station to a base station for another mobile station. To achieve the objective, the signal feeding each antenna is weighted by an appropriate factor. The weights are constrained due to a limit on the total transmit power, but the distribution of the weights can be optimized or "steered" in such a way that the received signal is augmented (e.g., optimized) according to a certain criterion such as the total received power which, under certain conditions, is equivalent to substantially maximizing the effective signal-to-noise ratio ("SNR") and the channel capacity. When the set of weights are optimized and tracked in the case of fading, both fading diversity and steering gains are achieved in MIMO systems.

In the case where the effective SNR is optimized, the antenna weights form the principal eigenvector of the channel correlation matrix R. To increase the system capacity, additional data that is beamformed by a vector in the null space of the principal eigenvector may be transmitted in the same slot. The effective SNR for the additional signal is augmented (e.g., optimized) when a second beam aligns with an eigenvector belonging to a second eigenvalue of the channel correlation matrix. This observation will be explained quantitatively below. It turns out that the second beam can be tracked by using an analogous methodology as described above leading to global convergence with quantized feedback.

A system and method are described that tracks not only a first beam, but also can track a second beam, preferably, simultaneously. The number of feedback bits for each beam is arbitrary, so it can be as little as one bit or as large as the feedback bandwidth allows. This technique is adaptive and provides global convergence. While the first beam globally converges to a first eigenvector as provided above, the second beam is shown herein to globally converge to a second eigenvector. When the first eigenvalue has multiplicity two or larger, the link capacity is potentially doubled compared to the single beam case. The convergence speed is substantially augmented (e.g., optimized) by advantageously finding the increment vector of choice (e.g., optimum vector) for each beam. A quantized version of the increment vector is sent back to the transmitter. The method is robust with respect to quantization error. In particular, for a coarse quantization scheme considered herein where only a sign of each component is taken, the loss in convergence speed is small and the directional derivative (constrained gradient) of the objective function is nonnegative, preferably everywhere. This represents a feature of the multi-beamforming system that provides global convergence regardless of quantization error.

Consider again, a signaling model for a base station with M transmit antennas and a mobile station with N receive antennas. The sequence x(n) again denotes the unit-power information sequence transmitted over the M antennas, $y_r(n)$ denotes the noiseless Nyquist-rate sampled sequence, $w_t$ denotes antenna weights for the t-th transmit antenna weight, $h_{r,t}(l)$ represents the discrete-time channel impulse response between the t-th transmit antenna and the r-th receive antenna, and D denotes the delay spread of the channel impulse response. Again define the antenna weight vector as:

$$w \triangleq [w_1, w_2, \ldots, w_M]^T,$$

satisfying $$w^H w = 1.$$

A vector y(n) of observations from all the receive antennas is:

$$y(n) \triangleq [y_1(n), y_2(n), \ldots, y_N(n)]^T$$

and the received signal power is:

$$J(w) \stackrel{\Delta}{=} E[y^T(n)y^*(n)] = w^H R w,$$

employing the channel correlation matrix R and channel matrix $H_r$ as previously defined. Each transmit antenna again carries a pilot sequence covered by a predetermined spreading sequence.

The SNR, $$\eta(c, w) \stackrel{\Delta}{=} \frac{E[|c^H H w x(n)|^2]}{E[|c^H v(n)|^2]} = \frac{\sigma_x^2}{N_o} \frac{c^H [H w w^H H^H] c}{c^H c}$$

is maximized when a combiner c is proportional to the principal eigenvector of the rank-1 matrix $H w w^H H^H$, i.e., when $$c = c_{max} \stackrel{\Delta}{=} \gamma H w$$

for any scalar $\gamma \neq 0$, as previously described, and the SNR again becomes $$\eta(\gamma H w, w) = \frac{\sigma_x^2}{N_o} w^H H^H H w^H = \frac{\sigma_x^2}{N_o} w^H R w = \frac{\sigma_x^2}{N_o} J(w). \quad \text{EQN J}$$

It is well known that EQN J above is maximized when $w=w_1$, where $w_1$ is the principal eigenvector of the channel correlation matrix R belonging to the principal eigenvalue $\lambda_1$. Let us examine the case where additional data is transmitted on a second beam $\psi=w_2$, where $w_2$ is the eigenvector belonging to the second eigenvalue $\lambda_2$ (where $\lambda_2$ can be equal to $\lambda_1$). By design, the eigenvectors $w_1$, $w_2$ are orthogonal, i.e. $w_2^H w_1 = 0$. In this case, the noisy received signal z(n) is given by:

$$z(n) = H[w_1 x_1(n) + w_2 x_2(n)] + v(n)$$

where $x_1(n)$ and $x_2(n)$ are the information symbols transmitted on the first and second beams, respectively. To recover $x_1(n)$ and $x_2(n)$, two combiners $c_1$ and $c_2$ are employed:

$$c_1 = \gamma_1 H w_1, \text{ and}$$

$$c_2 = \gamma_2 H w_2$$

for some nonzero $\gamma_1$ and $\gamma_2$. Under practical considerations, $\gamma_1$ and $\gamma_2$ should be $\|H w_1\|^{-2}$ and $\|H w_2\|^{-2}$ to preserve the amplitude and phase of the signals. Since the eigenvectors $w_1$ and $w_2$ are orthogonal, $$\hat{x}_1(n) = c_1^H z(n) = \gamma_1^* \lambda_1 x_1(n) + \gamma_1^* w_1^H H^H v(n)$$

$$\hat{x}_2(n) = c_2^H z(n) = \gamma_2^* \lambda_2 x_2(n) + \gamma_2^* w_2^H H^H v(n)$$

which shows that the demodulated signals on the two beams are decoupled. The effective SNRs for the demodulated signals are:

$$\sigma_1^2 \lambda_1 / N_0, \text{ and}$$

$$\sigma_2^2 \lambda_2 / N_0$$

where $\sigma_1^2$ and $\sigma_2^2$ are the powers of the transmitted symbol streams $x_1(n)$ and $x_2(n)$, respectively. Note that if there are two or more receive antennas, then second eigenvalue $\lambda_2$ is generally nonzero so that the information transmitted on the second beam can be recovered.

With respect to the QFOA multi-beamforming system and method, due to the transmit power limitation, the beamformer should satisfy the two scalar constraints $g(w)=0$ and $g(\psi)=0$ where the constraint function $g(w)$ is again defined as:

$$g(w) \stackrel{\Delta}{=} 1 - w^H w. \quad \text{EQN K}$$

An objective is to develop an adaptive solution for the multi-beamforming maximization problem:

$$w_{max} \stackrel{\Delta}{=} \underset{w \in S_g}{\operatorname{argmax}} J(w),$$

and $$\psi_{max} \stackrel{\Delta}{=} \arg \max_{\psi \in S_{w_{max}}} J(w)$$

where:

$$S_g \stackrel{\Delta}{=} \{w : g(w) = 0\}$$

and also $$S_w \stackrel{\Delta}{=} \{\psi : g(\psi) = 0, w^H \psi = 0\}.$$

Suppose that the antenna weight vectors w(k) and $\psi$(k) denote the solution at the k-th step of the adaptation. The time variable k also indexes the "slots" of a transmission wherein the duration of each slot is on the order of the channel coherence time sufficiently long for all channel estimation and pilot tracking purposes. This adaptation is governed by two sets of conditions, one of which is:

$$w(k) \in S_g \forall k,$$

and $$\psi(k) \in S_{w(k)} \forall k.$$

The other set of conditions is that the antenna weight vector w(k+1) should be related to the antenna weight vector w(k) in such a way that the received signal power J(w) has an "optimal" increase from the antenna weight vector w=w(k) to the antenna weight vector w=w(k+1). Similarly, the antenna weight vector $\psi$(k+1) should be related to the antenna weight vector $\psi$(k) in such a way that the received signal power J($\psi$) also has an "optimal" increase from the antenna weight vector $\psi=\psi$(k) to the antenna weight vector $\psi=\psi$(k+1), subject to the equation above for the antenna weight vector $\psi$(k):

$$\psi(k) \in S_{w(k)} \forall k.$$

As previously described, the antenna weight vector w(k+1) can be obtained by adding to the antenna weight vector w(k) a scaled version of the gradient of the received signal power J(w), i.e., for some constant step size $\mu$, the antenna weight vector is $w(k+1)=w(k)+\mu \nabla_{w^H} J(w(k))$. However, the presence of the constraint $w(k) \in S_g \forall k$ renders the direct use of the steepest gradient ascent algorithm principally inapplicable. Indeed, the antenna weight vector w(k+1) could be normalized at each step, but apparently this process has no mechanism to prevent the received signal power J(w) from decreasing between time k and time k+1.

The quantized-feedback optimal adaptive multi-beamforming system represented by EQN K is analyzed and illustrated such that the antenna weight vector w(k) converges to a eigenvector w, as summarized below.

1) Generate an arbitrary initial base station antenna weight vector w(1) with ‖w(1)‖=1 according to a pre-determined procedure. An equal gain beamformer is a recommendable initial candidate.

2) Set the time k=1

3) Use the "previous" antenna weight vector w(k) to transmit the k-th slot. At the mobile station, the channel correlation matrix R is measured from pilot signals, e.g., using the discrete-time channel impulse response between transmit antennas and receive antenna(s).

4a) If antenna weight vector w(k) is not an eigenvector of channel correlation matrix R, the mobile station computes the antenna weight increment vector o(k) according to EQN C, as reproduced below:

$$o(k) = \frac{1}{l_2}[R - (w^H(k)Rw(k))I_M]w(k) \quad \text{EQN C}$$

wherein, from RELN A, reproduced below:

$$l_2 = \sqrt{w^H(k)R^2w(k) - [w^H(k)Rw(k)]^2}. \quad \text{RELN A}$$

The antenna weight increment vector o(k) maximizes, or in an alternative embodiment, renders positive the directional derivative of the total received power at the receiving antenna from the multiple antennas of the base station under the constraints that the antenna weight increment vector o(k) is of unit length and is tangent to the equal-level surface g(w)=0 at w=w(k), i.e., it is normal to the antenna weight vector w(k). Additionally, the antenna weight vector w(k) is an eigenvector of the channel correlation matrix R if $l_2$=0. If $l_2$=0, then the antenna weight increment vector o(k) can be selected as any vector orthogonal to antenna weight vector w(k), e.g., such as by using EQN H as described above.

4b) A quantized version $\bar{o}(k)$ of the antenna weight increment vector o(k) is obtained by any of several quantization schemes. For example, in one scheme, the real and imaginary parts of each component of the antenna weight increment vector o(k) can be quantized to its respective sign. In another scheme, the real or imaginary part of one or more components is quantized to its sign and the remaining components are quantized to zero. In the extreme case where either the real or imaginary part of only one component is quantized to its sign and the remaining components are quantized to zero, a one-bit feedback scheme is employed.

5) The bits that represent the quantized increment vector $\bar{o}(k)$ are sent back to the base station. At this point, the base station and mobile station both know the quantized antenna weight increment vector $\bar{o}(k)$ and the antenna weight vector w(k). Note that the quantized increment vector $\bar{o}(k)$ is normalized based on the feedback bits.

6a) The base station and the mobile station "re-orthogonalize" the quantized increment vector $\bar{o}(k)$ to the antenna weight vector w(k) to produce the re-orthogonalized antenna weight increment vector $\tilde{o}(k)$ of unit length according to EQN F, reproduced below:

$$\tilde{o}(k) = \frac{\bar{o}(k) - [w^H(k)\bar{o}(k)]w(k)}{\sqrt{1 - |w^H(k)\bar{o}(k)|^2}}. \quad \text{EQN F}$$

6b) A new (i.e., of unit magnitude, $w^H w$=1) antenna weight vector w(k+1) is computed from the antenna weight vector w(k) by the base station and the mobile station according to EQN I, reproduced below, using a step size μ:

$$w(k+1) = \alpha w(k) + \alpha\mu\tilde{o}(k)$$

again, where:

$$\alpha = 1/\sqrt{(1+\mu^2)}.$$

The new normalized antenna weight vector w(k+1) is computed by adding the step size μ times the re-orthogonalized quantized increment vector $\tilde{o}(k)$ to the previous antenna weight vector, i.e., an increment that is proportional to the re-orthogonalized antenna weight increment vector $\tilde{o}(k)$ is added to the previous antenna weight vector w(k). The resulting new antenna weight vector is scaled by a normalizing factor so that its magnitude is of unit length. The step size μ is preferably selected in the range 0<μ≦1, i.e., the length of the increment added to the antenna weight vector w(k) is positive but preferably less than or equal to unity. In a preferred embodiment, the step size μ is a constant which can be readily determined by simulation or by experiment in view of the application. Exemplary values of the step size μ are 0.2 and 0.5.

7) Then, increment the time k←k+1 and loop back to step 3) to repeat the procedure for the next slot.

Before developing the adaptive solution for a second antenna weight vector ψ(k), it is noted that when the number of transmit antennas is M=2, the second antenna weight vector ψ(k) can be simply tracked by $\psi(k)=[w_2(k), -w_1(k)]^H$, wherein the first antenna weight vector $w(k)=[w_1(k), w_2(k)]^T$, which satisfies $\psi(k)^H w(k)$=0. It can be shown that as the first antenna weight vector w(k) converges to an eigenvector $w_1$, the principal eigenvector of the channel correlation matrix R, the second antenna weight vector ψ(k) converges to the other eigenvector of the channel correlation matrix R.

The QFOA multi-beamforming system is developed for the problem represented by the equation:

$$\psi_{max} \stackrel{\Delta}{=} \arg\max_{\psi \in S_{w_{max}}} J(w)$$

to adapt the second antenna weight vector ψ(k) for a number of transmit antennas M>2. The concept of a directional derivative is again employed as previously described hereinabove for a real-valued scalar function. The directional derivative of any real-valued scalar received signal power J(ψ) in the direction of a complex unit vector $\phi \in \mathbb{C}^M$ (which denotes a Euclidean complex vector space with M dimensions) is given by:

$$D_\phi J(\psi) = \phi^H \nabla_\psi{}^H J(\psi) + \nabla_\psi J(\psi)\phi,$$

referred to as EQN L. As noted previously, a gradient vector $\nabla_\psi J(\psi)$ is a row vector and $\nabla_\psi{}^H J(\psi)$ is a column vector. In addition, $\nabla_\Theta f(\Theta)$ is a row vector and $\nabla_{\Theta^T} f(\Theta)$ is a column vector. By extending the real-valued scalar function with complex input arguments, the received signal power $J(\psi)=f(\Theta)$ has been expressed as a function of the real-valued vector:

$$\Theta = [\psi_{R_e}^T, \psi_{I_m}^T]^T,$$

wherein the quantities subscripted by $R_e$ and $I_m$ denote the real and imaginary parts of the associated quantity, respectively. Then, $D_\phi J(\psi)$ is defined as the directional derivative of $f(\Theta)$ in the direction of:

$$v = [\phi_{R_e}^T, \phi_{I_m}^T]^T.$$

That is:

$$D_\phi J(\psi) \triangleq D_v f(\Theta),$$

referred to as EQN M.

The result provided by EQN L follows from EQN M by employing the Wirtinger complex calculus, previously cited, yielding results consistent with separate differentiation regarding the real and imaginary parts and allow the treatment of the antenna weight vectors $\psi$ and $\psi^*$ as independent variables, i.e., $$\frac{\partial_\psi}{\partial_\psi} = I,$$

and $$\frac{\partial_\psi}{\partial_\psi^*} = 0.$$

The set $S_{w(k)}$ is the closed set that defines a unit-radius hypersphere centered at the origin. The number of dimensions of this hypersphere is one less than the number of dimensions of the hypersphere given by a surface $S_g$ due to the extra condition $\psi^H w = 0$. Suppose we obtain the second antenna weight vector $\psi(k+1)$ by pulling the head of the second antenna weight vector $\psi(k)$ to a close neighboring point on the surface of the hypersphere in a direction tangent to the equal-level surface $g(\psi)=0$. Then, the direction in which this pull results in the steepest rate of increase in the received signal power $J(\psi)$ is some direction $\phi(k)$ that is tangential to the constraint surface $S_{w(k)}$ at $\psi=\psi(k)$ and results in the largest directional derivative, i.e., $$\phi(k) = \underset{\phi}{\arg\max}\, D_\phi J(\psi(k)) = \underset{\phi}{\arg\max}\, [\phi^H R \psi(k) + \psi^H(k) R \phi] \quad \text{EQN N}$$

subject to $$\phi^H \psi(k) = 0 \quad \text{EQN O}$$

$$1 - \phi^H \phi = 0 \quad \text{EQN P}$$

$$w^H(k+1)[\psi(k) + \tilde{\mu}\phi] = 0 \quad \text{EQN Q}$$

The constraint EQN O provides that the increment vector $\phi$ is tangent to the equal-level surface $g(\psi)=0$ at the second antenna weight vector $\psi=\psi(k)$. To see this, we note that the increment vector $\phi$ should be orthogonal to the gradient of the surface $g(\psi)$, that is $0=\phi^H \nabla_\psi^H g(\psi(k))=-\phi^H \psi(k)$, resulting in EQN Q. Constraint EQN P is the usual condition for the unit direction vector involved in the definition of directional derivative. Constraint EQN Q ensures that the antenna weight vectors $w(k+1)$ and $\psi(k+1)$ are orthogonal wherein the antenna weight vector $\psi(k+1)$ is adapted as $\psi(k+1)=\tilde{\alpha}\psi(k)+\tilde{\alpha}\tilde{\mu}\phi(k)$ in the same form as EQN J, with $\tilde{\mu}$ being the step size and $\tilde{\alpha}=1/\sqrt{1+\tilde{\mu}^2}$. Thus, the increment vector $\phi(k)$ can be obtained by solving for the increment vector $\phi$ the Lagrange equation:

$$R\psi(k) = m_1 \psi(k) + m_2 \tilde{\mu} w(k+1) + m_3 \phi, \quad \text{EQN R}$$

subject to (EQN O)-(EQN Q), where $m_1$, $m_2$ and $m_3$ are Lagrange multipliers.

For notational simplicity, we use in the sequel the following compact notations defining:

$$\underline{w} \triangleq w(k+1) \quad \text{EQN S}$$

$$\underline{\psi} \triangleq \psi(k) \quad \text{EQN T}$$

$$\underline{\phi} \triangleq \phi(k). \quad \text{EQN U}$$

To proceed, we define (referred to as RELNs D):

$$a_1 \triangleq \frac{\underline{\psi}^H R \underline{\psi} - \underline{\psi}^H \underline{w}\underline{w}^H R \underline{\psi}}{1 - |\underline{\psi}^H \underline{w}|^2} \quad \text{EQN UU}$$

$$a_2 \triangleq -\frac{|\underline{\psi}^H \underline{w}|^2}{\tilde{\mu}(1 - |\underline{\psi}^H \underline{w}|^2)}$$

$$a_3 \triangleq \frac{\underline{w}^H R \underline{\psi} - \underline{w}^H \underline{\psi}\underline{\psi}^H R \underline{\psi}}{\tilde{\mu}(1 - |\underline{\psi}^H \underline{w}|^2)}$$

$$a_4 \triangleq \frac{\underline{w}^H \underline{\psi}}{\tilde{\mu}^2(1 - |\underline{\psi}^H \underline{w}|^2)}$$

$$c_0 \triangleq \underline{\psi}^H R^2 \underline{\psi} - \frac{(\underline{\psi}^H R \underline{\psi})^2 + |\underline{\psi}^H R \underline{w}|^2 - \underline{\psi}^H R \underline{\psi}(\underline{\psi}^H \underline{w}\underline{w}^H R \underline{\psi} + \underline{w}^H \underline{\psi}\underline{\psi}^H R \underline{w})}{1 - |\underline{\psi}^H \underline{w}|^2}$$

$$c_2 \triangleq \frac{|\underline{\psi}^H \underline{w}|^2}{\tilde{\mu}^2(1 - |\underline{\psi}^H \underline{w}|^2)} - 1.$$

After algebraic manipulation, it can be shown that:

$$m_1 = a_1 + a_2 m_3, \quad \text{EQN V}$$

$$m_2 = a_3 + a_4 m_3, \quad \text{EQN W}$$

$$0 = c_2 |m_3|^2 + c_0, \quad \text{EQN X}$$

wherein EQN V and EQN W are a consequence of EQN O, EQN Q, and EQN R, while EQN X is a consequence of EQN P. To find the increment vector $\underline{\phi}$, we need to determine the conditions under which the problem represented by EQN N, EQN O, EQN P, and EQN Q is feasible. Feasibility exists if there exists an $m_3$ that solves EQN X. This is shown in the following lemma.

Lemma 5: There exists $\tilde{\mu}>0$ such that the problem represented by EQN N, EQN O, EQN P, and EQN Q is feasible.

Proof: Since $c_0$ is independent of $\tilde{\mu}$, if $\underline{\psi}^H \underline{w} \neq 0$ then obviously there exists $\tilde{\mu}>0$ such that $c_0$ and $c_2$ have opposite signs so that there exists an $m_3$ that solves EQN X.

It remains to show that the problem is feasible for $\underline{\psi}^H \underline{w}=0$. In this case, $c_2=-1$, so the problem is feasible if $c_0>0$. For $\underline{\psi}^H \underline{w}=0$, there exist $M-2$ orthonormal vectors $\{q_3, q_4, \ldots, q_M\}$ that span the null space of $[\underline{\psi}, \underline{w}]^H$, i.e., $[\underline{\psi}, \underline{w}]^H q_i=0$ for $i=3, \ldots, M$ and $q_i^H q_j = \delta_{ij}$. We define:

$$Q=[\underline{\psi}, \underline{w}, q_3, \ldots, q_M],$$

It is easy to see that $Q^H Q = I_M = QQ^H$ where $I_M$ denotes the $M \times M$ identity matrix. Thus:

$$c_0 = \underline{\psi}^H R^2 \underline{\psi} - (\underline{\psi}^H R \underline{\psi})^2 - |\underline{\psi}^H R \underline{w}|^2 \qquad \text{EQN Y}$$
$$= \underline{\psi}^H R (I - [\underline{\psi}, \underline{w}][\underline{\psi}, \underline{w}]^H) R \underline{\psi}$$
$$= \underline{\psi}^H R Q M Q^H R \underline{\psi} \qquad \text{EQN Z}$$
$$\geq 0 \qquad \text{EQN AA}$$

wherein $$M = \begin{bmatrix} 0_{2 \times 2} & 0_{2 \times (M-2)} \\ 0_{(M-2) \times 2} & I_{M-2} \end{bmatrix}.$$

The inequality in EQN AA holds since $M \geq 0$. It remains to show that feasibility exists for $c_0=0$. From EQN Z, $c_0=0$ if $q_i^H R \underline{\psi}=0$ for $i=3, \ldots, M$, which holds if $R\underline{\psi}$ belongs to the range space of $[\underline{\psi}, \underline{w}]$. That is, $R\underline{\psi}=u_1 \underline{\psi} + u_2 \underline{w}$ for some scalars $u_1$ and $u_2$. In this case, the problem is feasible since any unit increment vector $\phi$ in the null space of $[\underline{\psi}, \underline{w}]$ solves the problem for any $\tilde{\mu}>0$. This increment vector $\phi$ satisfies all the constraints of EQN O, EQN P, EQN Q and $D_\phi J(\underline{\psi})=0$.

Lemma 6: If $\tilde{\mu} \geq \mu$, then $c_2 \leq 0$ for all k.

Proof: From the equation for $c_2$ in RELNs D we see that $$c_2 \leq 0 \text{ if } \tilde{\mu}^2 \geq \frac{|\underline{\psi}^H \underline{w}|^2}{1 - |\underline{\psi}^H \underline{w}|^2}.$$

Since $\psi(k)^H w(k)=0$ by design, $$|\underline{\psi}^H \underline{w}|^2 = |\psi(k)^H [\alpha w(k) + \alpha \mu \overline{o}(k)]|^2$$
$$= |\alpha \mu \psi(k)^H \overline{o}(k)|^2$$
$$\leq (\alpha \mu)^2.$$

Therefore, $$\tilde{\mu}^2 \geq \mu^2 = \frac{(\alpha \mu)^2}{1-(\alpha \mu)^2} \geq \frac{|\underline{\psi}^H \underline{w}|^2}{1 - |\underline{\psi}^H \underline{w}|^2},$$

which implies $c_2 \leq 0$.

The previous two lemmas indicate that there always exists a $\tilde{\mu}>0$ such that the problem is feasible. However, the issue remains whether $\tilde{\mu}$ should be varied to achieve feasibility. If that were the case, additional feedback information would be necessary to inform the transmitter about the value of $\tilde{\mu}$ used in each step. Fortunately, the answer is no since the problem is always feasible for $\tilde{\mu} \geq \mu$. This fact has an important practical implication for the reason mentioned above, as proved in the following lemma.

Lemma 7: If $\tilde{\mu} \geq \mu$, then $c_0$ and $c_2$ have opposite signs for all k and the problem represented by EQN N, EQN O, EQN P, and EQN Q is feasible.

Proof: From Lemma 6, we have $c_2 \leq 0$. We only need to show that $c_0 \geq 0$. With some algebra, it can be shown that:

$$c_0 = \|R\underline{\psi} - a_1 \underline{\psi} - a_3 \tilde{\mu} \underline{w}\| \geq 0, \qquad \text{EQN BB}$$

which concludes the proof.

It can be concluded that in the regular case where $m_3 \neq 0$, the increment vector $\phi$ is given by EQN R. The irregular case is now discussed where $m_3=0$, due to $c_0=0$. In this case, the increment vector $\phi$ cannot be derived from equation EQN R, which would yield the indeterminate form $$\phi = \frac{0}{0}.$$

However, from EQN BB it can be shown that:

$$R\underline{\psi} = a_1 \underline{\psi} + \tilde{\mu} a_3 \underline{w}.$$

Therefore, as long as the increment vector $\phi$ satisfies the constraints represented by EQN O, EQN P, and EQN Q, we have $D_\phi J(\underline{\psi}) = 2 \Re\{\phi^H R\underline{\psi}\} = 2\Re\{a_3 \tilde{\mu} \phi^H \underline{w}\} = -2\Re\{a_3 \underline{\psi}^H \underline{w}\}$, which is independent of the increment vector $\phi$. This means that any increment vector $\phi$ satisfying EQN O, EQN P, and EQN Q leads to the same value for $D_{100} J(\underline{\psi})$. Thus, any increment vector $\phi$ that satisfies EQN O, EQN P, and EQN Q is a solution with the same level of preference.

At this point, the increment vector $\phi$ is available only at the receiver. In order to convey the information to the transmitter, a quantized version $\overline{\phi}$ of the antenna weight increment vector $\phi$ is sent back to the transmitter (i.e., the base station) via a feedback channel, of which a plurality of quantization schemes are provided above. It will be shown hereinbelow that the quantization schemes as described previously provide global convergence, i.e., $\psi(k) \to w_2$ as $k \to \infty$.

Quantization Scheme 4: This scheme provides further generalization. Let the vector $$\overline{\Phi} \triangleq \left[\overline{\phi}_{R_e}^T, \overline{\phi}_{I_m}^T\right]^T$$

be the quantized version of the vector $$\Phi \triangleq \left[\phi_{R_e}^T, \phi_{I_m}^T\right]^T$$

via a quantizer $Q_k(\cdot)$, i.e., $\overline{\Phi} = Q_k(\Phi)$. For any nonzero $\Phi \in R^{2M}$, let the vectors $\Phi_i$ and $\overline{\Phi}_i$, respectively, denote the i-th components thereof $\Phi$ and $\overline{\Phi}$, $i=1, 2, \ldots, 2M$. Let set $S_k$ be any nonempty subset of $\{1, 2, \ldots, 2M\}$ such that the vector $\Phi_i \neq 0$ for all $i \in S_k$. Any quantization function $Q_k(\cdot)$ is acceptable if the components $\Phi_i \overline{\Phi}_i > 0$ for all $i \in S_k$ and the components $\overline{\Phi}_i = 0$ for all $i \notin S_k$. That is, the component $\overline{\Phi}_i$ has the same sign as the component $\Phi_i$ for $i \in S_k$. This scheme implies that the number of feedback bits can be arbitrary and, hence, adaptable. For instance, one or more nonzero components of the vector $\Phi$ can be quantized to their respective signs and the remaining components quantized to zero according to a predefined protocol, which selects the index, set $S_k$ for the k-th slot. The set $S_k$ can be periodic in k under practical considerations. In the extreme case where only one component of the vector $\Phi$ is quantized to its sign and the remaining components are quantized to zero, we have a one-bit feedback scheme.

The information that is sent back to the transmitter is the bits that represent the quantized version of the antenna weight increment vector $\bar{\phi}$. At this point, the transmitter and the receiver both know the increment vector and antenna weight vectors $\bar{\phi}$, $\bar{\psi}$, $$\underline{w} \triangleq w(k+1).$$

However, unlike the increment vector $\phi$, the quantized increment vector $\bar{\phi}$ may no longer be orthogonal to the antenna weight vector $\bar{\phi}$. Nonetheless, at both the transmitter and the receiver, the adjustments for orthogonalization and renormalization to unit length can be performed as indicated below as RELNs E:

$$\underline{\bar{w}} \triangleq \frac{\underline{w} - (\underline{\psi}^H \underline{w})\underline{\psi}}{\sqrt{1 - |\underline{\psi}^H \underline{w}|^2}}$$

$$\bar{\phi}(k) \triangleq \frac{\bar{\phi} - (\underline{\bar{w}}^H \bar{\phi})\underline{\bar{w}} - (\underline{\psi}^H \bar{\phi})\underline{\psi}}{\sqrt{1 - |\underline{\bar{w}}^H \bar{\phi}|^2 - |\underline{\psi}^H \bar{\phi}|^2}}.$$

$$\bar{\psi}(k) \triangleq \frac{\underline{\psi} - (\underline{w}^H \underline{\psi})\underline{w}}{\sqrt{1 - |\underline{w}^H \underline{\psi}|^2}}.$$

The second beam is updated according to:

$$\psi(k+1) = \tilde{\alpha}\tilde{\psi}(k) + \tilde{\alpha}\tilde{\mu}\tilde{\phi}(k). \qquad \text{EQN CC}$$

It is easy to show that the antenna weight vectors $\underline{w}$, $\underline{\psi}$ are orthogonal to the increment vector $\tilde{\phi}(k)$. Therefore, the antenna weight vector $\bar{\psi}(k)$ and increment vector $\bar{\phi}(k)$ are orthogonal. It is also easy to see that the antenna weight vectors $\psi(k+1)$, $$\underline{w} \triangleq w(k+1)$$

are orthogonal.

Figure 17:
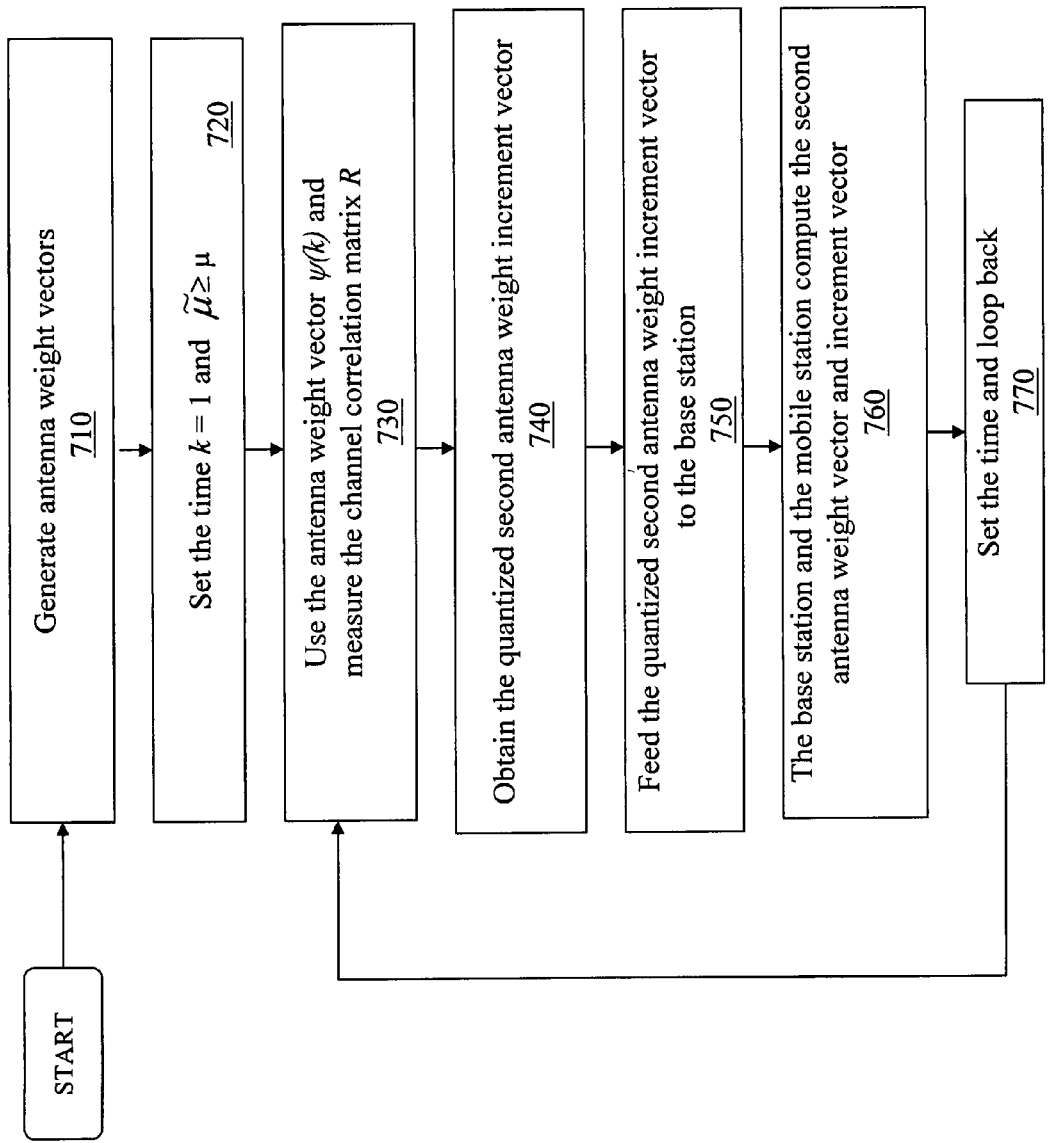
FIG. 17 illustrates a flow diagram of an embodiment of a method of operating a quantized-feedback optimal adaptive multi-beamforming system.

Thus, the QFOA multi-beamforming system and method are summarized with respect to the flow diagram of FIG. 17 wherein a base station has M transmit antennas and a mobile station has N receive antennas.

1. Generate arbitrary first and second base station antenna weight vectors w(1) and $\psi(1)$, respectively, of unit magnitude, i.e., $\|w(1)\|=1$ and $\|\psi(1)\|=1$, and such that $w(1)^H \psi(1)=0$ according to a pre-determined procedure (designated step 710).

2. Set the time k=1 and select step sizes $\mu$ and $\tilde{\mu}$ for the first and second antenna weight vectors, respectively, where step size $\tilde{\mu} \geq \mu$ (designated step 720).

3. Use the antenna weight vector $\psi(k)$ in place of the second antenna weight vector $\psi$ to transmit in the k-th slot. At the mobile station, the channel correlation matrix R is measured from pilot signals (designated step 730).

4. Solve the equation:

$$0 = c_2 \cdot |m_3|^2 + c_0$$

for Lagrange multiplier $m_3$ in terms of variables $c_0$ and $c_2$ defined in EQN UU. If Lagrange multiplier $m_3 \neq 0$, compute the second antenna weight increment vector $\phi$ by solving EQN R:

$$R\psi(k) = m_1 \psi(k) + m_2 \tilde{\mu} w(k+1) + m_3 \phi, \qquad \text{EQN R}$$

for the second antenna weight increment vector $\phi$. Otherwise, the second antenna weight increment vector $\phi$ can be any unit vector in the null space of $[\psi, w]$. Then obtain the quantized second antenna weight increment vector $\bar{\Phi}$ by quantizing the second antenna weight increment vector $\Phi$, preferably as described hereinabove (designated step 740).

5. The bits that represent the quantized second antenna weight increment vector $\bar{\phi}$ are sent back to the base station (designated step 750). At this point, the base station and the mobile station both know the quantized second antenna weight increment vector $\bar{\phi}$, the second antenna weight vector $\psi$, and the first antenna weight vector w.

6a. The base station and the mobile station then compute the second antenna weight increment vector $\tilde{\phi}(k)$ re-orthogonalized to the antenna weight vectors w and $\psi$, and renormalized to unit length according to the equation for the second antenna weight increment vector $\tilde{\phi}(k)$ in RELNs E.

6b. The base station and the mobile station then compute the second antenna weight vector $\tilde{\psi}(k)$ orthogonalized to the first antenna weight vector w and renormalized to unit length according to the equation for the second antenna weight vector $\tilde{\psi}(k)$ in RELNs E.

6c. The base station and mobile station update the second beam antenna weight vector $\psi$ to $\psi(k+1)$ according to EQN CC (designated step 760).

7. Then increment time $k \leftarrow k+1$ and loop back to step (3) to repeat the procedure for the next slot (designated step 770).

It should be noted that the quantized first antenna weight vector and increment vector are computed, quantized, and sent by the mobile station, and received and processed at the base station as previously described hereinabove for the QFOA beamforming system.

The QFOA multi-beamforming as described above is a time-recursive solution to the optimization problem described by the equation:

$$\psi_{max} \triangleq \arg\max_{\psi \in S_{w_{max}}} J(w).$$

Using the Lagrange multiplier method, we again see that the local maximizers $w_i$, i=1, 2, ..., M, satisfy:

$$Rw_i = \lambda_i w_i. \qquad \text{EQN DD}$$

Therefore, the $\lambda_i$'s are the eigenvalues of the channel correlation matrix R and the $w_i$'s are the corresponding eigenvectors of the channel correlation matrix R. Since the channel correlation matrix R is a nonnegative definite Hermitian matrix, again we have $\lambda_i \geq 0$ for all i and $$R = W\Lambda W^H \qquad \text{EQN EE}$$

wherein $$W = [w_1, w_2, \ldots, w_M] \qquad \text{EQN FF}$$

$$\Lambda = \text{diag}(\lambda_1, \lambda_2, \ldots, \lambda_M) \qquad \text{EQN GG}$$

The eigenvalues and the eigenvectors are again arranged, as is customary, such that $\lambda_1 \geq \lambda_2 \geq \ldots \geq \lambda_M$. Further, W again satisfies $W^H W = W W^H = I_m$.

In the following, we examine several properties of the multi-beamforming system that guarantee global convergence. That is, as $k \rightarrow \infty$, $\psi(k) \rightarrow w_2$ or $J(\psi(k)) \rightarrow \lambda_2$, where $w_2$ is an eigenvector of the channel correlation matrix R belonging to the eigenvalue $\lambda_2$.

As discussed above, the first antenna weight vector $w(k) \rightarrow w_1$. Note that the QFOA multi-beamforming system which tracks the first antenna weight vector $w(k)$ does not depend on the convergence behavior of the second antenna weight vector $\psi(k)$. Therefore, to show the global convergence of the second antenna weight vector $\psi(k)$, we assume without loss of generality that the first antenna weight vector $w(k)$ has converged to $w_1$. That is, there is no significant difference between the first antenna weight vector $w(k)$ and the first antenna weight vector $w(k+1)$ and we assume that the first antenna weight vector $w(k+1)=w(k)=w_1$ for large k.

Lemma 8: For large k, i.e. $w(k+1)=w(k)=w_1$, there holds:

$$D_{\tilde{\phi}(k)} J(\psi(k)) \geq 0$$

The equality holds if the second antenna weight vector $\psi(k)$ is an eigenvector of the channel correlation matrix R.

Proof: For large k, by design we have $\psi(k)^H [w(k), w(k+1)]=0$. RELNs E and EQN CC become RELNs F:

$$\overline{w} = w$$

$$\overline{\phi} \triangleq \overline{\phi}(k) = \frac{\underline{\phi} - (\underline{w}^H \underline{\phi})\underline{w} - (\underline{\psi}^H \underline{\phi})\underline{\psi}}{\sqrt{1 - |\underline{w}^H \underline{\phi}|^2 - |\underline{\psi}^H \underline{\phi}|^2}}$$

$$\overline{\psi}(k) = \psi$$

$$\psi(k+1) = \overline{\alpha} \overline{\phi}(k) + \overline{\alpha} \, \overline{\mu} \overline{\phi}.$$

It is important to note from the last equation above that the second antenna weight vector $\psi(k+1)$ is obtained by pulling the head of the second antenna weight vector $\psi(k)$ in the direction of the increment vector $\tilde{\phi}(k)$ which is orthogonal to the second antenna weight vector $\psi(k)$. This is a key feature that ensures the global convergence. Let us define $$\sigma \triangleq \sqrt{1 - |\underline{w}^H \underline{\phi}|^2 - |\underline{\psi}^H \underline{\phi}|^2}.$$

Noting that $R\underline{w} = \lambda_1 w_1 = \lambda_1 w(k) = \lambda_1 w(k+1)$ which is orthogonal to the second antenna weight vector $\underline{\psi}$, we have $m_1 = a_1 = \underline{\psi}^H R \underline{\psi}$, $a_2 = a_3 = a_4 = 0$, $m_2 = 0$, and $m_3 = \sqrt{c_0}$. With $a_3 = 0$, we note from EQN BB that $c_0 = 0$ if the second antenna weight vector $\underline{\psi}$ is an eigenvector of the channel correlation matrix R. We consider the two cases where $c_0 \neq 0$ and $c_0 = 0$. For $c_0 \neq 0$, from EQN R we have $$\underline{\phi} = \frac{R\underline{\psi} - (\underline{\psi}^H R \underline{\psi})\underline{\psi}}{\sqrt{c_0}}.$$ EQN FF Therefore, -continued $$D_{\tilde{\phi}(k)} J(\psi(k)) = 2R\{\underline{\psi}^H R \underline{\tilde{\phi}}\}$$

$$= \frac{2}{\sigma} R\{\underline{\psi}^H R[\underline{\phi} - (\underline{w}^H \underline{\phi})\underline{w} - (\underline{\psi}^H \underline{\phi})\underline{\psi}]\}$$

$$= \frac{2}{\sigma} R\{\underline{\psi}^H R \underline{\phi} - \underline{\psi}^H R \underline{w} \underline{w}^H \underline{\phi} - \underline{\psi}^H R \underline{\psi} \underline{\psi}^H \underline{\phi}\}$$

$$= \frac{2}{\sigma} R\{[\underline{\psi}^H R - \underline{\psi}^H R \underline{\psi} \underline{\psi}^H] \underline{\phi}\}$$

$$= \frac{2\sqrt{c_0}}{\sigma} R\{\underline{\phi}^H \underline{\phi}\}$$

$$= \frac{2\sqrt{c_0}}{\sigma} [\underline{\phi}_R^T \underline{\phi}_R + \underline{\phi}_I^T \underline{\phi}_I]$$

$$> 0,$$

referred to as RELNs G.

Note that the middle term in the third equation above is zero. The inequality in the last equation above holds since by quantization design the corresponding components of the increment vectors $\underline{\phi}_{Re}$ and $\overline{\underline{\phi}}_{Re}$ have the same sign and the corresponding components of the increment vectors $\underline{\phi}_{Im}$ and $\overline{\underline{\phi}}_{Im}$ also have the same sign.

If $c_0 = 0$, i.e., the second antenna weight vector $\underline{\psi}$ is an eigenvector of the channel correlation matrix R, then $D_{\tilde{\phi}(k)} J(\psi(k)) = 0$ by RELNs G because the increment vector $\tilde{\phi}$ is orthogonal to the second antenna weight vector $\underline{\psi}$ by design, i.e. the middle equation in RELNs E and the second equation in RELNs F. The converse can be proved by contradiction. Suppose $D_{\tilde{\phi}(k)} J(\psi(k)) = 0$, but the second antenna weight vector $\underline{\psi}$ is not an eigenvector of the channel correlation matrix R. Then $c_0 \neq 0$ and the increment vector $\underline{\phi}$ is given by EQN FF. From the sixth equation of RELNs G, we have $\phi = 0$. It follows from EQN FF that the second antenna weight vector $\underline{\psi}$ is an eigenvector of the channel correlation matrix R, which contradicts the original hypothesis. This concludes the proof of the current lemma.

Lemma 9: If $\lambda_2 > \lambda_1 > \lambda_M$, then the antenna weight vector $w_i$ is a saddle point of the received signal power $J(w)$ over the constraint surface $S_{w1}$ defined by the equation:

$$S_w \triangleq \{\psi: g(\psi) = 0, w^H \psi = 0\}.$$

It is first noted that the antenna weight vector $w_i$ is a stationary point of the received signal power $J(w)$ over the constraint surface $S_{w1}$. This is due to the fact that the directional derivative of the received signal power $J(w)$ in the direction of $v_i$ is zero, where $v_i$ is any unit vector parallel to the hyperplane tangent to the constraint surface $S_{w1}$ at the antenna weight vector $w = w_i$. Indeed, since the antenna weight vector $w_i = -\nabla_w{}^H g(w_i)$ which is orthogonal to the equal-level surface $g(w) = 0$, then $v_i^H w_i = 0$. Hence, the directional derivative of the received signal power $J(w)$ in the direction of $v_i$ at the antenna weight vector $w = w_i$ is:

$$D_{v_i} j(w_i) = v_i^H \nabla_w{}^H J(w_i) + \nabla_w J(w_i) v_i = v_i^H \lambda_i w_i + w_i^H \lambda_i v_i = 0,$$

which establishes that the antenna weight vector $w_i$ is a stationary point of the received signal power $J(w)$ over the constraint surface $S_{w1}$. Next, it will be established that the antenna weight vector $w_i$ is neither a local maximum point nor a local minimum point of the received signal power $J(w)$ over the constraint surface $S_{w1}$. Since the received signal power J(w) is analytic in the antenna weight vector w and continuous over the constraint surface $S_{w1}$, it is sufficient to show that there exist vectors e and f with arbitrarily small magnitudes such that:

$w_i + e \in S_{w1}$, $w_i + f \in S_{w1}$, $J(w_i + e) > J(w_i)$, and $J(w_i + f) < J(w_i)$.

Such vectors indeed exist. For example, for any complex scalars $e_1, e_2, \ldots, e_{i-1}$, with $e_1 \neq 0$, and for any complex scalars $f_{i+1}, f_{i+2}, \ldots, f_M$ with $f_M \neq 0$, if:

$$e = \frac{e_1 w_1 + e_2 w_2 + \ldots + e_{i-1} w_{i-1} + w_i}{\sqrt{|e_1|^2 + |e_2|^2 + \ldots + |e_{i-1}|^2 + 1}} - w_i, \text{ and}$$

$$f = \frac{w_i + f_{i+1} w_{i+1} + f_{i+2} w_{i+2} + \ldots + f_M w_M}{\sqrt{1 + |f_{i+1}|^2 + |f_{i+2}|^2 + |f_M|^2}} - w_i,$$

then the following hold:

$w_i + e \in S_g$, $w_i + f \in S_g$.

Note that $\|e\| \to 0$ as $e_k \to 0$, k=1, 2, . . . , i−1, and $\|f\| \to 0$ as $f_l \to 0$, l=i+1, i+2, . . . , M. Also, the relationships as set forth below:

$$J(w_i + e) = \frac{|e_1|^2 \lambda_1 + |e_2|^2 \lambda_2 + \ldots + |e_{i-1}|^2 \lambda_{i-1} + \lambda_i}{|e_1|^2 + |e_2|^2 + \ldots + |e_{i-1}|^2 + 1} > \lambda_i = J(w_i),$$

$$J(w_i + f) = \frac{\lambda_i + |f_{i+1}|^2 \lambda_{i+1} + |f_{i+2}|^2 \lambda_{i+2} + \ldots + |f_M|^2 \lambda_M}{1 + |f_{i+1}|^2 + |f_{i+2}|^2 + |f_M|^2} < \lambda_i = J(w_i)$$

respectively satisfy:

$J(w_i + e) > J(w_i)$, and $J(w_i + f) < J(w_i)$.

Figure 18:
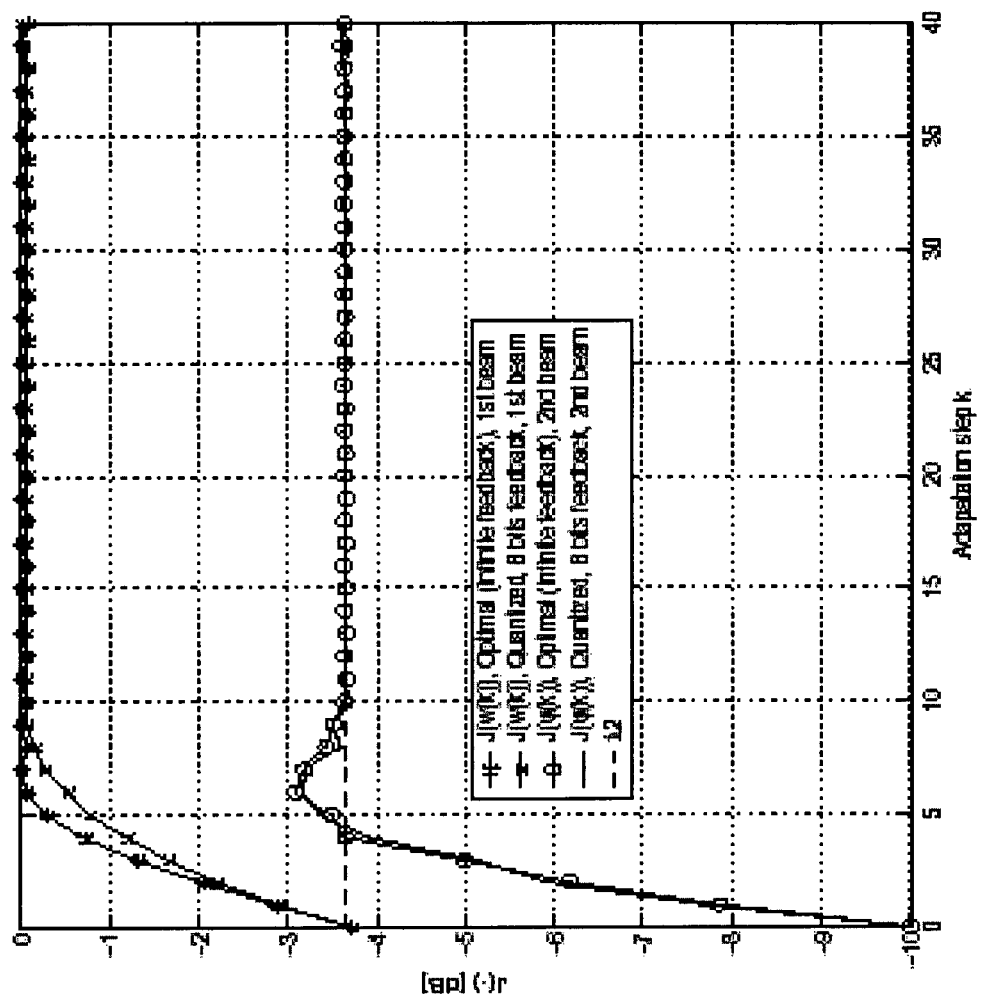
FIGS. 18 and 19 illustrate graphical representations comparing exemplary instances of an evolution of received signal power for randomly realized static channels, including representations of a quantized-feedback optimal adaptive multi-beamforming system.
Figure 19:
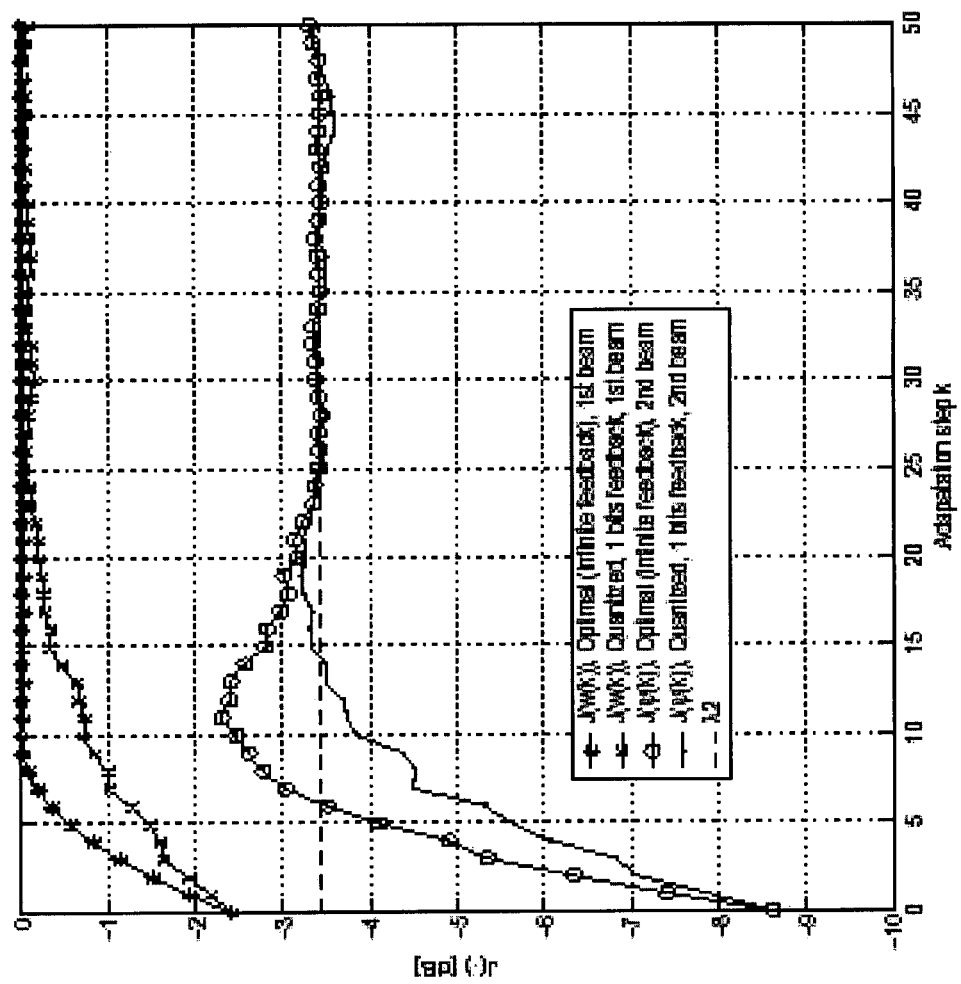

Turning now to FIGS. 18 and 19, illustrated are diagrams demonstrating exemplary instances of an evolution of a received signal power J(w(k)) normalized to the largest eigenvalue $\lambda_1$ for a randomly realized static channel. To graphically illustrate the convergence behavior of the QFOA multi-beamforming system, FIG. 18 shows the evolution of the received signal power J(w(k)) and J($\psi$(k)) normalized to $\lambda_i$ for a typical randomly realized static channel under quantization scheme 2. FIG. 19 shows the behavior of J(·) under quantization scheme 3 where the number of feedback bits is one for each beam, so the total number of feedback bits is two. It is clear as analytically proved that irrespective of the quantization error, the received signal power J(w(k)) converges to $\lambda_1$ and the received signal power J($\psi$(k)) converges to $\lambda_2$. The illustrated embodiments employ the following parameters for the demonstrated instances with M transmit antennas.

| FIG. | M | b (bits) | μ (step size) |
|---|---|---|---|
| 18 | 4 | 1 | 0.2 |
| 19 | 4 | 1 | 0.1 |

Thus, a QFOA multi-beamforming system employing quantized feedback adaptive beamforming for transmitting multiple beams in one slot has been illustrated and described herein. For each beam, the feedback information is a quantized version of the optimal update direction vector. The method has been shown analytically to have global convergence using simple quantization schemes. The flexibility of the multi-beamforming system, which allows the quantization resolution (number of feedback bits) to be arbitrary, is quite adaptable. It should be understood that with the described quantization schemes, the method has global convergence since the objective function has no local maximum in the constraint set and its directional derivative is nonnegative in the quantized increment vector.

Simulation results for a slow fading channel show that for the Grassmannian codebook-based method, the bit error rate tends to be inferior to those of the QFOA multi-beamforming system and DPGA algorithms at high SNRs, which confirms our earlier conjecture that the codebook-based method does not achieve global maximization. For low and medium SNRs, however, the QFOA multi-beamforming system and the Grassmannian codebook method have similar performances. With scalar quantization schemes previously described, since the QFOA multi-beamforming system does not search over a codebook, its complexity has virtually no dependency on the number of feedback bits.

Thus, in the environment of a communications system, a receiving station (e.g., mobile station) includes a receiver of a QFOA multi-beamforming system that receives a forward link signal including pilot signals from a transmitter employing multiple transmit antennas transmitting multiple beams in one slot with different antenna weighting elements of a base station. The QFOA multi-beamforming system also includes a detector embodied in the mobile station that measures characteristics of the forward link signal in accordance with the pilot signals and provides a quantized increment vector that represents a preferable adaptation of the weightings for the weighting elements to enhance a quality of the forward link signal for each of the multiple beams. The QFOA multi-beamforming still further includes a transmitter embodied in the mobile station that transmits the quantized increment vector for each of the multiple beams to the base station via a reverse link signal for each of the multiple beams. A beamformer selector (embodied in the base station) of the QFOA multi-beamforming system operates to determine an updated direction or increment vector based on the quantized increment vector received from the mobile station for each of the multiple beams. A weight vector modifier of the QFOA multi-beamforming system produces the tangential component of the weight vector for each of the multiple beams selected by the beamformer selector, which are provided to a vector applicator for application to the corresponding weighting elements of the transmit antennas of the base station. The base station thereafter employs the updated weighting elements to transmit the forward link signal to the mobile station for each of the multiple beams are all, preferably, one bit.

The QFOA multi-beamforming system tracks a first and a second beam. Additional data can now be transmitted on the second beam in the same time slot to increase the system capacity. The system embodies an adaptive multi-beamforming technique where the optimal beam increment for each of the multiple beams is computed. The computational technique is adaptive and theoretical analysis shows that the multi-beamforming system has global convergence for both beams. For each beam, the convergence speed is optimized by finding the optimal increment vector. That is, for any given number of feedback bits per beam, the system provides a way to get to the best set of antenna weights in the least number of adaptation steps. To make the number of feedback bits finite, a quantized version of the increment vector for each of the multiple beams is sent back to the transmitter. It turns out that the method is very robust against quantization error. In particular, for a very coarse quantization scheme considered herein where the sign of each component is taken, the loss in convergence speed is small and the directional derivative (constrained gradient) of the objective function is, preferably, nonnegative everywhere. This represents a feature of the multi-beamforming system that yields global convergence regardless of quantization error. In addition, several quantization schemes are developed which allows for variable feedback rates. In particular, this multi-beamforming system can operate with one feedback bit for each beam.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to determine an updated beam direction based on the quantized increment vector received from the mobile station as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A base station including multiple antennas weighted by corresponding weighting elements, comprising:
    a beamformer selector configured to receive from a receiving station and re-orthogonalize a quantized antenna weight increment vector for each of multiple beams transmitted in a slot, each of said multiple beams formed by an antenna weight vector; and
    a weight vector modifier configured to modify said antenna weight vector for each of said multiple beams by adding an increment proportional to said respective re-orthogonalized quantized antenna weight increment vector thereto.

2. The base station as recited in claim 1 further comprising a vector applicator configured to apply ones of said antenna weight vectors to ones of said weighting elements.

3. The base station as recited in claim 1 wherein said quantized antenna weight increment vector is one bit.

4. The base station as recited in claim 1 wherein said weight vector modifier is configured to renormalize said antenna weight vector to unit length.

5. The base station as recited in claim 1 wherein said multiple beams transmitted in said slot are orthogonal.

6. A method of operating a base station including multiple antennas weighted by corresponding weighting elements, comprising:
    receiving from a receiving station and re-orthogonalizing a quantized antenna weight increment vector for each of multiple beams transmitted in a slot, each of said multiple beams formed by an antenna weight vector; and
    modifying said antenna weight vector for each of said multiple beams by adding an increment proportional to said respective re-orthogonalized quantized antenna weight increment vector thereto.

7. The method as recited in claim 6 further comprising applying ones of said antenna weight vectors to ones of said weighting elements.

8. The method as recited in claim 6 wherein said quantized antenna weight increment vector is one bit.

9. The method as recited in claim 6 further comprising renormalizing said antenna weight vector to unit length.

10. The method as recited in claim 6 wherein said multiple beams transmitted in said slot are orthogonal.

11. A receiving station, comprising:
    a detector configured to measure a downlink channel correlation matrix for multiple antennas of a base station from pilot signals, compute an antenna weight increment vector normal to an antenna weight vector for each of multiple beams transmitted in a slot thereby rendering positive a directional derivative of a total received power for each of said multiple beams from said multiple antennas of said base station, and quantize each of said antenna weight increment vectors component by component to produce a respective quantized antenna weight increment vector; and
    a transmitter configured to send each of said quantized antenna weight increment vectors to said base station.

12. The receiving station as recited in claim 11 wherein said detector is configured to measure said downlink channel correlation matrix from a discrete-time channel impulse response between said multiple antennas of said base station and a receive antenna of said receiving station.

13. The receiving station as recited in claim 11 wherein said detector is configured to compute each of said antenna weight increment vectors normal to said antenna weight vector with a direction to maximize said directional derivative of said total received power from said multiple antennas of said base station for each of said multiple beams transmitted in said slot.

14. The receiving station as recited in claim 11 wherein said quantized antenna weight increment vector is one bit.

15. The receiving station as recited in claim 11 wherein said multiple beams transmitted in said slot are orthogonal.

16. A method of operating a receiving station, comprising:
    measuring a downlink channel correlation matrix for multiple antennas of a base station from pilot signals;
    computing an antenna weight increment vector normal to an orthogonal antenna weight vector for each of multiple beams transmitted in a slot thereby rendering positive a directional derivative of a total received power for each of said multiple beams from said multiple antennas of said base station;
    quantizing each of said antenna weight increment vectors component by component to produce a respective quantized antenna weight increment vector; and sending each of said quantized antenna weight increment vectors to said base station.

17. The method as recited in claim 16 wherein said measuring includes measuring said downlink channel correlation matrix from a discrete-time channel impulse response between said multiple antennas of said base station and a receive antenna of said receiving station.

18. The method as recited in claim 16 wherein said computing includes computing each of said antenna weight increment vectors normal to said orthogonal antenna weight vector with a direction to maximize said directional derivative of said total received power from said multiple antennas of said base station for each of said multiple beams transmitted in said slot.

19. The method as recited in claim 16 wherein said quantized antenna weight increment vector is one bit.

20. The method as recited in claim 16 wherein said multiple beams transmitted in said slot are orthogonal.

21. A wireless communication system, comprising:
a receiving station, including:
a detector configured to measure a downlink channel correlation matrix for multiple antennas of a base station from pilot signals, compute an antenna weight increment vector normal to an antenna weight vector for each of multiple beams transmitted in a slot thereby rendering positive a directional derivative of a total received power for each of said multiple beams from said multiple antennas of said base station, and quantize each of said antenna weight increment vectors component by component to produce a respective quantized antenna weight increment vector, and
a transmitter configured to send each of said quantized antenna weight increment vectors to said base station; and
a base station including multiple antennas weighted by corresponding weighting elements, including:
a beamformer selector configured to receive from said receiving station and re-orthogonalize said quantized antenna weight increment vector for each of said multiple beams, and
a weight vector modifier configured to modify said antenna weight vector for each of said multiple beams by adding an increment proportional to said respective re-orthogonalized quantized antenna weight increment vector thereto.

22. The wireless communication system as recited in claim 21 wherein said detector is configured to measure said downlink channel correlation matrix from a discrete-time channel impulse response between said multiple antennas of said base station and a receive antenna of said receiving station.

23. The wireless communication system as recited in claim 21 wherein said detector is configured to compute each of said antenna weight increment vectors normal to said antenna weight vector with a direction to maximize said directional derivative of said total received power from said multiple antennas of said base station for each of said multiple beams transmitted in said slot.

24. The wireless communication system as recited in claim 21 wherein said quantized antenna weight increment vector is one bit.

25. The wireless communication system as recited in claim 21 wherein said multiple beams transmitted in said slot are orthogonal.

26. The wireless communication system as recited in claim 21 wherein ones of said increments are of a magnitude of less than unit length.

27. The wireless communication system as recited in claim 21 wherein said base station includes a vector applicator configured to apply ones of said antenna weight vectors to ones of said weighting, elements.

28. The wireless communication system as recited in claim 21 wherein said weight vector modifier is configured to renormalize said antenna weight vector to unit length.

29. The wireless communication system as recited in claim 21 wherein said base station includes a receiver configured to receive said quantized antenna weight increment vector.

30. The wireless communication system as recited in claim 21 wherein said base station includes a transmitter with an encoder configured to encode data to form encoded data and an up-mixer configured to generate an up-mixed signal for said weighting elements.

* * * * *

UNITED STATES PATENT AND TRADEMARK OFFICE
CERTIFICATE OF CORRECTION

PATENT NO. : 7,738,925 B2  Page 1 of 1
APPLICATION NO. : 11/713480
DATED : June 15, 2010
INVENTOR(S) : Nguyen et al.

It is certified that error appears in the above-identified patent and that said Letters Patent is hereby corrected as shown below:

In the drawings, Sheet 10, delete "Adapatation" and insert --Adaptation--.
In the drawings, Sheet 11, delete "Adapatation" and insert --Adaptation--.
In the drawings, Sheet 12, delete "Adapatation" and insert --Adaptation--.
In the drawings, Sheet 13, delete "Adapatation" and insert --Adaptation--.
In the drawings, Sheet 18, delete "Adapatation" and insert --Adaptation--.
In the drawings, Sheet 19, delete "Adapatation" and insert --Adaptation--.
In Col. 4, line 24, after illustrates delete "is".
In Col. 18, line 3, before purposes delete "our".
In Col. 25, line 23, delete "367" and insert --365--.
In Col. 26, line 58, delete "$_{wH}J$" and insert --$_{wH}J$--.
In Col. 27, line 6, delete "$_{73}f$" and insert --$_{\Theta}f$--.
In Col. 27, line 16, delete "$_{wH}J$" and insert -- $_{WH}J$--.
In Col. 31, line 26, delete "+ι" and insert --+α--.
In Col. 32, line 47, delete "$\lambda_2$" and insert --$\lambda_i$--.
In Col. 32, line 66, after satisfies insert --$W^H W=$--.
In Col. 34, line 3, after can insert --be--.
In Col. 37, line 8, after embodiments insert --,--.
In Col. 40, line 35, delete "567" and insert --565--.
In Col. 44, line 61, delete "$_{wH}J$" and insert --$_{wH}J$
In Col. 45, line 4, delete "w," and insert --$w_I$--.
In Col. 45, line 30, delete "$l_2=°$" and insert --$l_2=$---.
In Col. 46, line 65, delete "$\Delta_{104}$" and insert --$\Delta_\psi$--.
In Col. 46, line 66, delete "$\Delta_{73}$" and insert --$\Delta_\Theta$--.
In Col. 50, line 26, delete "$D_{100}$" and insert --$D_\Theta$--.

In Col. 51, line 14, delete " $\underline{\underline{\varnothing}}$ " and insert --$\psi$--.

In Col. 55, line 44, before $/f_M/^2 \lambda_M$ insert --$\lambda_i +/f_{i+1}/^2 \lambda_{i+1}+/f_{i+2}/^2 \lambda_{i+2}+...+$--.
In Col. 58, line 50, claim 13, delete "beanis" and insert --beams--.
In Col. 59, line 7, claim 17, delete "receiye" and insert --receive--.
In Col. 60, line 28, claim 27, delete "weighting," and insert --weighting--.

Signed and Sealed this

Twenty-third Day of November, 2010

David J. Kappos
*Director of the United States Patent and Trademark Office*